(12) United States Patent
Harif

(10) Patent No.: US 10,500,647 B2
(45) Date of Patent: Dec. 10, 2019

(54) MOUNTING MECHANISM FOR A CUTTING INSERT, A CUTTING INSERT THEREFOR AND A CUTTING TOOL USING SAID INSERT

(71) Applicant: NO SCREW LTD., Holon (IL)

(72) Inventor: Gershon Harif, Ramat Gan (IL)

(73) Assignee: NO SCREW LTD., Holon (IL)

( * ) Notice: Subject to any disclaimer, the term of this patent is extended or adjusted under 35 U.S.C. 154(b) by 260 days.

(21) Appl. No.: 14/915,617

(22) PCT Filed: Sep. 3, 2014

(86) PCT No.: PCT/IL2014/050788
§ 371 (c)(1),
(2) Date: Feb. 29, 2016

(87) PCT Pub. No.: WO2015/033338
PCT Pub. Date: Mar. 12, 2015

(65) Prior Publication Data
US 2016/0288215 A1    Oct. 6, 2016

(30) Foreign Application Priority Data

Sep. 3, 2013  (IL) ........................................... 228279
Dec. 24, 2013 (IL) ........................................... 230128

(51) Int. Cl.
*B23B 27/16*    (2006.01)
*B23C 5/22*     (2006.01)
(Continued)

(52) U.S. Cl.
CPC ............ *B23B 27/1662* (2013.01); *B22F 3/16* (2013.01); *B23B 27/1614* (2013.01);
(Continued)

(58) Field of Classification Search
CPC ............ B23B 29/04; B23B 2200/3618; B23B 2205/04; B23B 2205/045; B23B 2205/12;
(Continued)

(56) References Cited

U.S. PATENT DOCUMENTS 3,027,623 A    4/1962  Severson
3,138,846 A    6/1964  Conti et al.
(Continued)

FOREIGN PATENT DOCUMENTS

AT        6206       6/2003
CN     1368416       9/2002
(Continued)

OTHER PUBLICATIONS

International Search Report and Written Opinion from International Application No. PCT/IL2010/000162 dated Jun. 30, 2010.
(Continued)

*Primary Examiner* — Nicole N Ramos
(74) *Attorney, Agent, or Firm* — Dorsey & Whitney LLP

(57) ABSTRACT

A cutting tool holder of the kind in which the fastening screw (securing member) remains engaged with the tool holder seat during mounting/dismounting of the cutting insert. The seat is further formed with a support surface configured for engaging and providing support to the head portion of the securing member at least in the securing position.

19 Claims, 62 Drawing Sheets

(51) Int. Cl.
　　　*B22F 3/16*　　　(2006.01)
　　　*B22F 3/10*　　　(2006.01)
　　　*B22F 5/00*　　　(2006.01)

(52) U.S. Cl.
　　　CPC ........ *B23B 27/1644* (2013.01); *B23C 5/2213* (2013.01); *B22F 3/10* (2013.01); *B22F 2005/001* (2013.01); *B23B 2200/3618* (2013.01); *B23B 2205/04* (2013.01); *B23B 2205/045* (2013.01); *B23B 2205/12* (2013.01); *B23B 2260/082* (2013.01); *B23C 2200/361* (2013.01); *B23C 2210/165* (2013.01); *B23C 2210/168* (2013.01); *B23C 2240/12* (2013.01)

(58) Field of Classification Search
　　　CPC .......... B23B 2260/082; B23B 27/1614; B23B 27/1644; B23B 27/1662; B23C 2200/361; B23C 2210/165; B23C 2210/168; B23C 2240/12; B23C 5/2213; Y10T 407/2276; Y10T 407/2274; Y10T 407/2278; Y10T 407/228; Y10T 407/2282
　　　See application file for complete search history.

(56) References Cited

U.S. PATENT DOCUMENTS

| | | | |
|---|---|---|---|
| 3,299,489 A * | 1/1967 | Pohle | B23B 27/1614 407/104 |
| 3,341,919 A | 9/1967 | Lovendahl | |
| 3,341,921 A | 9/1967 | Weller et al. | |
| 3,341,923 A * | 9/1967 | Kelm | B23B 27/1662 407/104 |
| 3,491,421 A | 1/1970 | Holloway | |
| 3,648,341 A | 3/1972 | Viellet | |
| 3,740,807 A | 6/1973 | Getts et al. | |
| 3,747,179 A | 7/1973 | Lovendahl | |
| 3,787,941 A * | 1/1974 | Novkov | B23B 27/1622 407/105 |
| 3,805,351 A | 4/1974 | Mayer | |
| 3,913,197 A | 10/1975 | Wolf | |
| 3,925,868 A | 12/1975 | Singh | |
| 3,946,473 A | 3/1976 | Petersen | |
| 4,035,887 A | 7/1977 | Hertel et al. | |
| 4,044,440 A | 8/1977 | Stier et al. | |
| 4,204,781 A | 5/1980 | Johann | |
| 4,283,163 A | 8/1981 | Grafe et al. | |
| 4,397,592 A | 8/1983 | Erickson et al. | |
| 4,398,853 A * | 8/1983 | Erickson | B23B 27/1622 407/104 |
| 4,507,023 A | 3/1985 | Shikata | |
| 4,527,930 A | 7/1985 | Harroun et al. | |
| 4,621,957 A * | 11/1986 | Dillard | B23B 51/102 408/188 |
| 4,869,624 A * | 9/1989 | Viellet | B23B 27/1662 407/104 |
| 5,167,473 A * | 12/1992 | Barnett | B23B 27/1662 407/104 |
| 5,199,828 A | 4/1993 | Forsberg et al. | |
| 5,836,724 A | 11/1998 | Satran et al. | |
| 5,938,377 A * | 8/1999 | Jordberg | B23B 27/1662 407/103 |
| 6,155,754 A | 12/2000 | Joensson et al. | |
| 6,158,928 A | 12/2000 | Hecht | |
| 6,168,356 B1 | 1/2001 | Hansson et al. | |
| 6,579,042 B1 | 6/2003 | Shiraiwa | |
| 7,144,205 B2 * | 12/2006 | Sheffler | B23C 5/2221 407/103 |
| 7,261,495 B1 * | 8/2007 | Nelson | B23B 27/1662 407/104 |
| 7,264,424 B2 | 9/2007 | Hansson et al. | |
| 7,273,331 B2 | 9/2007 | Giannetti | |
| 7,677,842 B2 | 3/2010 | Park | |
| 7,775,750 B2 | 8/2010 | Satran et al. | |
| 7,780,380 B2 | 8/2010 | Nagaya et al. | |
| 8,568,064 B2 | 10/2013 | Carl | |
| 8,821,079 B2 | 9/2014 | Hecht | |
| 8,870,499 B2 * | 10/2014 | Harif | B23B 27/12 407/102 |
| 8,882,404 B2 | 11/2014 | Harif | |
| 9,120,154 B2 | 9/2015 | Hecht et al. | |
| 2003/0031519 A1 | 2/2003 | Hecht | |
| 2005/0152754 A1 | 7/2005 | Wiman et al. | |
| 2007/0003384 A1 | 1/2007 | Ballas et al. | |
| 2008/0166191 A1 | 7/2008 | Andersson et al. | |
| 2008/0193233 A1 | 8/2008 | Park | |
| 2009/0092451 A1 | 4/2009 | Harif | |
| 2009/0238651 A1 | 9/2009 | Nguyen | |
| 2010/0272522 A1 | 10/2010 | Hecht | |
| 2011/0305532 A1 | 12/2011 | Harif | |
| 2012/0082521 A1 | 4/2012 | Burtscher et al. | |
| 2012/0170988 A1 | 7/2012 | Koutanya et al. | |
| 2013/0004252 A1 | 1/2013 | Yoshioka | |
| 2013/0051938 A1 | 2/2013 | Tulchinsky et al. | |

FOREIGN PATENT DOCUMENTS

| | | | |
|---|---|---|---|
| CN | 1623725 | 6/2005 | |
| CN | 101028654 | 9/2007 | |
| CN | 102781613 | 11/2012 | |
| DE | 1260926 B * | 2/1968 | ............. B23C 5/202 |
| DE | 2853313 A1 | 6/1980 | |
| DE | 3301191 | 7/1984 | |
| EP | 0001764 A1 | 5/1979 | |
| EP | 0037554 | 10/1981 | |
| EP | 0179033 A2 | 4/1986 | |
| EP | 0300172 | 1/1989 | |
| EP | 0402854 | 12/1990 | |
| EP | 0487478 A1 | 5/1992 | |
| EP | 0730926 | 9/1996 | |
| EP | 2487001 | 8/2012 | |
| EP | 2614907 | 7/2013 | |
| GB | 1011658 | 12/1965 | |
| GB | 1527091 A | 10/1978 | |
| GB | 1527092 A | 10/1978 | |
| GB | 1584237 A | 2/1981 | |
| GB | 2057940 A | 4/1981 | |
| GB | 2098105 | 11/1982 | |
| JP | S4844661 A | 12/1973 | |
| JP | S5431690 B1 | 3/1979 | |
| JP | 57189718 A | 11/1982 | |
| JP | Hei1-132319 | 9/1989 | |
| JP | H03281115 A | 12/1991 | |
| JP | 9108909 | 4/1997 | |
| JP | H09234608 A | 9/1997 | |
| JP | 2001/507287 | 6/2001 | |
| JP | 2004521767 A | 7/2004 | |
| JP | 2008520447 A | 6/2008 | |
| JP | 2010/507496 | 3/2010 | |
| SE | 463703 | 1/1991 | |
| SE | 502241 | 9/1995 | |
| SU | 665993 A1 | 6/1979 | |
| SU | 703248 A1 | 12/1979 | |
| SU | 709261 A1 | 1/1980 | |
| SU | 831394 A1 | 5/1981 | |
| SU | 848158 A1 | 7/1981 | |
| SU | 1079370 | 3/1984 | |
| WO | 93/17822 | 9/1993 | |
| WO | 96/26802 | 9/1996 | |
| WO | 98/30349 | 7/1998 | |
| WO | 99/54078 | 10/1999 | |
| WO | 2003004204 | 1/2003 | |
| WO | 03/022495 | 3/2003 | |
| WO | 03/101653 | 12/2003 | |
| WO | WO 2007/067138 A1 | 6/2007 | |
| WO | 2007/098043 | 8/2007 | |
| WO | 2007/134930 | 11/2007 | |
| WO | 2008114242 A1 | 9/2008 | |
| WO | 2008/149371 | 12/2008 | |
| WO | 2009028747 A1 | 3/2009 | |
| WO | 2015033338 A2 | 3/2015 | |

(56) References Cited

FOREIGN PATENT DOCUMENTS

OTHER PUBLICATIONS

Thomson Scientific , XP-002587912 Abstract, WPI Week 198537, Jan. 8, 1984.

* cited by examiner

MOUNTING MECHANISM FOR A CUTTING INSERT, A CUTTING INSERT THEREFOR AND A CUTTING TOOL USING SAID INSERT

TECHNOLOGICAL FIELD

The subject matter of the present application is in the field of cutting tools, in particular, in the field of mounting and securing mechanisms of cutting inserts onto cutting tool holders.

BACKGROUND

A cutting tool is generally formed with at least one cutting edge, and is adapted for the removal of material from a workpiece by bringing the cutting edge into contact with the workpiece and displacing the cutting edge with respect to the workpiece either by displacing the cutting tool with respect to the workpiece or vise versa.

The cutting edges of cutting tools wear rapidly when used for cutting operations, particularly when cutting hard materials such as metal, and therefore they must be frequently replaced or re-sharpened. In many types of cutting tools, such as tools adapted for milling/drilling/turning machines, the cutting tool may comprise a plurality of cutting inserts, each being formed with at least one cutting edge, the inserts being fixed within seats of a cutting tool holder to form the cutting tool.

In a conventional cutting tool, the cutting insert is attached within the seat of the cutting tool by a fastener passing through a bore in the cutting insert into the bottom of the seat of the cutting tool. Indexing (or completely replacing) the cutting insert to enable the use of another cutting edge (or another insert altogether) requires the removal of the fastener, the reorientation or removal of the cutting insert, and the reattachment of the cutting insert within the seat of the cutting tool by the fastener. Each of these operations involves time and labor, and since cutting tools generally include a plurality of such cutting inserts, the time and labor costs involved in indexing the cutting inserts in a cutting tool are considerable.

In order to overcome technical problems, among which is the one presented above, alternative methods of mounting the cutting inserts onto the cutting tool holder have been devised as disclosed in WO2008/149371 to the applicant.

Other methods of fastening cutting inserts onto cutting tool holders include the use of clamps and lever mechanisms which are usually in the form of a mechanic assembly comprising at least one moving part configured for displacing so as to come into contact with a designated surface of the cutting insert and applying pressure thereto for the purpose of securing it. Examples of such arrangement are disclosed in U.S. Pat. Nos. 3,027,623A, 3,138,846A and others.

Additional examples include EP0037554, U.S. Pat. Nos. 3,341,919, 3,805,351, 3,913,197, 3,946,473 and 5,199,828, disclosing arrangements in which the fastening screw remains engaged with the tool holder during mounting/dismounting of the cutting insert.

Acknowledgement of the above references herein is not to be inferred as meaning that these are in any way relevant to the patentability of the presently disclosed subject matter.

GENERAL DESCRIPTION

According to one aspect of the subject matter of the present application there is provided a cutting tool holder adapted for mounting thereon a cutting insert having a top face, a bottom face and an insert bore extending between said top face and said bottom face, and having an inner surface; said holder comprising a seat defined by a base surface and at least one side wall angled to said base surface, a seat bore extending along a bore axis, and having an open end at said base surface; a securing arrangement comprising a securing member extending between a proximal end and a distal end, the securing member having a head portion at said proximal end and having its distal end received within said seat bore, and a displacement arrangement adapted to displace the securing member along the bore axis of said seat bore between a mounting position in which said head portion protrudes from within the seat bore through said base surface into said seat to a first extent, defining a first gap distance between said head portion and said at least one side wall allowing said cutting insert to be placed within the seat and/or being fully removed from the seat, and a securing position in which said head portion protrudes from within the seat bore through said base surface into said seat to a second extent, smaller than said first extent, defining a second gap distance between said head portion and said at least one side wall smaller than said first gap distance, so as to engage the inner surface of said insert bore, thereby securing said insert between the head portion and the at least one side wall, and wherein said insert seat is further formed with a support surface configured for engaging and providing support to the head portion of said securing member at least in said securing position.

According to different example, the support surface can be constituted by:
- a portion of the base surface itself, adjacent the open end of said seat bore;
- a surface extending from the base surface into the seat bore, forming a part of an inner surface thereof, and oriented at an angle to said base surface; and
- a surface of a support structure extending from the base surface into said seat.

In accordance with the above example, said support surface can be at least one of the following, respectively:
- disposed above said base surface;
- disposed at said base surface; and
- disposed below said base surface.

It should be noted that the seat can comprise more that one support surface according to the above examples, and/or one extensive support surface having a first portion extending below the base surface and a second portion extending above the base surface.

Under the above arrangement, the head portion of the securing member is supported in at least two different locations—the inner surface of the insert bore of the cutting insert and the support surface. According to a particular design, the inner surface of the insert bore and the support surface can be counter opposed, so that the head portion constitutes a wedge interposed therebetween.

Specifically, in a cross section of the cutting tool taken along a plane of the bore axis at least in the securing position, the arrangement of elements is as follows: the at least one side wall of the seat, a portion of the cutting insert firmly pressed against the side wall by the head portion, the head portion of the securing member, the support surface firmly pressed against the head portion, and the opposite portion of the cutting insert (that portion of the insert farthest from the side wall).

In accordance with the third example above, the support structure can extend into the insert bore. In that case, there would extend a slight gap between the support structure and the inner surface of the insert bore at the opposite portion of the cutting insert.

The presence of the support surface provides back support for the head portion of the fastening member on a side opposite that of the portion of the cutting insert closer to the side wall. One of the benefits of such a support surface is in preventing bending and deformation of the securing member when inserted into the seat bore.

Specifically, when the securing member is moved deeper into the seat bore, the head portion applies pressure to the portion of the cutting insert adjacent the side wall. When that portion of the cutting insert is pressed against the side wall, further attempt to insert the securing member deeper into the seat bore can result in bending and deformation of the head portion with respect to the axis of the securing member, in a direction away from the side wall. This, in turn, causes an irreversible damage to the securing member as well as weakening the fastening strength on the cutting insert.

The bore axis can be angled to the at least one side wall at a positive angle so that the open end of the seat bore is the farthest portion of the seat bore from the side wall, so that when the securing member is gradually removed from the seat bore (but not all the way), the head portion moves away from the side wall of the seat.

The head portion of the securing member can comprise a conical surface. Specifically, the conical surface can have a tapering angle which is such that at least a segment thereof is parallel to the at least one side wall, in a cross section along a longitudinal axis of the fastening member.

According to a specific example, the head portion can comprise a first conical portion with an outwardly diverging tapering angle and a second conical portion with an inwardly converging conical portion, the first conical portion being configured for coming into contact with the inner surface of the cutting insert and with the support surface, and the second conical portion being configured for allowing removal of the cutting insert without obstructing it.

It is appreciated that the shape of the head portion is designed in a manner complimentary with the insert bore, so that it does not obstruct the cutting insert when attempting to pull it over the head portion.

The tapering angle of the second conical portion can be half the angle between the base surface and the side wall. In addition, at least a segment of said second conical portion can be parallel to the inner surface of the cutting insert, in a cross section along a longitudinal axis of the fastening member. Furthermore, the tapering angles can be such that at least a segment of said second conical portion is parallel to a segment of the first conical portion, in a cross section along a longitudinal axis of the fastening member.

In operation, in transition between the mounting position and the securing position, the conical portion can perform lateral displacement of towards the at least one side wall, due to the angled axis of the bore, and vise versa.

According to a particular example, the screw can have an inscribing cylinder which is not greater in diameter than the insert bore. As a result, in the mounting position of the securing member, a cutting insert can be placed into the seat by slipping its insert bore over the head portion.

The securing member can be a fastening screw, and the head portion can comprise a port for a designated tool such as a screw-driver to be received therein. Alternatively, or in addition, the distal end of the securing member can comprise a secondary port allowing an operator to access the securing member therefrom.

The fastening screw can comprise a shank portion and a threaded portion, and said seat bore can have corresponding non-threaded and threaded portions respectively, configured for properly accommodating the screw.

According to one example, said non-threaded portion can be of a larger diameter than said shank portion. Alternatively, according to another example, said non-threaded portion can be of a diameter corresponding to the diameter of the shank portion.

The side wall can comprise a support portion and a cut-out portion disposed between the base surface and the support portion, wherein said support portion is configured for engaging an external surface of the cutting insert and said cut-out is configured for remaining out of contact with the external surface.

Under this arrangement, pressing the cutting insert towards the at least one side wall entails application of pressure on the top portion of the external surface, due to its contact with the support portion, while a bottom portion of the external surface is free of contact. Thus, there is applied a combined force of the cutting insert by which the portion of the cutting insert remote from the side wall is pressed down onto the base surface, thereby preventing lifting of the cutting insert during a cutting operation.

According to one example, the seat can comprise a first and a second side wall, angled to one another to form a corner, and the seat bore can be angled to the base surface and towards said corner.

According to a specific design embodiment, the fastening screw is not threadingly engaged with the seat bore, but rather said cutting tool holder further comprises a thread element received within a channel intersecting said seat bore, and comprises an inner thread configured for engaging the clamping screw.

The thread element can be configured for performing at least one of the following:
revolving about an axis of the channel; and
axially displacing along the channel.

According to another aspect of the subject matter of the present application, there is provided a method for mounting a cutting insert onto a seat of a cutting tool holder according to the previous aspect in order to form a cutting tool, said method including the steps of:
a) displacing the fastening member into the mounting position, while a distal end thereof is still received within the seat bore;
b) placing the cutting insert onto the seat, slipping the insert bore over the head portion of the fastening member; and
c) displacing the fastening member into the securing position.

The insert bore of the cutting insert configured for being mounted onto the cutting tool holder can comprise a first inner surface configured for coming in contact with the securing member of the cutting tool holder, and a second inner surface configured for providing sufficient space for mounting/removing the cutting insert from the cutting tool holder.

According to a particular example, the first inner surface can be conical and tapering at an angle complimentary to that of the securing member, and the second inner surface can be cylindrical. The first and second inner surfaces can merge at the base of the cone, so that the diameter of the cylindrical portion is equivalent to the diameter of the base of the conical portion.

The cutting insert can be reversible.

In accordance with one example, the inner surface of the insert bore of the cutting insert can comprise a plurality of first contact surfaces associated with the top face of the cutting insert and a plurality of second contact surfaces associates with the bottom face of the cutting insert. The first and second contact surfaces are configured for coming into contact with the head portion of the securing member. The first contact surfaces and the second contact surfaces can be arranged alternately along the inner surface of the insert bore.

In addition, the cutting insert can comprise a plurality of first passage cut-outs associated with the bottom face of the cutting insert and a plurality of second passage cut-outs associates with the top face of the cutting insert, and configured for allowing the shank of the securing member to pass into the seat bore.

According to another design embodiment, the inner surface of the insert bore can comprise a plurality of projection, each having a contact surface configured for coming into contact with the head portion of the securing member. This cutting insert can be configured for mounting onto a support structure projecting into the seat and configured for being received within the insert bore.

The arrangement is such that the support structure has a an inscribing circle of a diameter corresponding to that of the insert bore, while the projections have an inscribing circle which is of smaller diameter.

Under the above arrangement, on the one hand, attempting to mount a cutting insert with a regular cylindrical bore of a diameter corresponding to that of the support structure, without projections, will prevent the head portion of the securing member from properly coming in contact with the inner surface of the cutting insert, thereby preventing proper securing thereof. On the other hand, attempting to mount a cutting insert with a regular cylindrical bore of a diameter corresponding to that of the smaller inscribing circle of the projections will prevent the support structure from being properly received therein, thereby, again, preventing proper securing of the cutting insert within the seat. Therefore, only the above described type of insert (or similar) can be used with such a cutting tool holder.

According to yet another example, the side wall of the seat can be angled to the base surface at an acute angle, and the head portion can have a first and second tapering portions, thereby yielding a 'dove-tail' securing of the cutting insert. In particular, the distance between the base of the conical portion and a first point on the side wall is smaller than the distance between any other point on the cone and a second point on the side wall, closer to the base surface.

According to yet another aspect of the subject matter of the present application, there is provided a cutting tool comprising a cutting tool holder and a cutting insert according to the previous aspects of the present application.

According to yet another aspect of the subject matter of the present application there is provided a cutting tool holder adapted for mounting thereon a cutting insert having a top face, a bottom face and formed with an insert bore having an inner surface extending between said top and said bottom face; said holder comprising a seat defined by a bottom surface and at least one side wall angled to said bottom surface, a seat bore with a bore axis angled to said at least one side wall and having an open end at the bottom surface of said seat, and a clamping screw for securing said cutting insert in said seat, said screw having a head portion, and is configure for displacing between at least a first, mounting position in which said head protrudes from within the seat bore through said bottom surface into said seat to a first extent, defining a first gap distance between said head portion and said at least one side wall allowing said cutting insert to be placed within the seat, having its bottom face aligned against said bottom surface as well as being fully removed therefrom, and a second, securing position in which said head portion protrudes from within the seat bore through said bottom surface into said seat to a second extent, smaller than said first extent, defining a second gap distance between said head portion and said at least one side wall smaller than said first gap distance, so as to engage the inner surface of said insert bore, thereby securing said insert between the head portion and the at least one side wall, wherein said clamping screw is not threadingly engaged with the seat bore, and wherein said cutting tool holder further comprises a thread element received within a channel intersecting said seat bore, and comprises an inner thread configured for engaging the clamping screw.

According to still another aspect of the subject matter of the present application there is provided a cutting tool holder adapted for mounting thereon a cutting insert having a top face, a bottom face and an insert bore extending between said top face and said bottom face, and having an inner surface; said holder comprising a seat defined by a base surface and at least one side wall angled to said base surface, a seat bore extending along a bore axis, and having an open end at said base surface; a securing arrangement comprising a securing member extending between a proximal end and a distal end, the securing member having a head portion at said proximal end and having its distal end received within said seat bore, and a displacement arrangement adapted to displace the securing member along the bore axis of said seat bore between a mounting position in which said head portion protrudes from within the seat bore through said base surface into said seat to a first extent, defining a first gap distance between said head portion and said at least one side wall allowing said cutting insert to be placed within the seat and/or being fully removed from the seat, and a securing position in which said head portion protrudes from within the seat bore through said base surface into said seat to a second extent, smaller than said first extent, defining a second gap distance between said head portion and said at least one side wall smaller than said first gap distance, so as to engage the inner surface of said insert bore, thereby securing said insert between the head portion and the at least one side wall, and wherein the seat bore is angled to the base surface said base surface and the head portion of the screw comprises a contact portion which is so angled with respect to the axis of the screw that, at least in said securing position, the contact portion is configured for engaging the base surface of the seat for providing support to the head portion.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
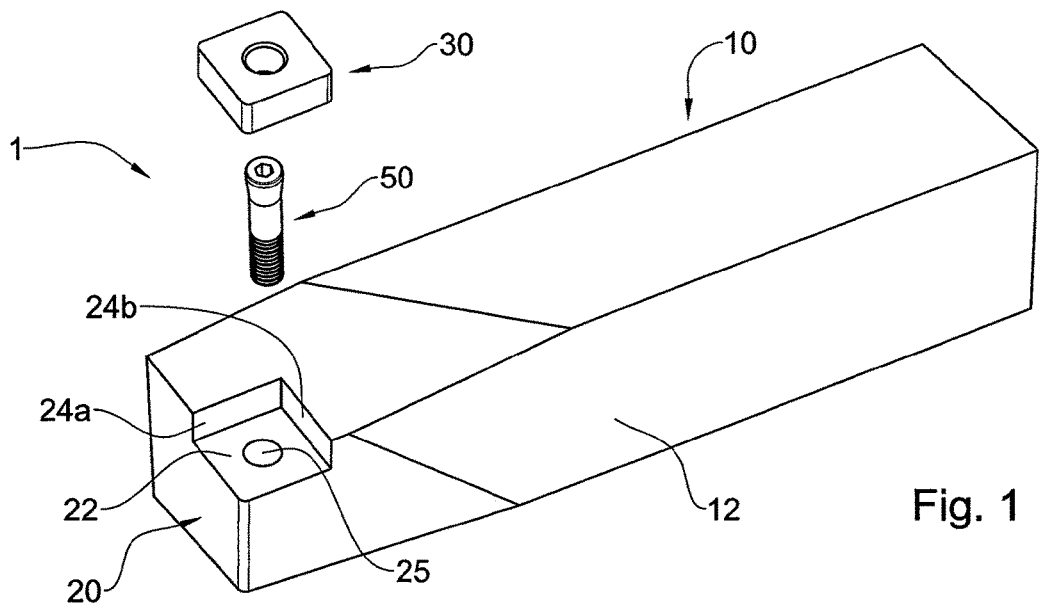
FIG. 1 is a schematic exploded isometric view of a turning tool according to the subject matter of the present application.

Attention is first drawn to FIG. 1 in which a turning tool is shown, generally designated as 1 and comprising a holder 10 formed with a seat (also referred herein as 'a pocket'), a cutting insert 30 configured for being placed within the pocket 20 and a securing mechanism in the form of a fastening screw 50 configured for securing the cutting insert 30 within the pocket 20. The cutting insert 30 is formed with at least two cutting edges 32 defined at the intersection between respective rake and relief surfaces 34, 36.

Turning now to FIGS. 2A to 2E, respective open and closed positions of the securing mechanism 50, i.e. positions in which the cutting insert 30 is free and secured to the pocket 10 respectively.

Figure 2A:
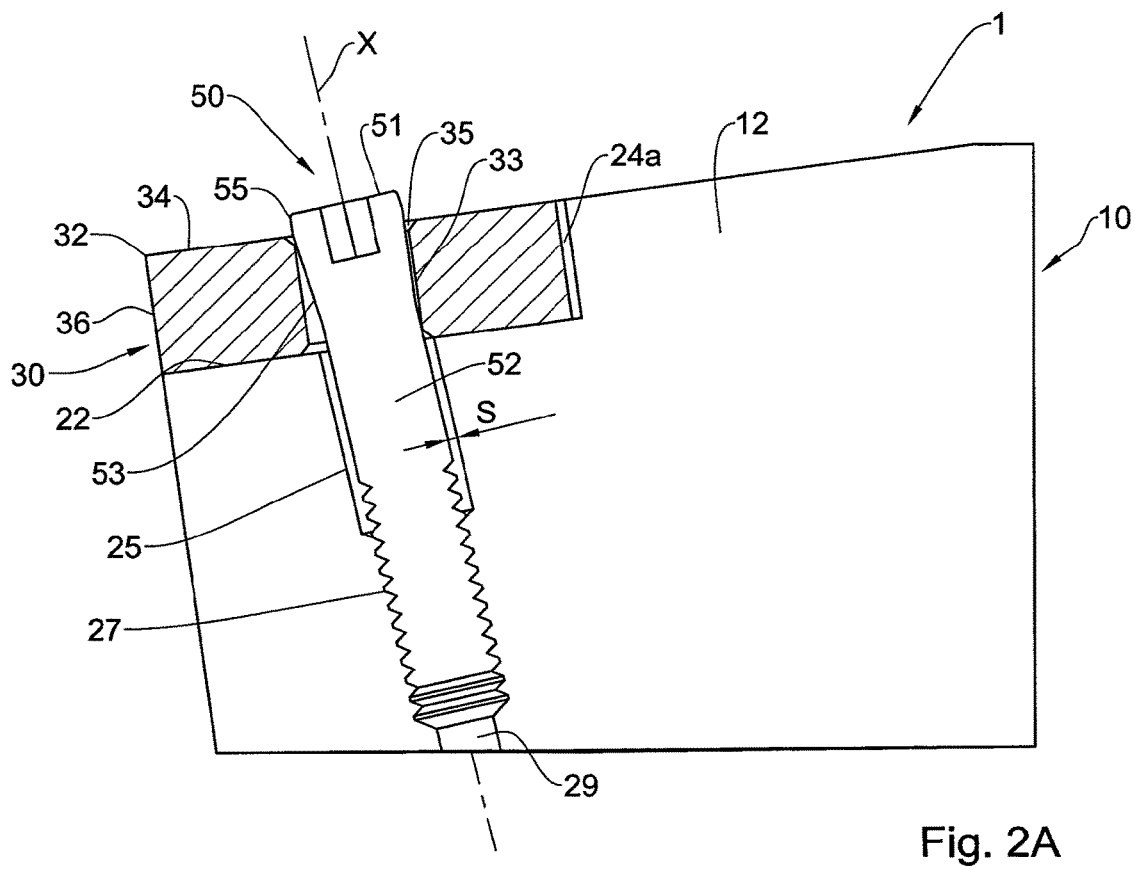
FIG. 2A is a schematic section view of the turning tool shown in FIG. 1.

With particular reference being made to FIG. 2A, the seat 20 comprises a bottom base 22 and two side walls 24a, 24b (shown FIG. 1) and configured for receiving thereon the cutting insert 30 such that the bottom face 31B of the cutting insert 30 is flush against the base surface 22.

The holder 10 comprises a body 12 formed with a seat bore 25 having a threaded portion 27 and a bottom access bore 29, the seat bore 25 being configured for receiving therein the fastening screw 50.

The fastening screw 50, in turn, has a body 52 and a head portion 51 at a proximal end thereof, the head portion 51 being formed with opposite cone-geometry having a first conical portion 53 and a second conical portion 55, of opposite tapering angles. The arrangement is such that when the fastening screw is received within the seat bore 25, first conical portion 53 extends parallel to the side wall 24a of the seat 20, owing the angle α between the axis of the seat bore 25 and the side wall 24a.

Specifically, the first conical portion 53 has as tapering angle of 5° with respect to the central axis of the fastening screw 50, and the second conical portion 55 has an opposite tapering angle of 5°.

One of the advantages of such a slight angle of the conical portion is that a reasonably small number of turns of the screw 50 in order to fasten the cutting insert 30. Specifically, 2-3 revolutions of the screw 50 are sufficient for bringing it into the first, open position.

Furthermore, the small tapering angle of the conical portion 53 allows for the use of a generally small diameter of the screw 50 with respect to the bore 35 of the cutting insert. In the specific example, the insert bore 35 is of a diameter of 6 mm while the screw 50 has a diameter of 5 mm.

In addition, the above arrangement orients the first conical portion 53 directly along the insert bore 35 of the cutting insert 30, allowing appropriate contact between the head portion 51 and the insert 30 during the secured position thereof.

Figure 2B:
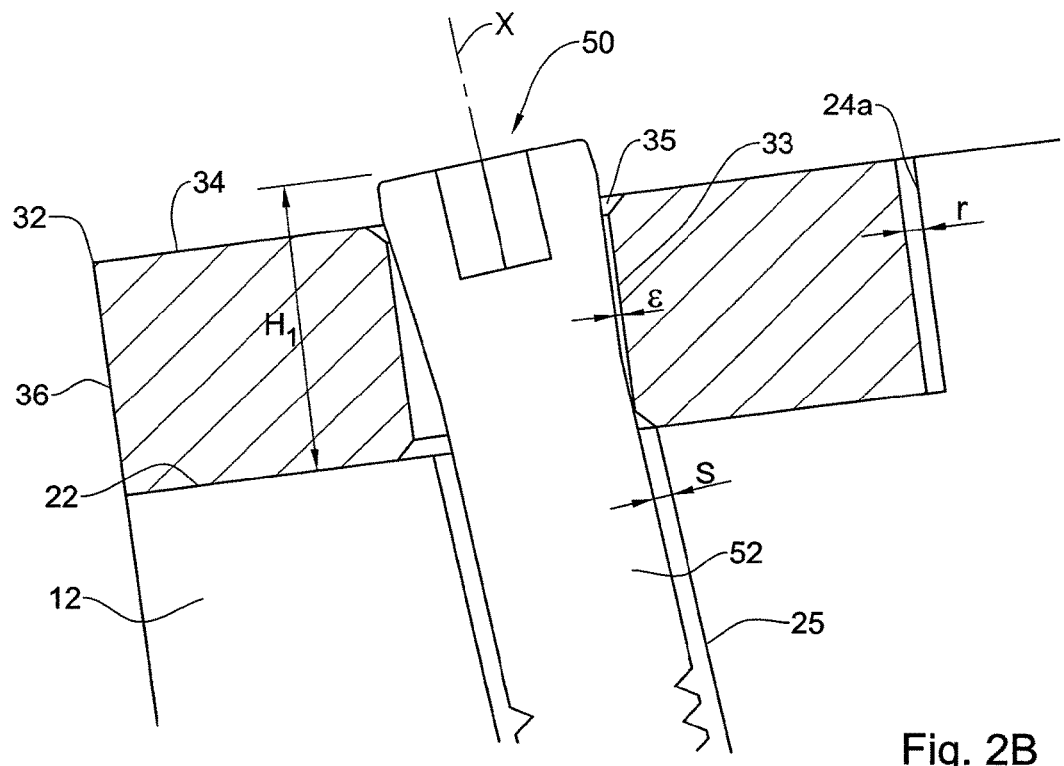
FIGS. 2B and 2C are schematic enlarged section and isometric views of the turning tool shown in FIG. 2A, in an open position of a securing mechanism thereof.
Figure 2C:
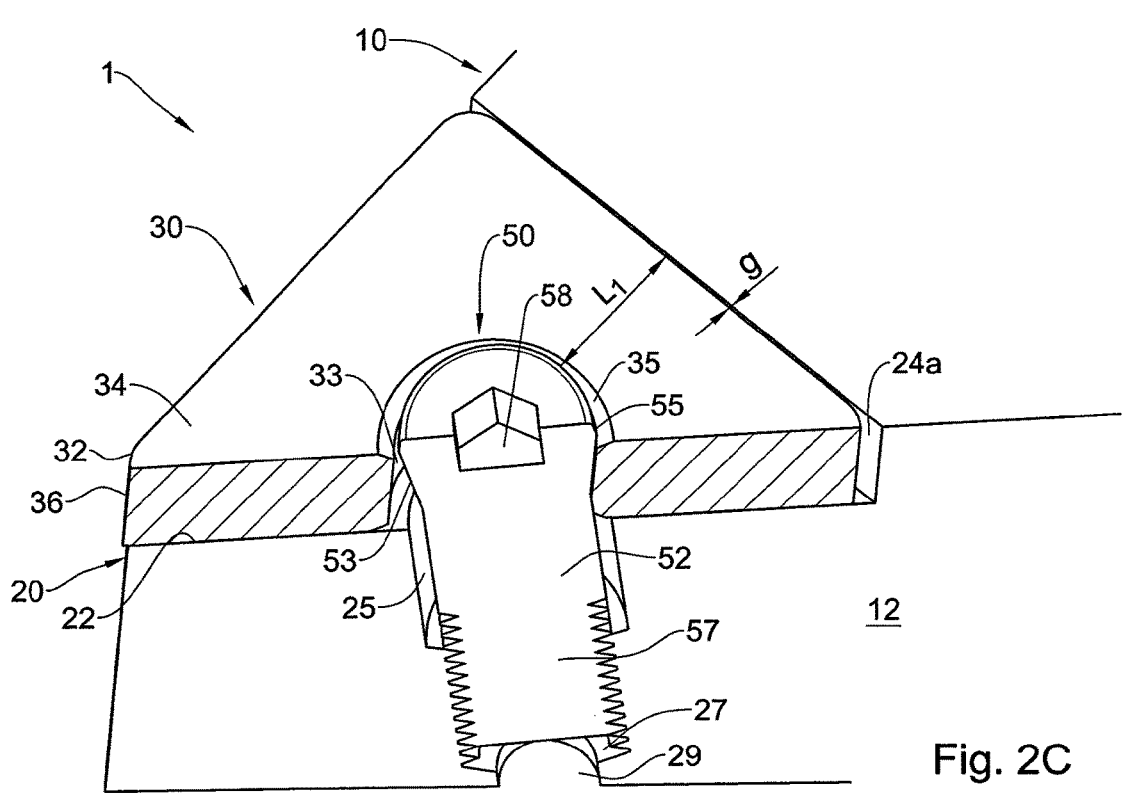

With particular reference being made to FIGS. 2B and 2C, the fastening screw 50 is shown in a first, open position thereof, in which the screw 50 is received within the seat bore 25 so that the head portion 31 projects into the seat 20 to a first extent H1, and is spaced from the side wall a first gap distance L1. There also extends a gap g between the cutting insert 30 and the wall 24a, and a slight gaps between the conical portion 53 and the inner surface of the cutting insert 30.

In the above position, the cutting insert 30 can be placed onto the seat 20 so that the insert bore 35 is passed over the entire head portion 31, and can also be removed therefrom as will be described with respect to FIGS. 3A to 3E.

Figure 2D:
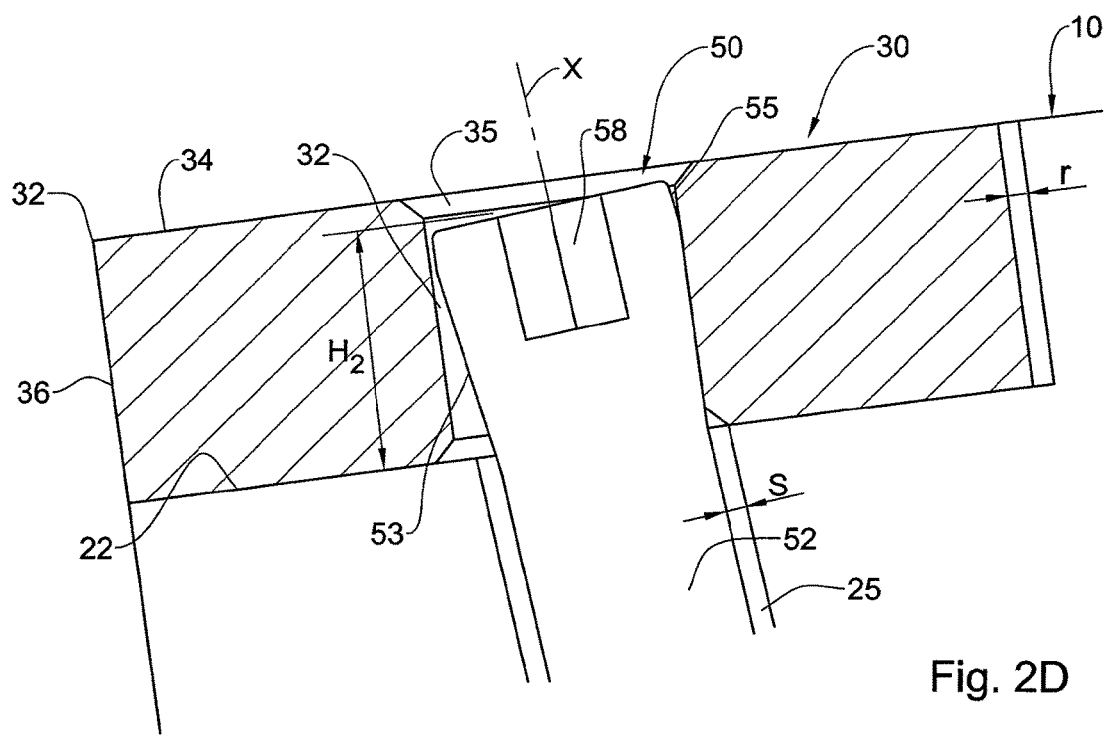
FIGS. 2D and 2E are schematic enlarged section and isometric views of the turning tool shown in FIG. 2A, in a closed position of a securing mechanism thereof.
Figure 2E:
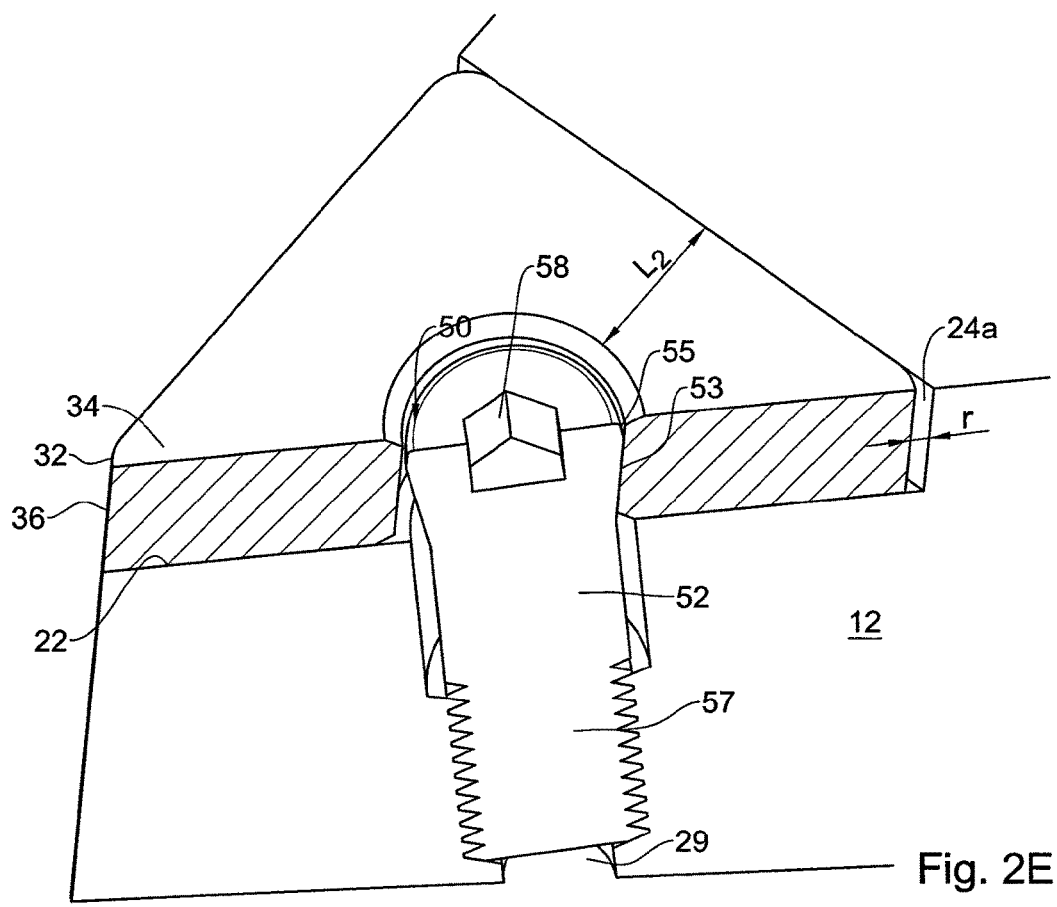
Figure 3A:
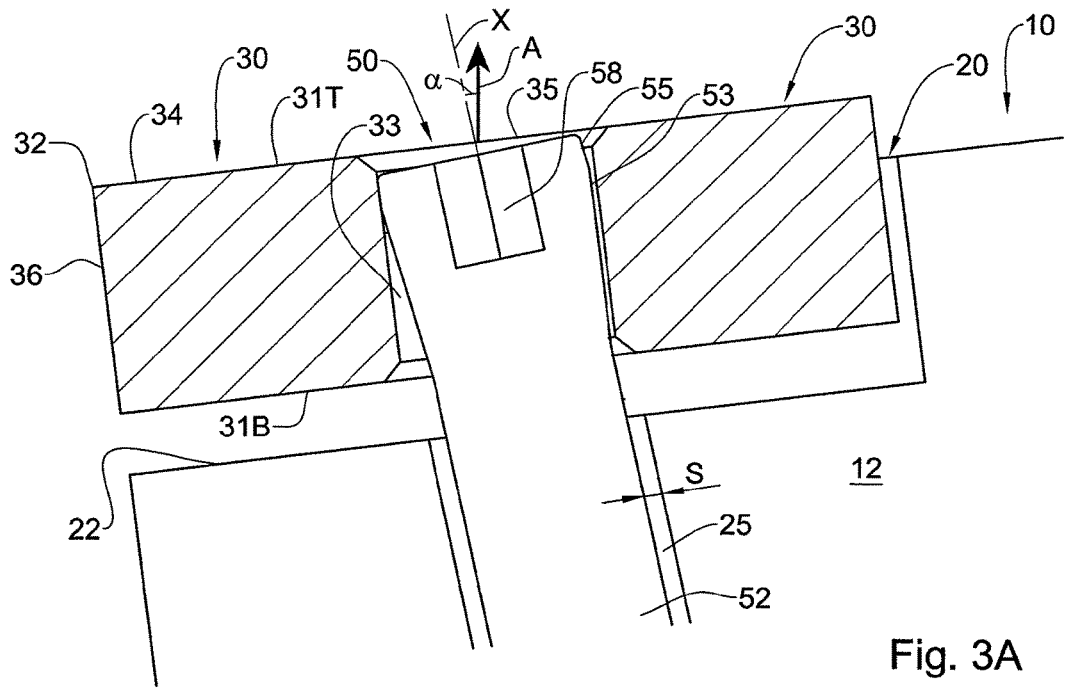
FIGS. 3A to 3E are schematic section views demonstrating consecutive steps of removing a cutting insert from the turning tool holder shown in FIGS. 2A to 2C.
Figure 3B:
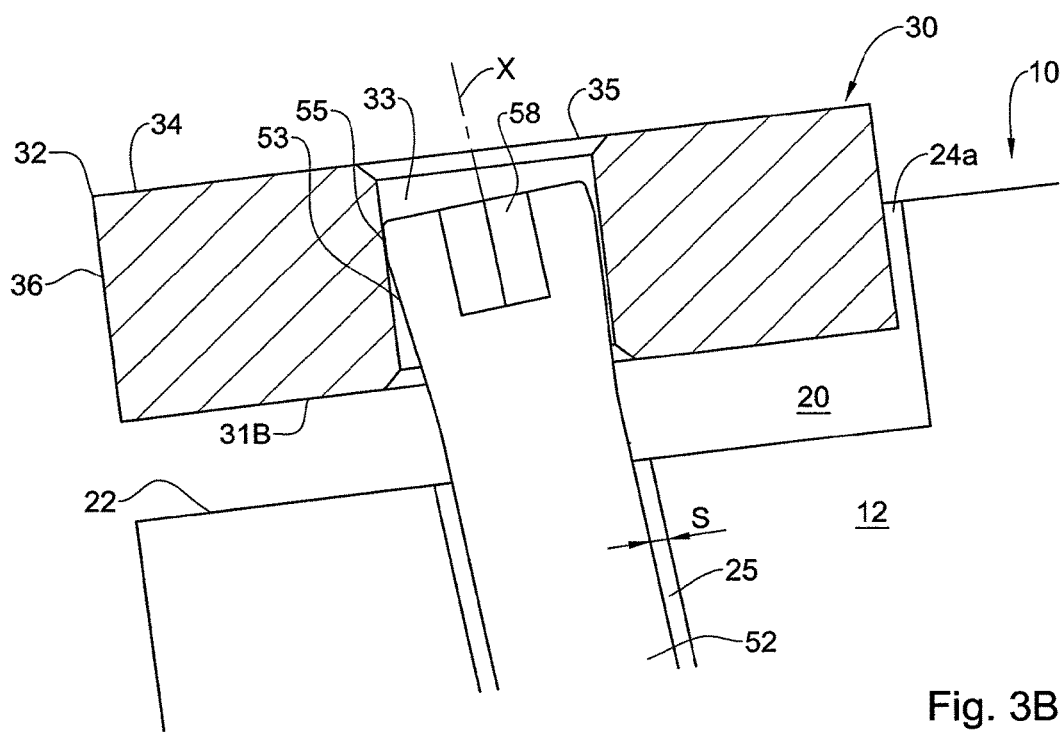
Figure 3C:
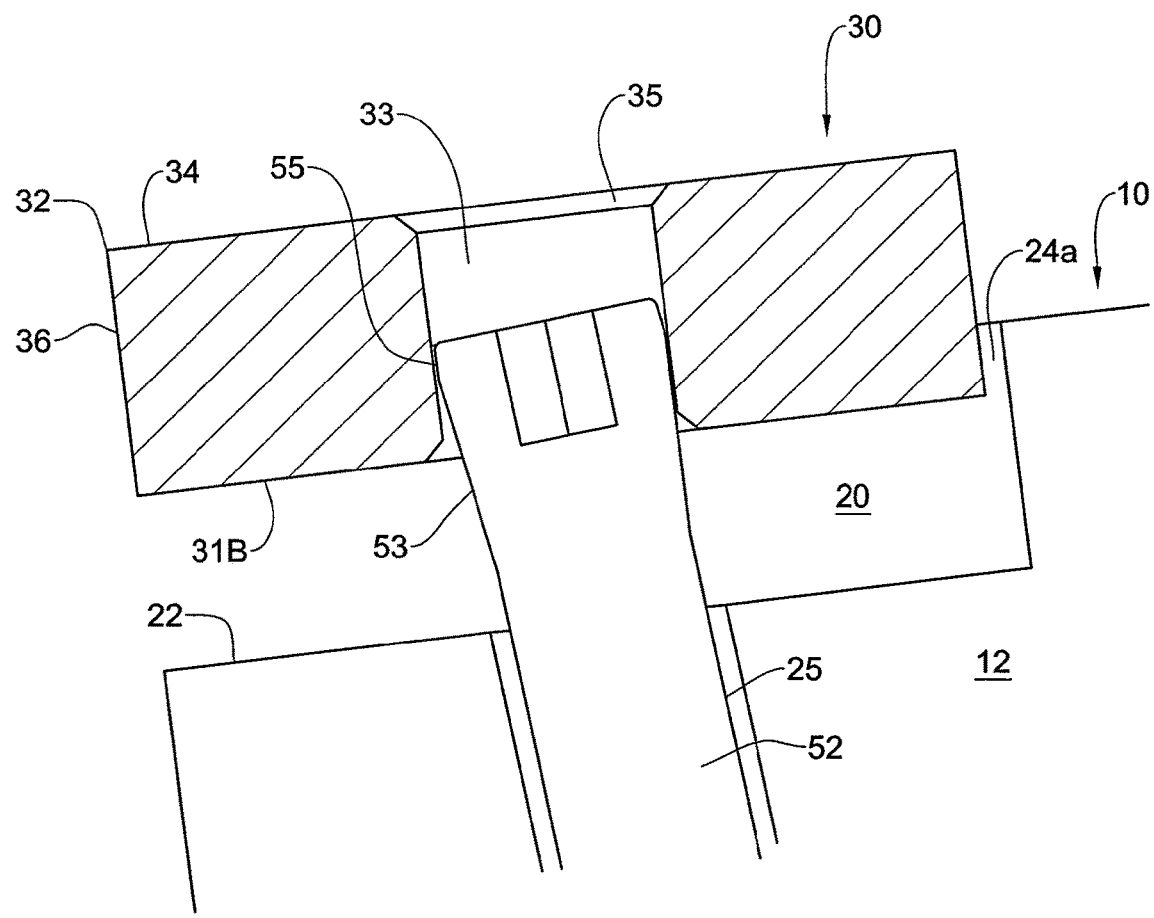
Figure 3D:
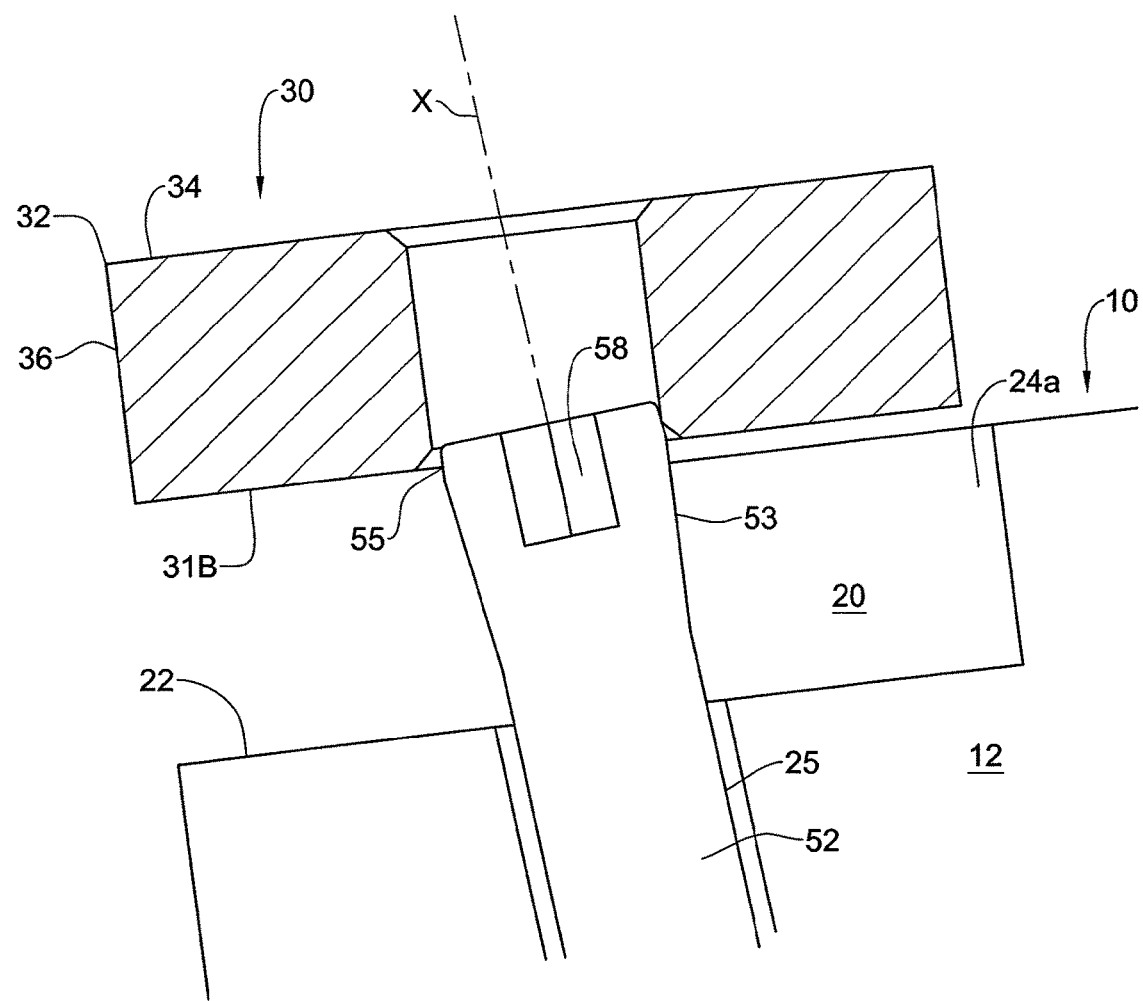
Figure 3E:
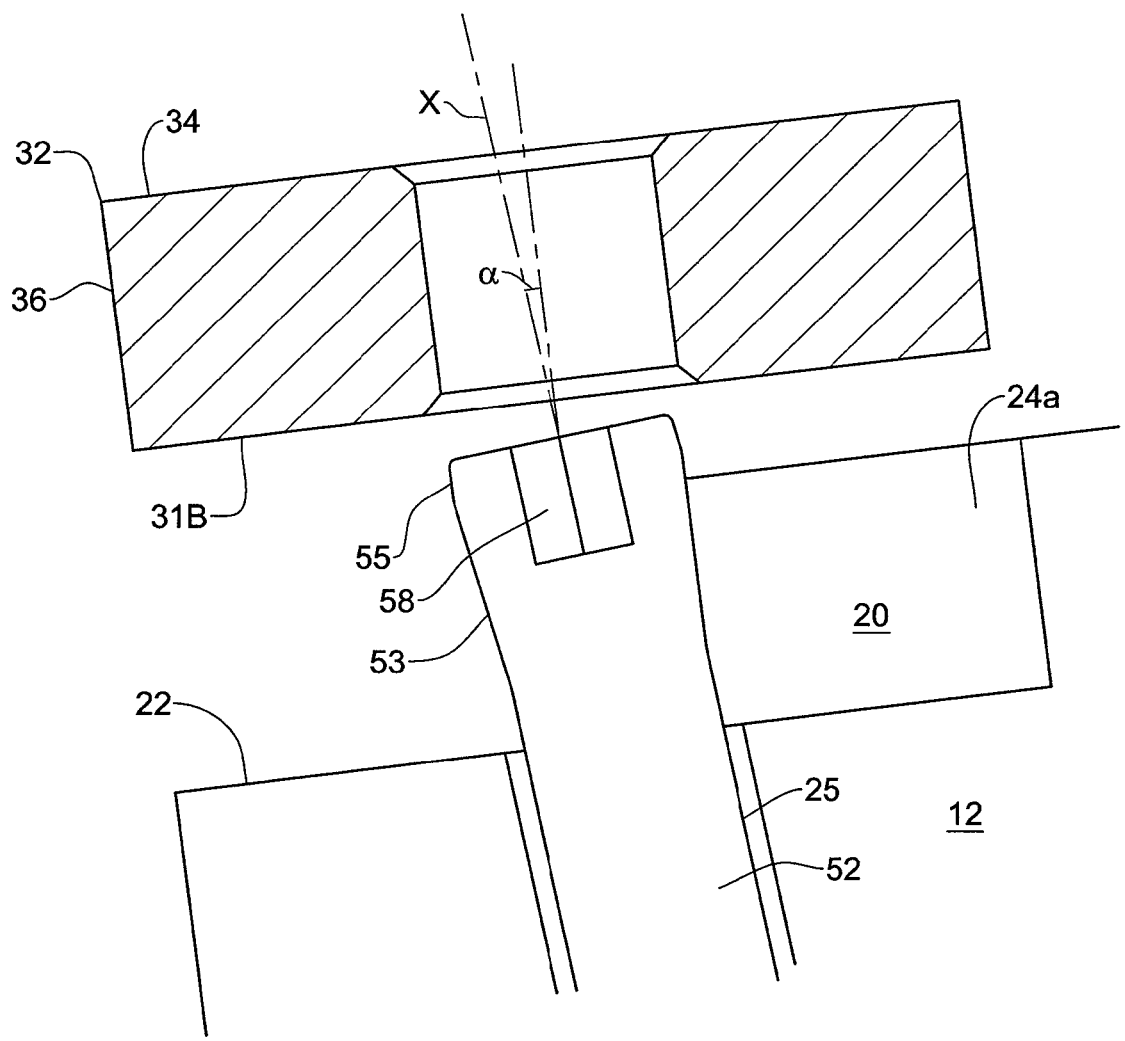

Once the cutting insert 30 is in position, the fastening screw 50 can be further threaded, reaching the position shown in FIGS. 2D and 2E. As will be observed, in this second, closed position, the fastening screw 50 projects into the seat 20 to a first extent H2<H1, and is spaced from the side wall a first gap distance L1<L2.

In effect, during the transition from the first position to the second position, the surface of the first conical portion 53 displaces laterally towards the side wall 24a, thereby fastening the corresponding portion of the cutting insert 10 between the conical portion 53 and the side wall 24a.

It is observed that during the above transition, the fastening screw 50 also displaces downwards, thereby applying some downward pressure on the cutting insert 30, so that it presses the cutting insert 30 not only towards the side wall 24a, but also towards the base surface 22.

It is further observed that the first portion of the seat bore 25 is not threaded and has a slightly larger diameter than that of the shank 52 of the fastening screw 50 (see distance s). This arrangement allows for certain elastic deformation of the screw 50 in the closed position despite further threading (i.e. if it is further threaded after the cutting insert 30 is already secured). Furthermore, it is noted that the threaded portion 27 is of limited length, acting as a stop, preventing over-threading of the screw 50 beyond a certain point to subsequently prevent plastic deformation thereof.

Attention is now drawn to FIGS. 3A to 3E, demonstrating various stages of releasing the cutting insert 30 from the holder 10 when the screw 50 is in the second, open position.

As noted, when the screw 50 is threaded out (but still engaged with the seat 20 via the bore 25), the cutting insert 30 can be slipped off the head portion 51 allowing both placement and replacement of the cutting insert 30 while the screw 51 is engaged with the seat 20.

In particular, it is noted that the second conical portion 55, tapering at an opposite angle to the first conical portion 53 serves a double purpose in the above operation.

First of all, it allows removing the cutting insert 30 without coming in contact with the inner surface of the insert bore 35 (had it not been there, the inner surface would encounter the first conical portion), without reducing the depth of the screw port 58. Secondly, the second conical portion 55 serves as a guide for the cutting insert 30 during its placing in the pocket 20, aligning the inner surface of the bore 35 with the conical portion 55.

In addition, it is noted that when the screw 50 is threaded out towards the open position, the more it is threaded, the more the cutting insert 30 is pushed away from the pocket 20 by virtue of the contact between the inner surface of the bore 35 and the second conical portion 55.

Finally, it is noted that the angle of the seat bore 25 does not have to be oriented directly against the opposite corner of the working corner of the cutting insert 30 (i.e. towards the intersection between walls 24a and 24b), and can also be such that the screw applies more pressure towards one of the sidewalls than towards the other.

Figure 4A:
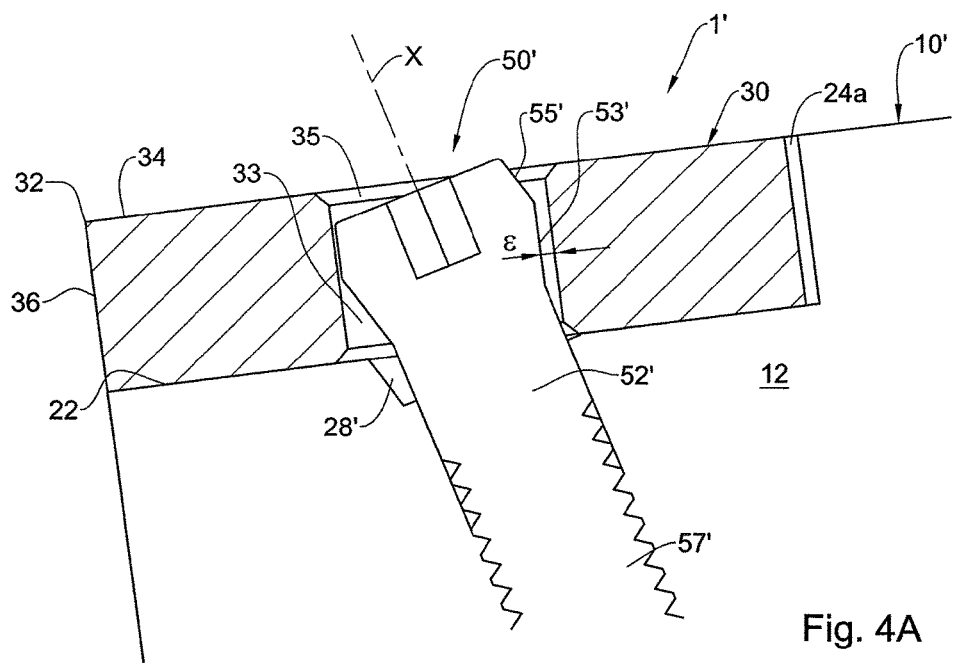
FIGS. 4A and 4B are schematic section views of a turning tool according to another example of the subject matter of the present application, shown in respective open and closed positions of the securing mechanism thereof.
Figure 4B:
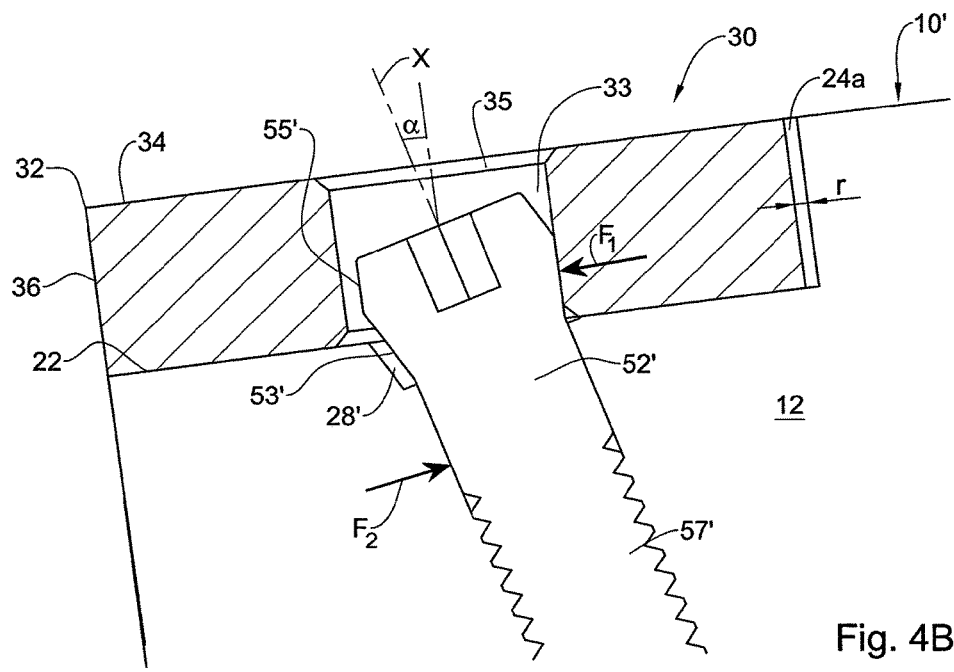
Figure 5A:
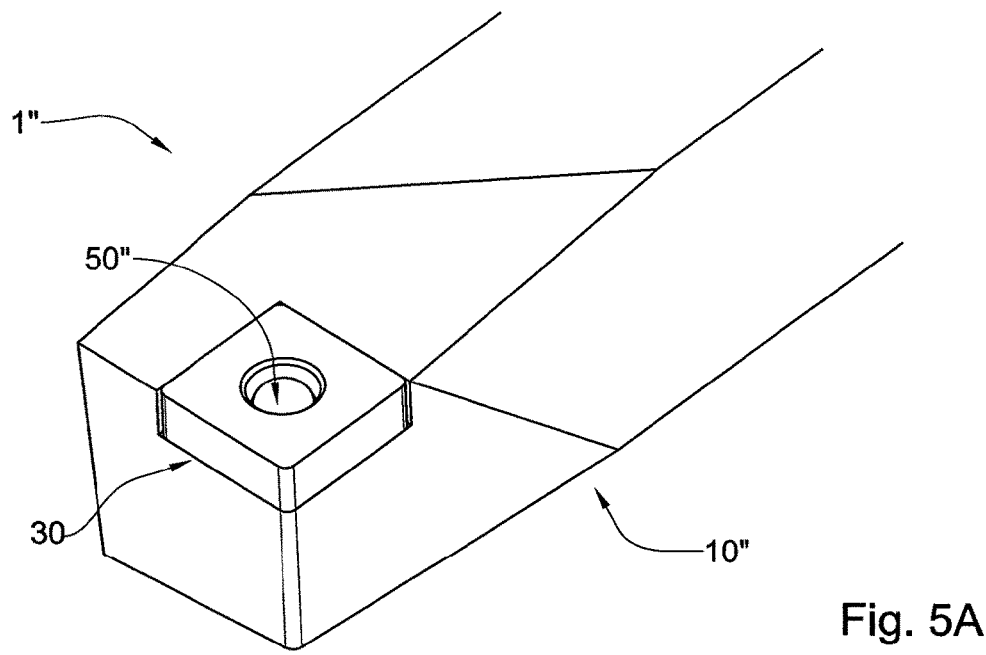
FIGS. 5A and 5B are schematic isometric and exploded isometric view of a turning tool according to yet another example of the subject matter of the present application.
Figure 5B:
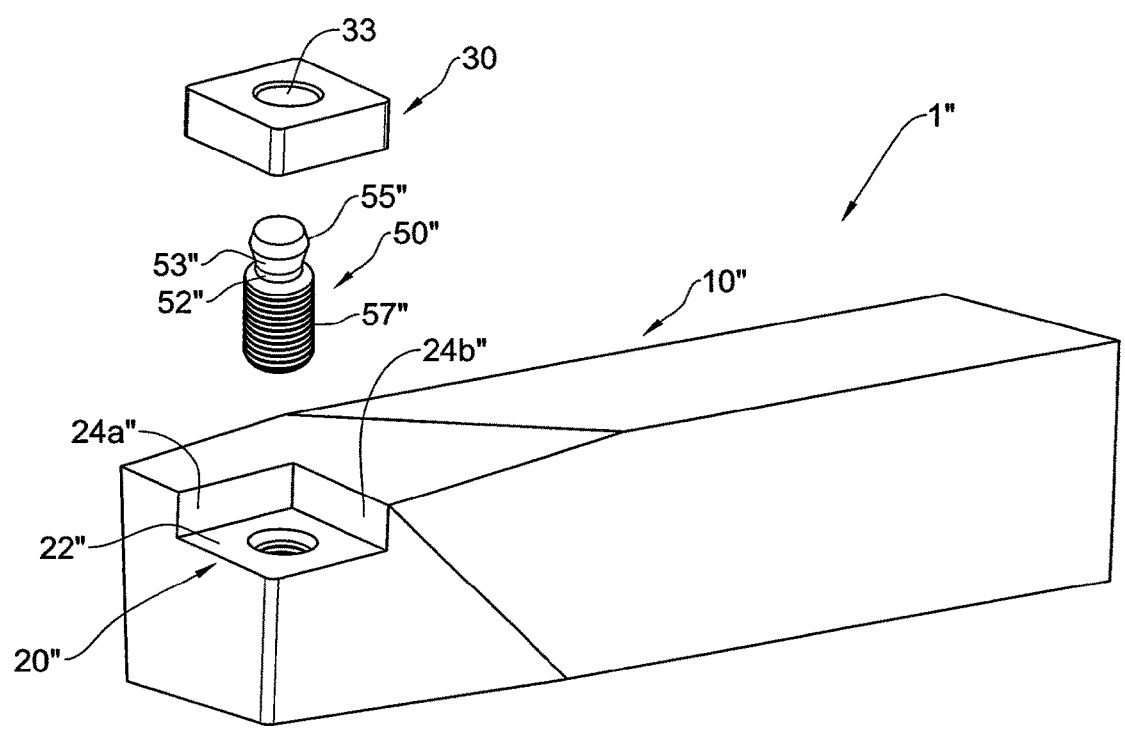
Figure 6A:
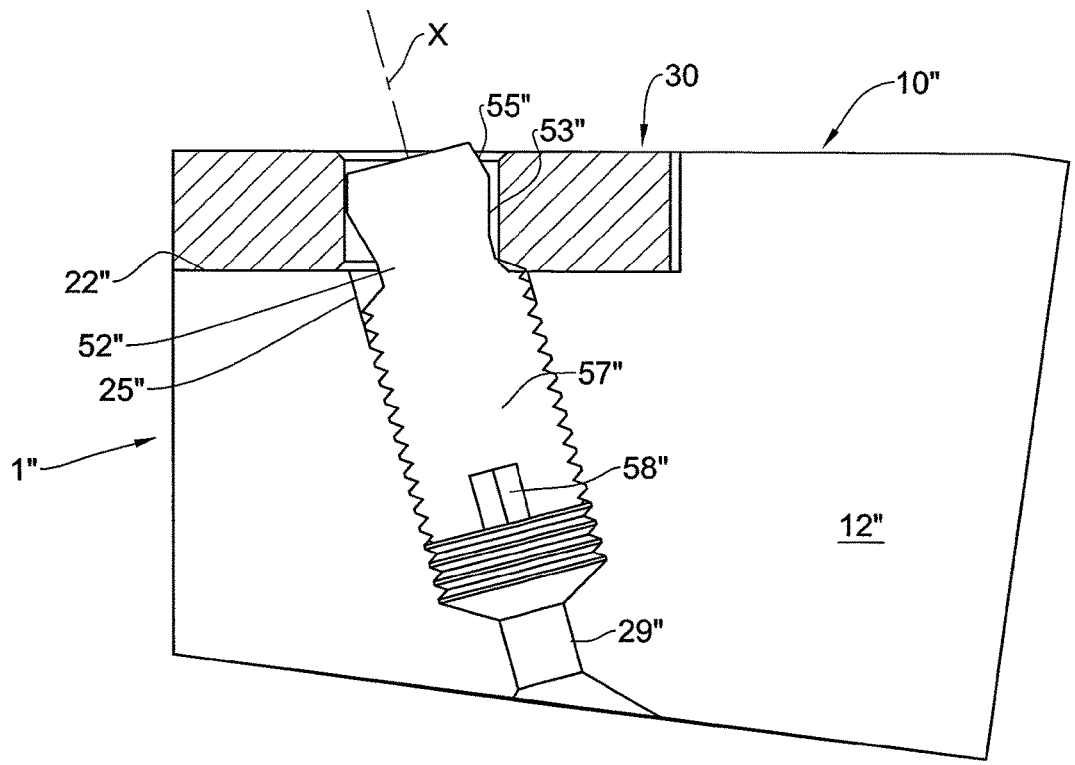
FIG. 6A is a schematic section view of the turning tool shown in FIGS. 5A and 5B, in an open position of the securing mechanism thereof.
Figure 6B:
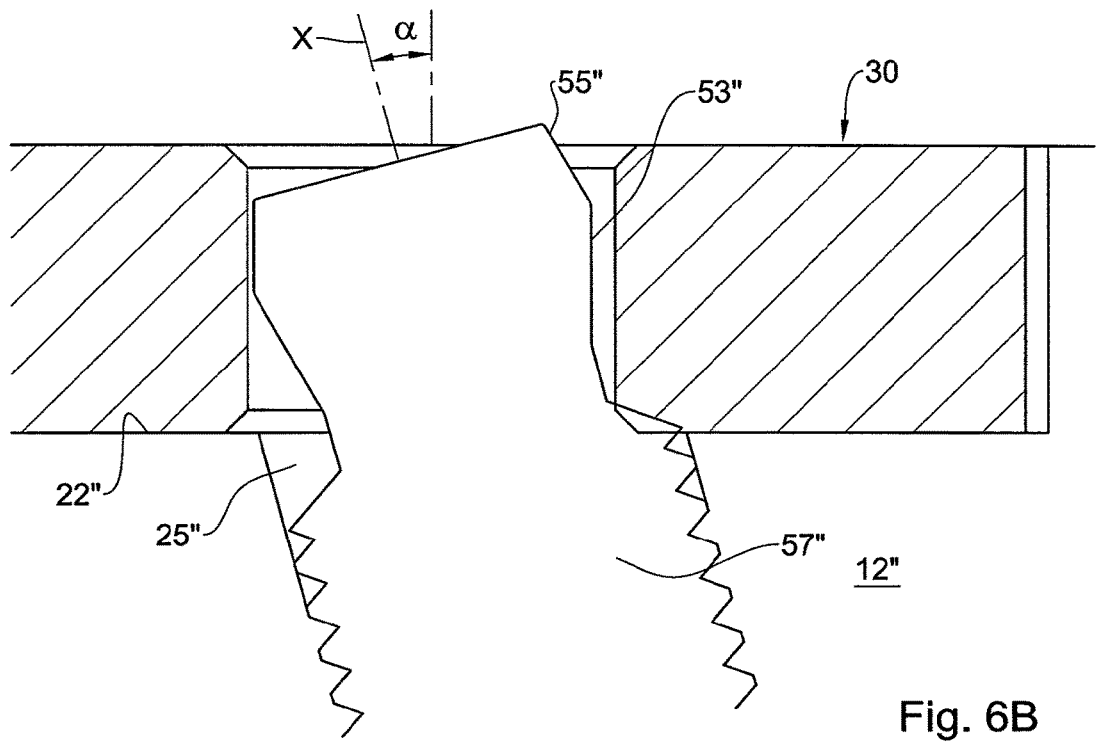
FIG. 6B is a schematic enlarged view of the securing mechanism shown in FIG. 6A.
Figure 6C:
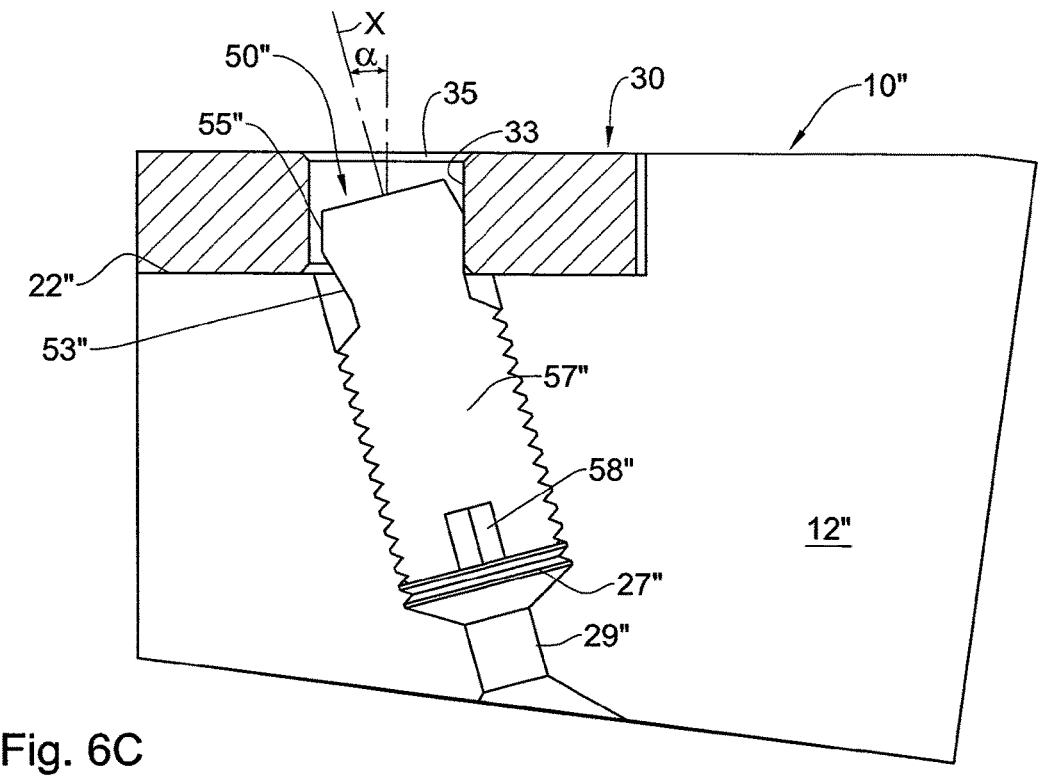
FIG. 6C is a schematic section view of the turning tool shown in FIGS. 5A and 5B, in a closed position of the securing mechanism thereof.
Figure 6D:
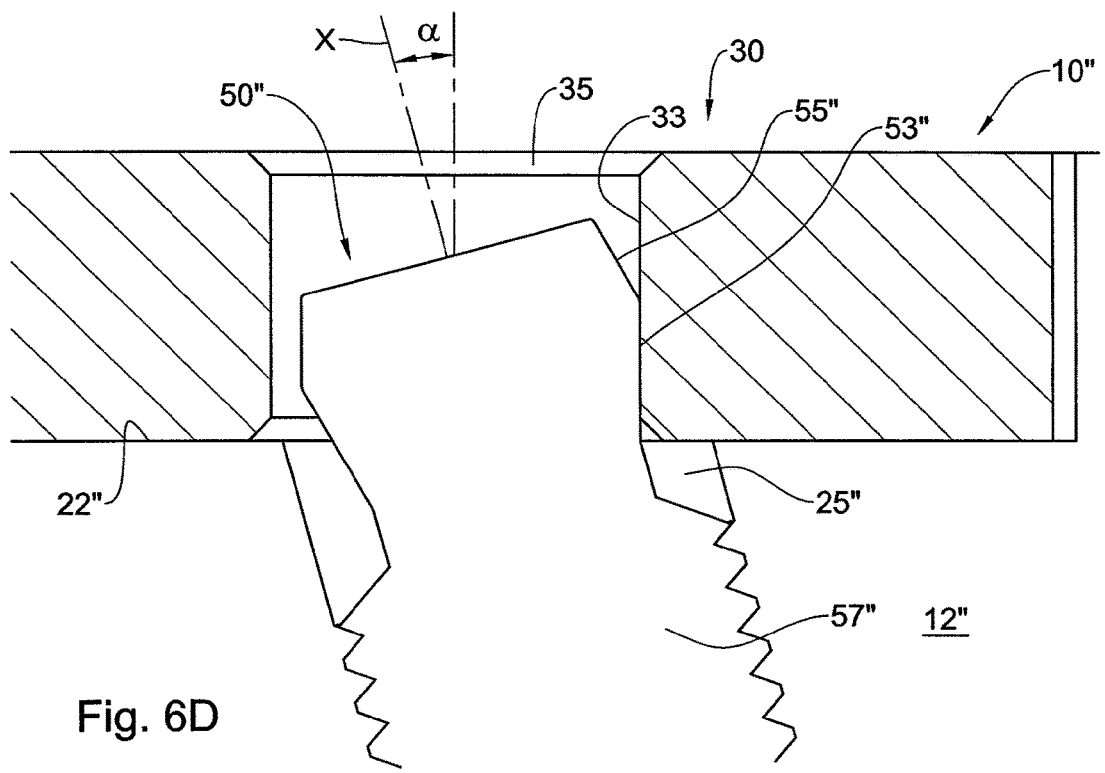
FIG. 6D is a schematic enlarged view of the securing mechanism shown in FIG. 6C.

Attention is now drawn to FIGS. 4A and 4B illustrating another example of a turning tool, generally designated as 1', and also comprising a holder 10', a seat 20', a cutting insert 30 (can be similar to that previously described) and a screw 50'.

The difference between the present example and the previously described turning tool lies in the fact that the diameter of the bore 25' of the seat 20' is matched to the diameter of the screw 50', whereby support is provided to the shank 52 of the screw 50', in the closed position (FIG. 4B) from two directions—see forces F1 and F2.

Turning now to FIGS. 5A to 6D, another example of a turning tool is shown, generally designated 1". Similar elements have been designated with similar reference numbers with the addition of ("). The turning tool 1" includes a holder 10", a pocket 20", a cutting insert 30 (can be similar to that previously described) and a screw 50".

Several differences can be clearly noted from the above mentioned figures. First of all, the screw port 58" is now located at the bottom of the screw 50" (at its distal end) whereby the head portion 51" is of full material and is not likely to collapse during transition to the closed position (by deforming the screw port). In addition, this position of the port 58" also allows easier access to the cutting insert 30 during placement and replacement thereof since the tool used to unscrew the screw 50 (hexa-screw driver) is located below the holder 10".

In addition, such access from below allows for the use of a large diameter of the threaded portion 57" of the screw 50". Furthermore, it is observed that the head portion 51" of the screw 50" is formed as a stub due to it diameter being smaller than that of the threaded portion 57", allowing for a more robust design of the screw 50".

Figure 7A:
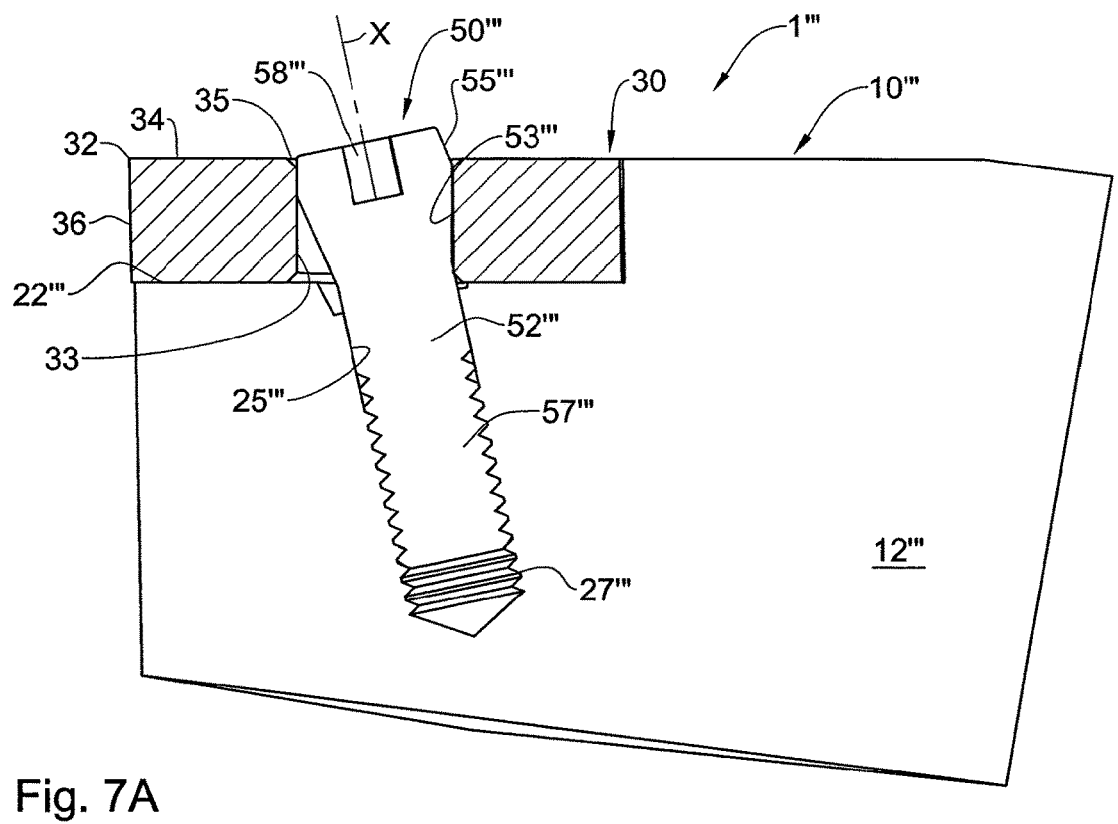
FIGS. 7A and 7B are schematic section views of a turning tool according to another example of the subject matter of the present application, shown in respective open and closed positions of the securing mechanism thereof.
Figure 7B:
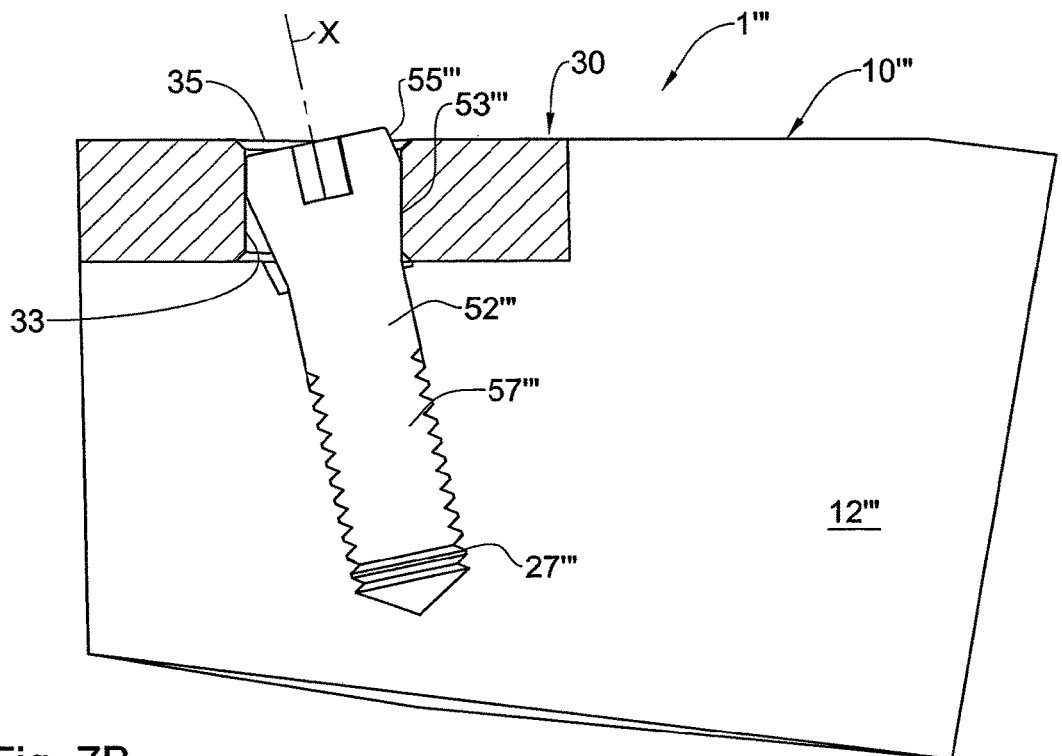

Attention is now drawn to FIGS. 7A and 7B, in which another example of the turning too is shown, generally designate as 1'''. Similar elements have been designated with similar reference numbers with the addition of ('''). The turning tool 1''' includes a holder 10''', a pocket 20''', a cutting insert 30 (can be similar to that previously described) and a screw 50'''.

The turning tool 1''' is essentially similar to that described with respect to FIGS. 4A and 4B, with the difference being that the conical portion 53''' of the screw 50''' now comes in contact with the inner surface of the bore 35 of the insert 30 along the entire length thereof, providing better support.

Figure 8A:
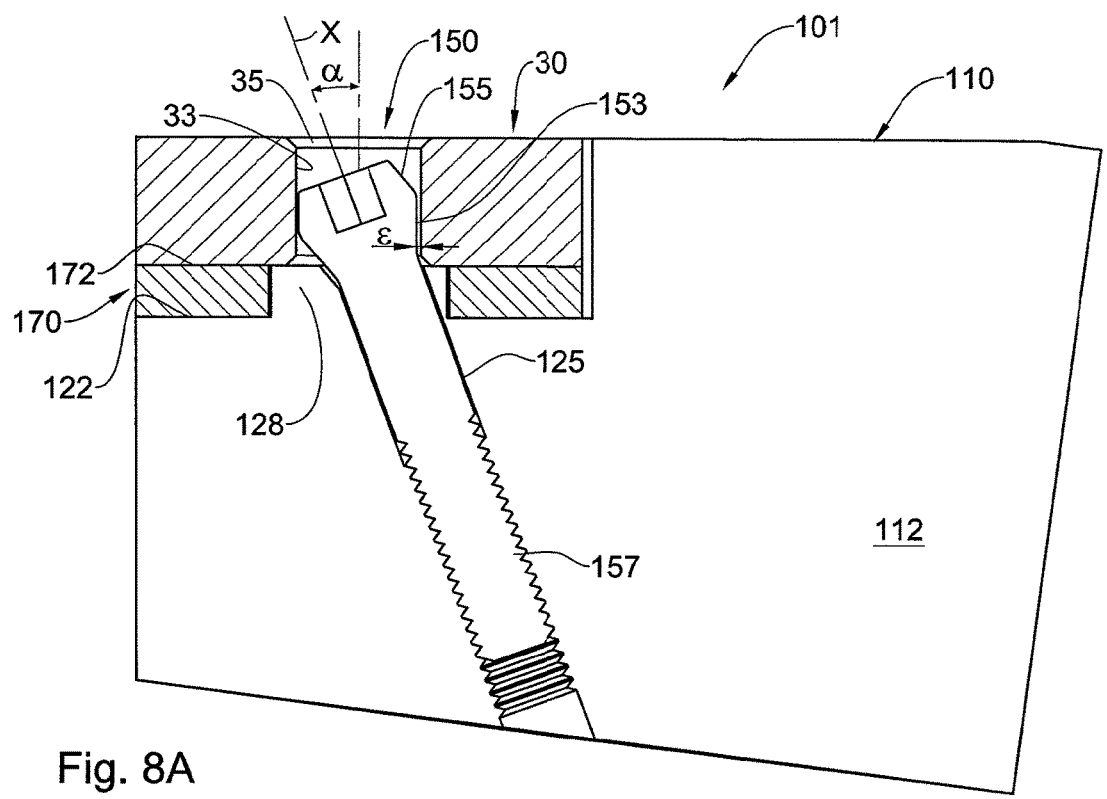
FIGS. 8A and 8B are schematic section views of a turning tool according to another example of the subject matter of the present application, shown in respective open and closed positions of the securing mechanism thereof.
Figure 8B:
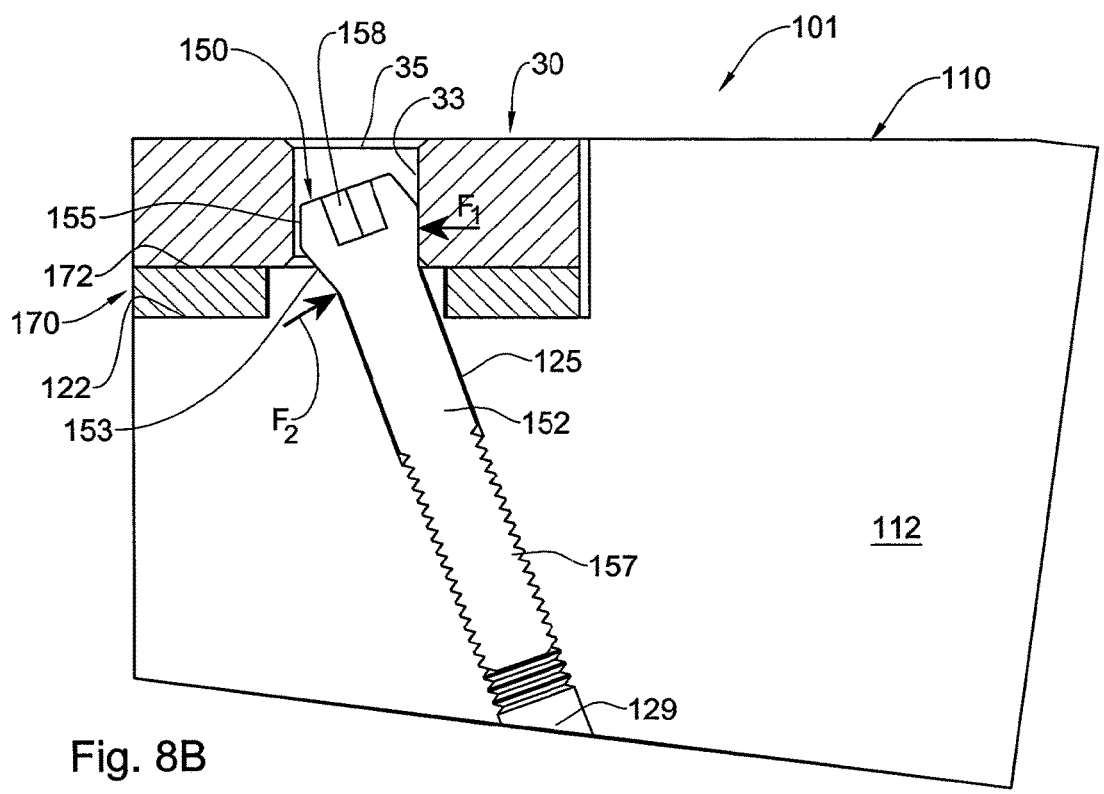
Figure 8C:
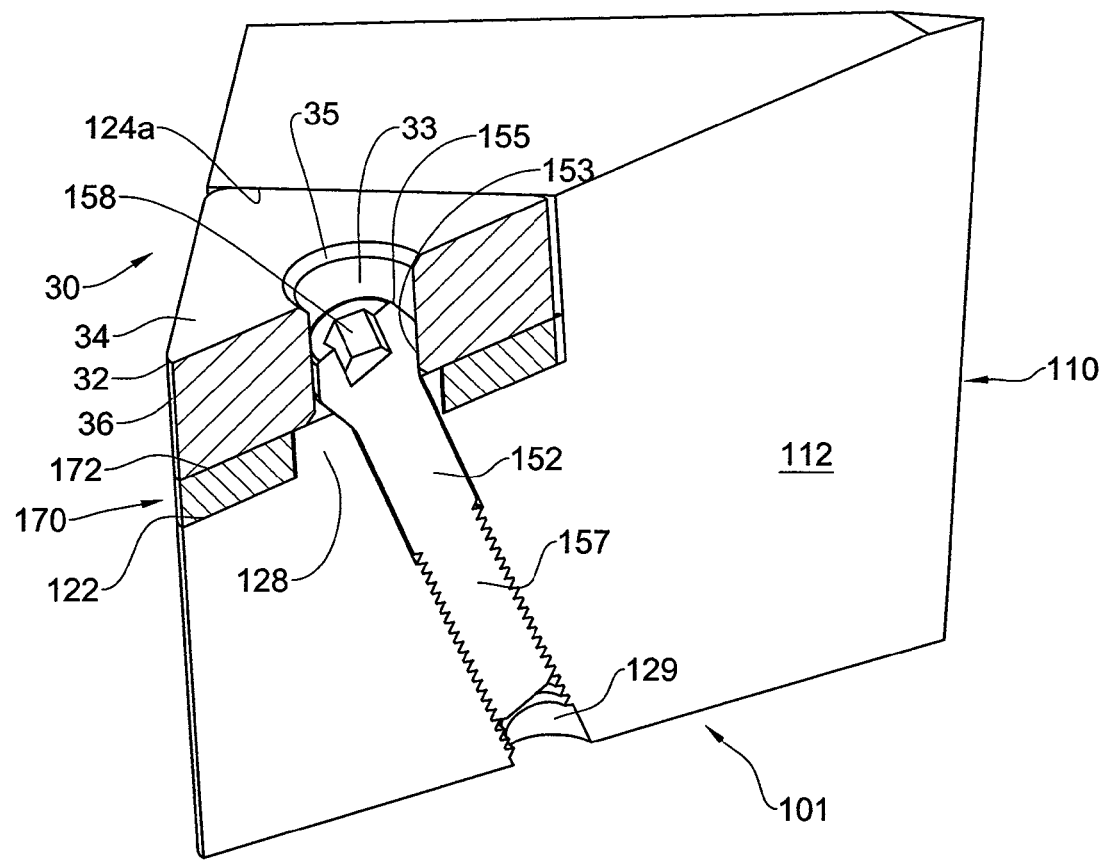
FIG. 8C is a schematic isometric view of the turning tool shown in FIG. 8B.
Figure 9A:
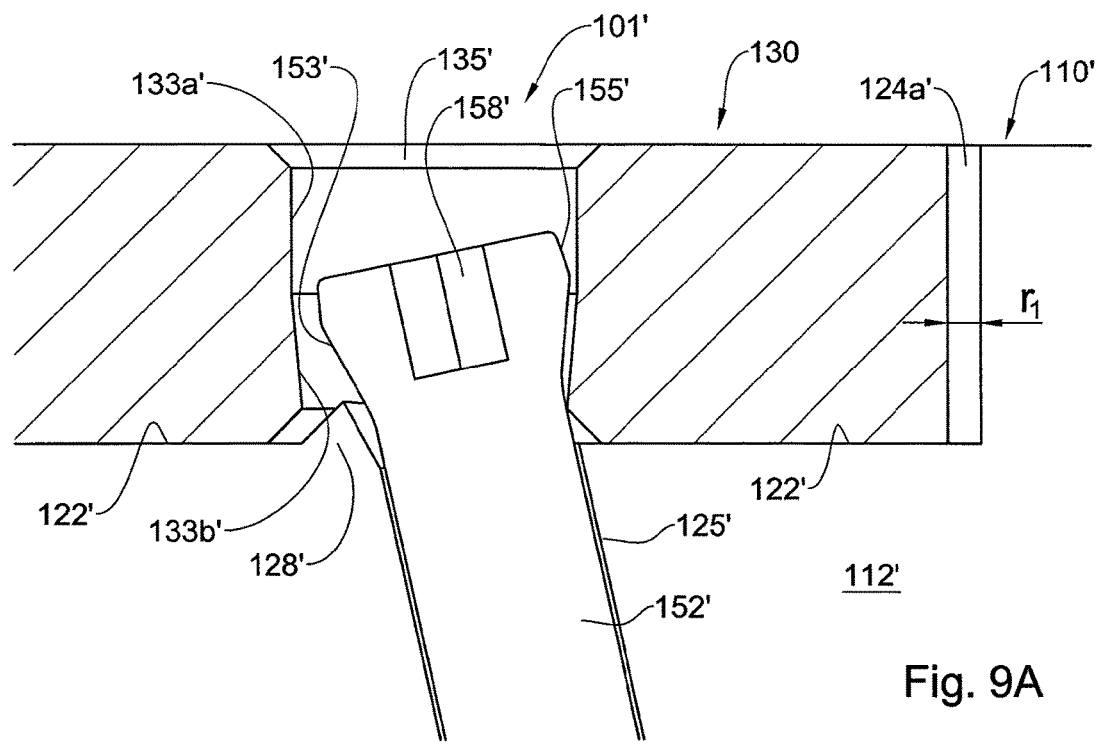
FIGS. 9A and 9B are schematic section views of a turning tool according to another example of the subject matter of the present application, shown in respective open and closed positions of the securing mechanism thereof.
Figure 9B:
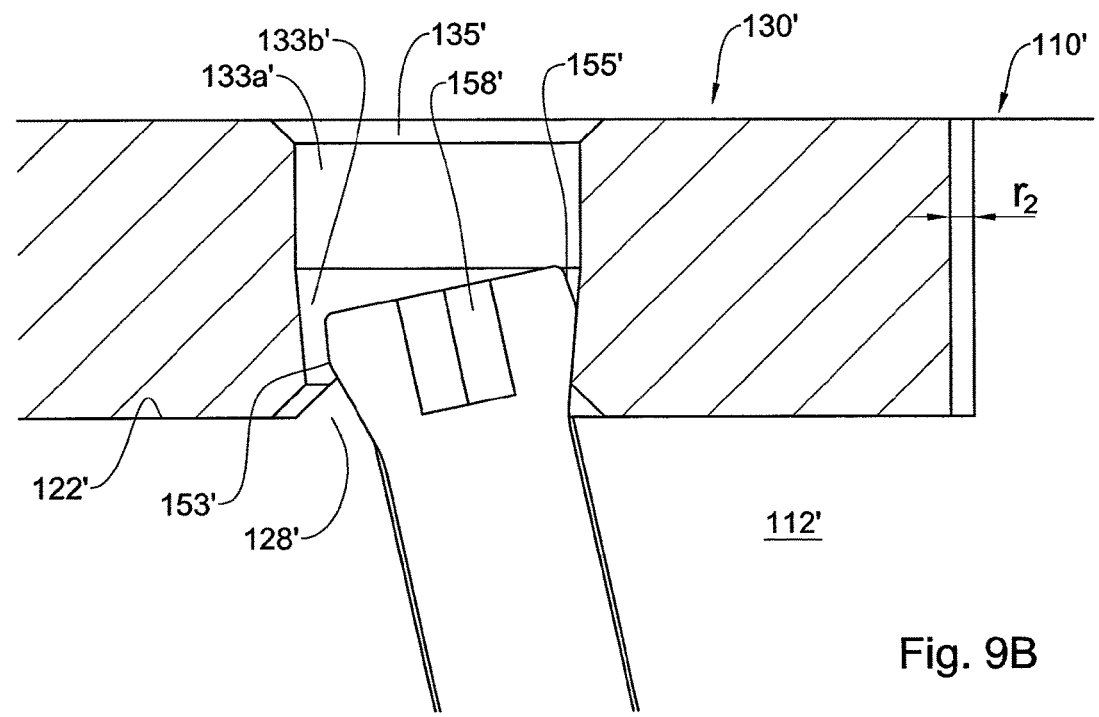
Figure 9C:
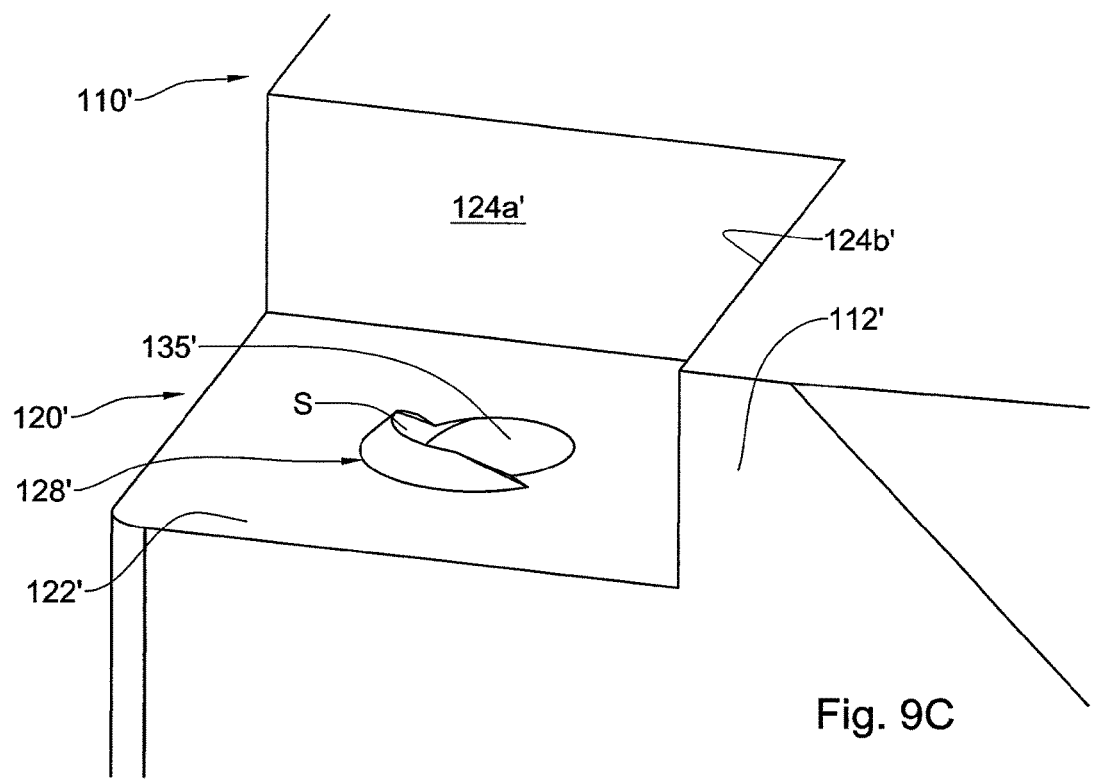
FIG. 9C is a schematic isometric view of a turning tool holder used in the turning tool shown in FIGS. 9A and 9B.
Figure 9D:
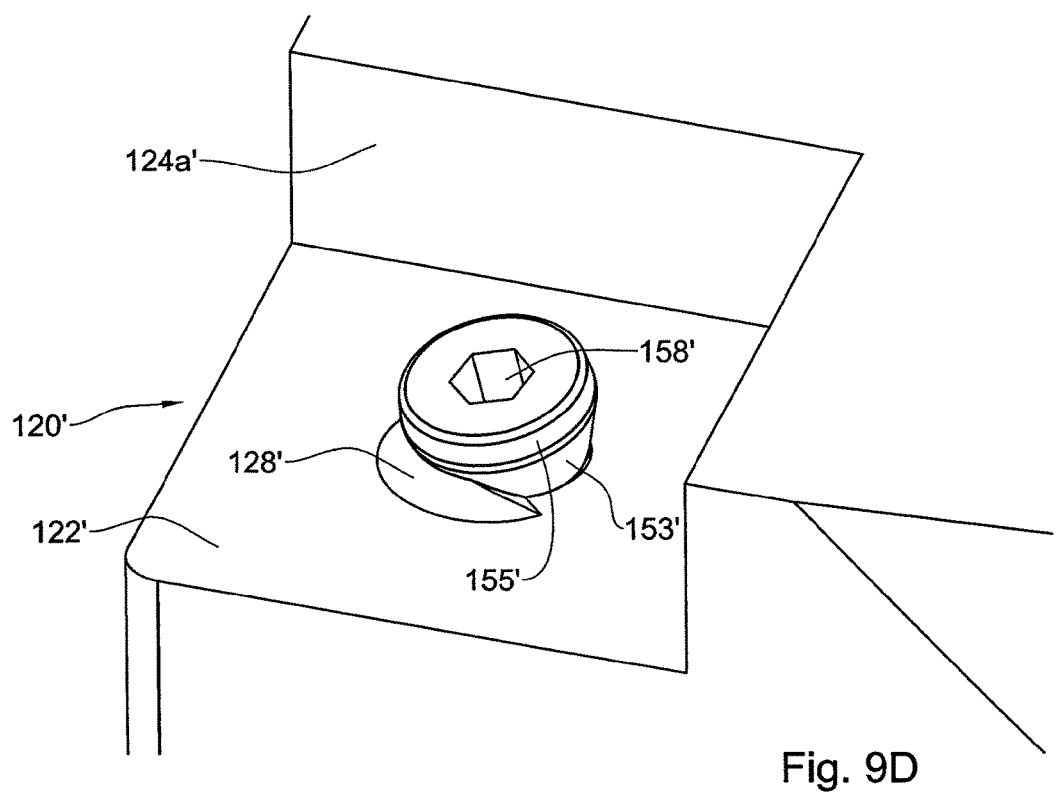
FIG. 9D is a schematic isometric view of a turning tool holder shown in FIG. 9C, when fitted with a securing bolt.

Turning now to FIGS. 8A to 8C, still another example of a turning tool is shown, generally designated as 101. Similar elements have been designated with similar reference numbers with the addition of 100. The turning tool 101 includes a holder 110, a pocket 120, a cutting insert 130 (can be similar to that previously described) and a screw 150.

Two main additions are provided in the turning tool 101 with respect to previously described tools 1, 1', 1" and 1'":

the addition of a support plate 170 positioned between the cutting insert 130 and the base surface 122 of the pocket 120; and a support structure 128 formed in the base surface 122 of the pocket 120 configured for additional support of the shank 152 of the screw 150.

In particular, the support plate 170 can be made of a hard steel alloy as known per se and be provided with a shaped cut-out for receiving therein the support structure 128 and the fastening screw 150.

Under the above arrangement, the head portion of the screw 150 is supported in at least two different locations—the inner surface 133 of the insert bore of the cutting insert and the support surface of the support structure 128. It is noted that the inner surface of the insert bore and the support surface are counter opposed, so that the head portion constitutes a wedge interposed therebetween.

Specifically, in the cross section shown, the arrangement of elements is as follows: the side wall 124a of the seat 120, a portion of the cutting insert 30 firmly pressed against the side wall by the head portion of the screw 150, the head portion of the screw 150, the support surface of the support structure 128 firmly pressed against the head portion, and the opposite portion of the cutting insert (that portion of the insert farthest from the side wall).

Turning now to FIGS. 9A to 9D, another example of a turning tool is shown, generally designated 101'. Similar elements have been designated with similar reference numbers with the addition of ('). The turning tool 101' includes a holder 110', a pocket 120', a cutting insert 130 (can be similar to that previously described) and a screw 150'.

This turning tool 101' demonstrates a smaller support structure 128', but such that is easier to manufacture as part of the pocket 120'. It is noted that the support structure 128' has a contact surface S at a 10° which comes in contact with the conical portion 153' of the screw 150', and applies greater pressure to the cutting insert, preventing release of the screw 150'.

In addition, it is observed that the inner surface 133 of the insert bore 135 is constituted by a first, straight inner portion 133a and a second, conical inner portion 133b. This arrangement is complementary to the tapering angle of the conical portion 153', and allows applying more downward pressure on the cutting insert 150'.

In operation, as the screw 150' is threaded into the bore 125', the cutting insert 130' is pushed further towards the side walls 124a', 124b' of the pocket 120'.

When removing the cutting insert 150', some angular displacement thereof maybe required (and not simply axial displacement as in previous examples).

Figure 10A:
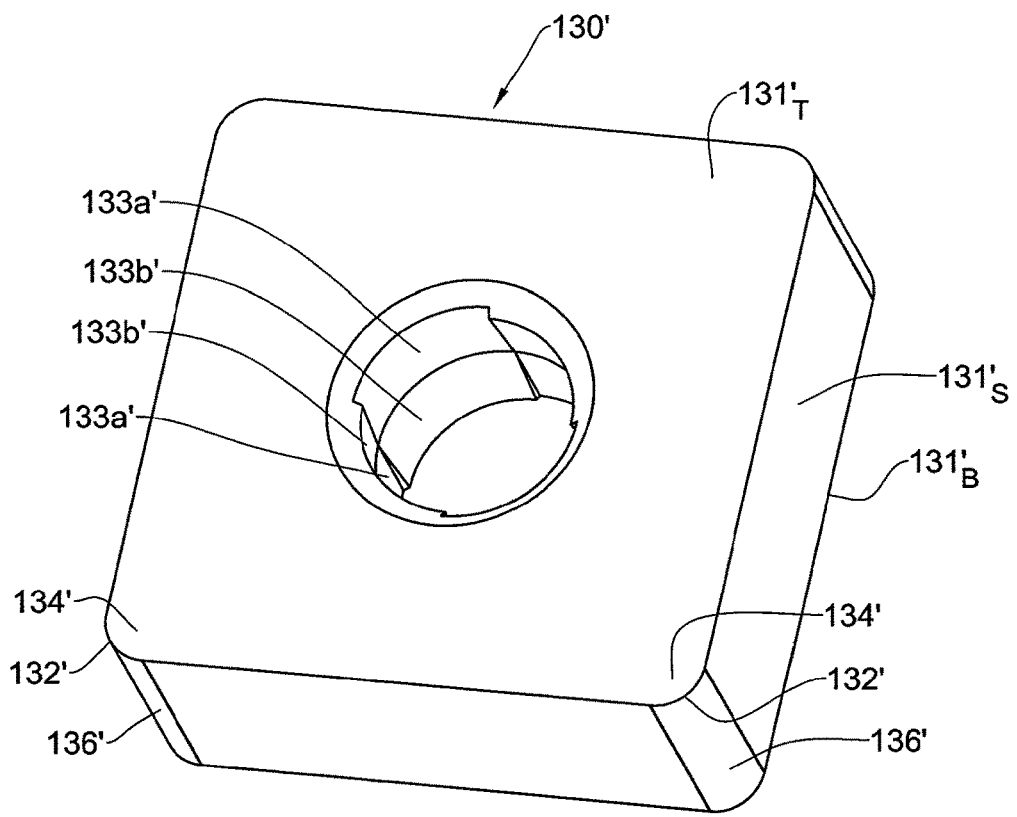
FIGS. 10A and 10B are schematic isometric and section views of a reversible cutting insert which can be used in the turning tool shown in FIGS. 9A to 9D.
Figure 10B:
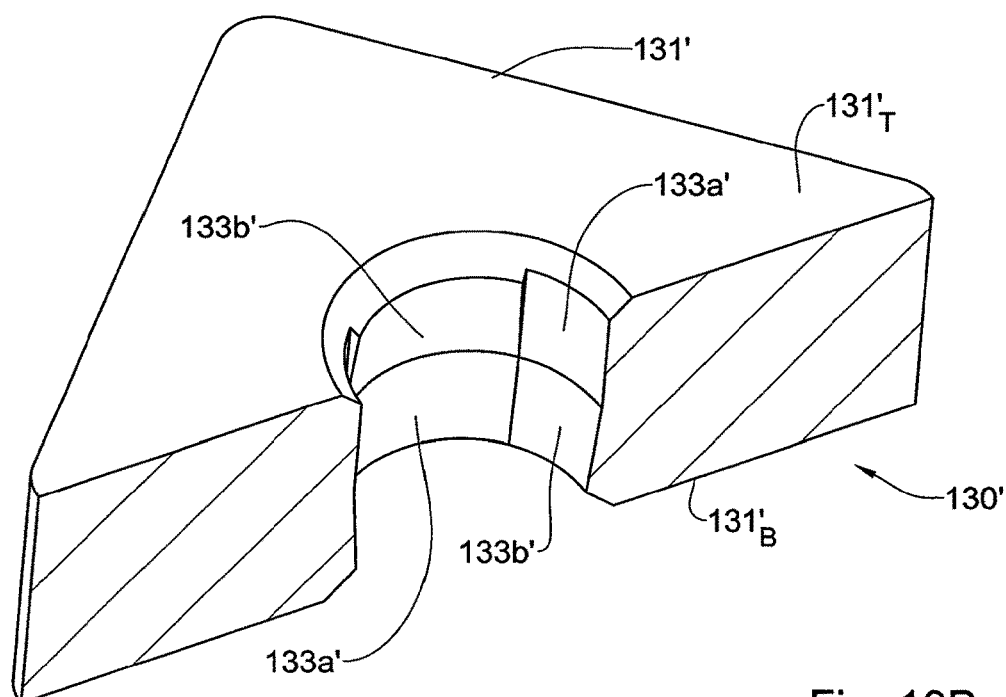

With reference being made to FIGS. 10A and 10B, a reversible cutting insert 130' is shown, in which the inner surface 133' has been arranged to have several alternating portions, each being formed with a first, straight portion 133a' and a second conical portion 133b', allowing reversing the cutting insert 130' and utilizing four cutting corners thereof.

It is noted that under the above arrangement, the diameter of the first portion at the top surface 131T' of the cutting insert 130' is smaller than the diameter of the second portion at the top surface 131T', while, simultaneously, the diameter of the first portion at the bottom surface 131B' of the cutting insert 130' is greater than the diameter of the second portion at the bottom surface 131B'.

Attention is now drawn to FIGS. 11A to 11E, in which yet another example of a turning tool is shown, generally designated as 130". Similar elements have been designated with similar reference numbers with the addition of ("). The turning tool 101" includes a holder 110", a pocket 120", a support plate 170", a cutting insert 130" and a screw 150".

In the present example, the screw 150" is designed such that the tapering angle of the conical portion is 45°, so that one segment of the conical portion 153" is parallel to the base surface 122" while the other is parallel to the inner surface 133" of the cutting insert 130".

Figure 11A:
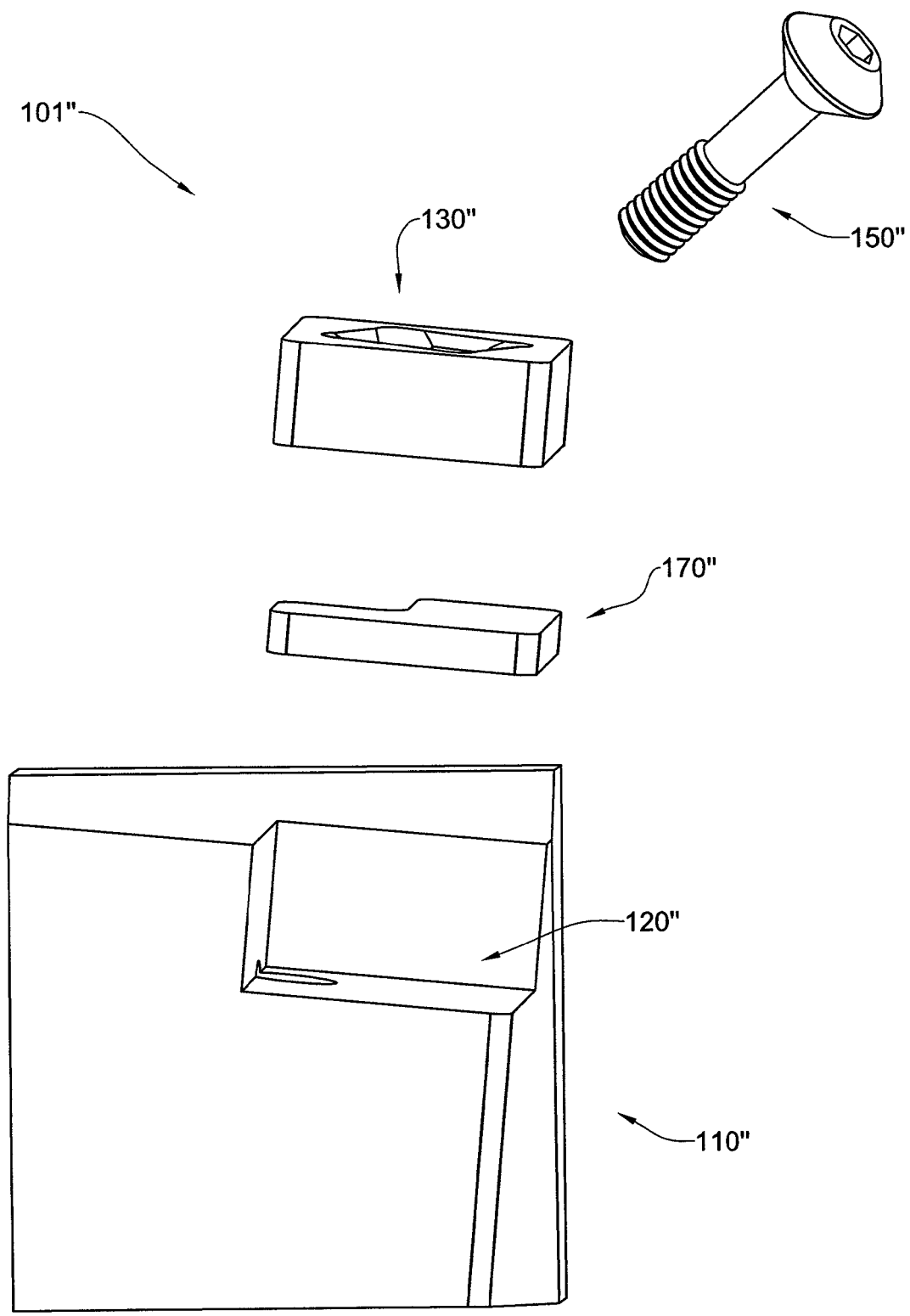
FIG. 11A is a schematic exploded isometric view of a turning tool according to another example of the subject matter of the present application.
Figure 11B:
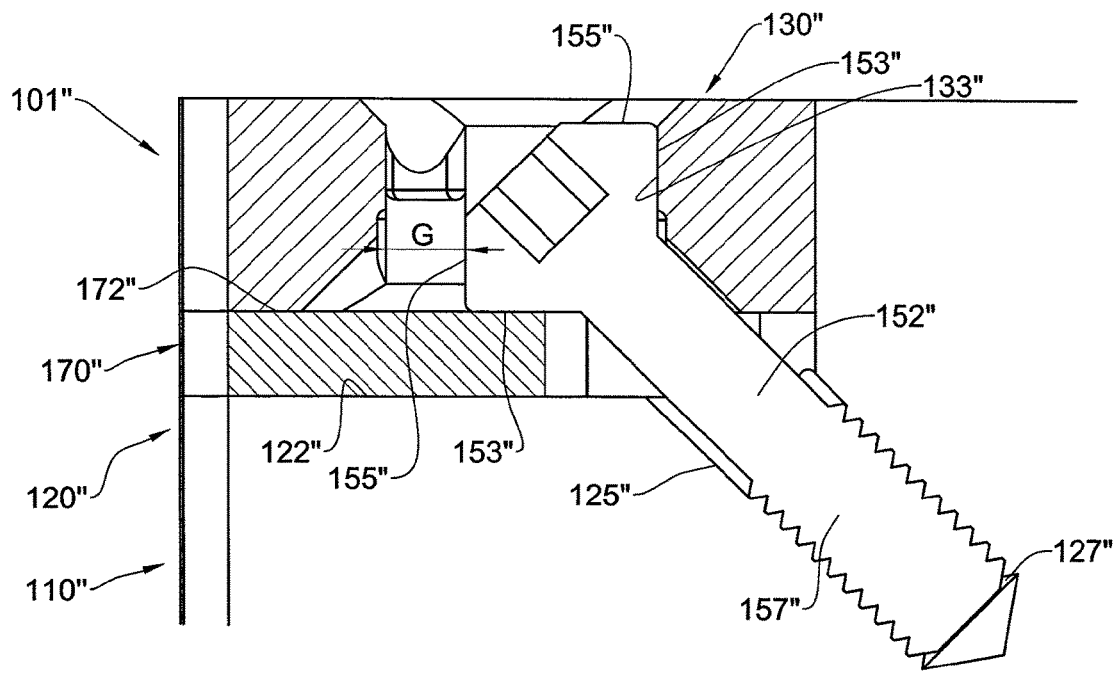
FIGS. 11B and 11C are schematic section and isometric views of the turning tool shown in FIG. 11A, in a closed position thereof.
Figure 11C:
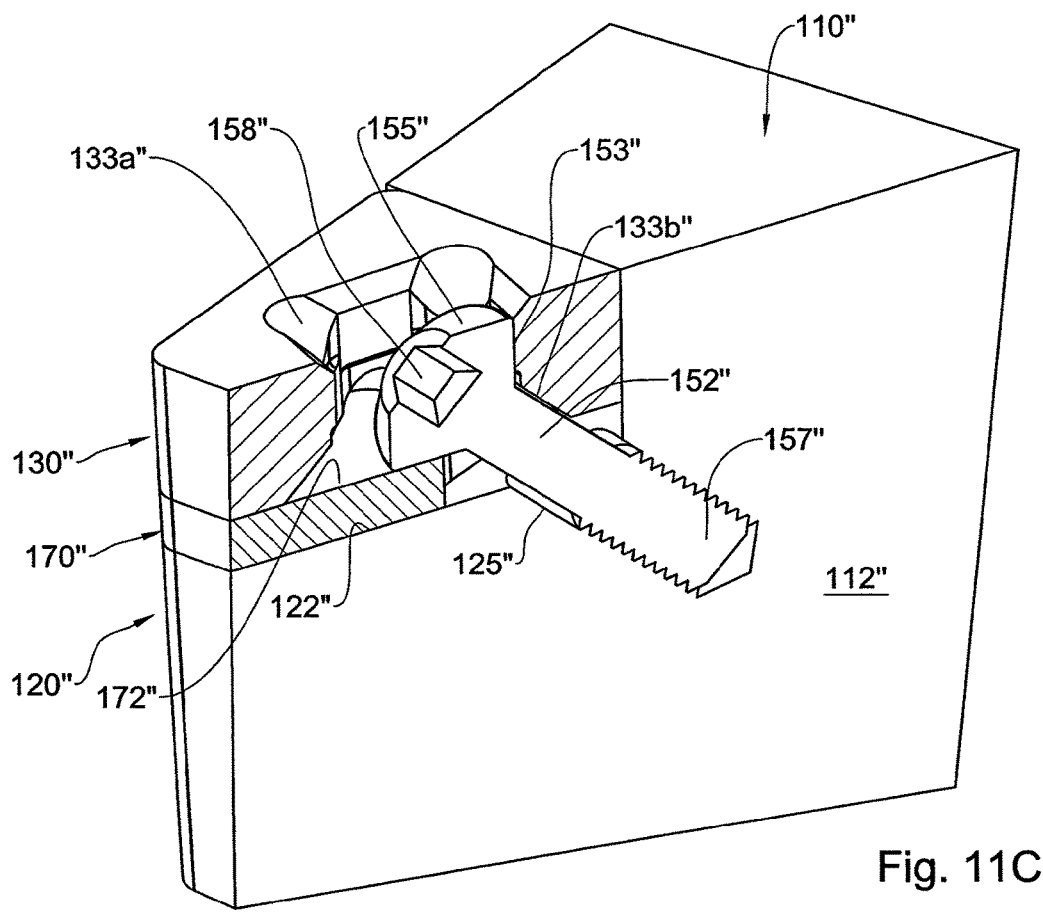
Figure 11D:
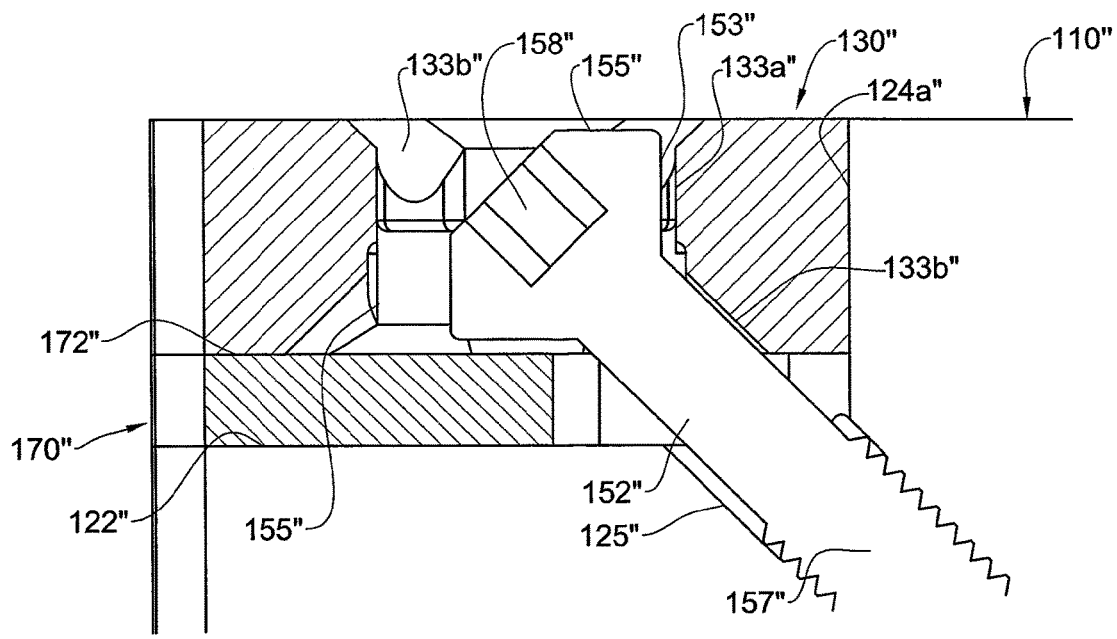
FIGS. 11D and 11E are schematic section and isometric views of the turning tool shown in FIG. 11A, in an open position thereof.
Figure 11E:
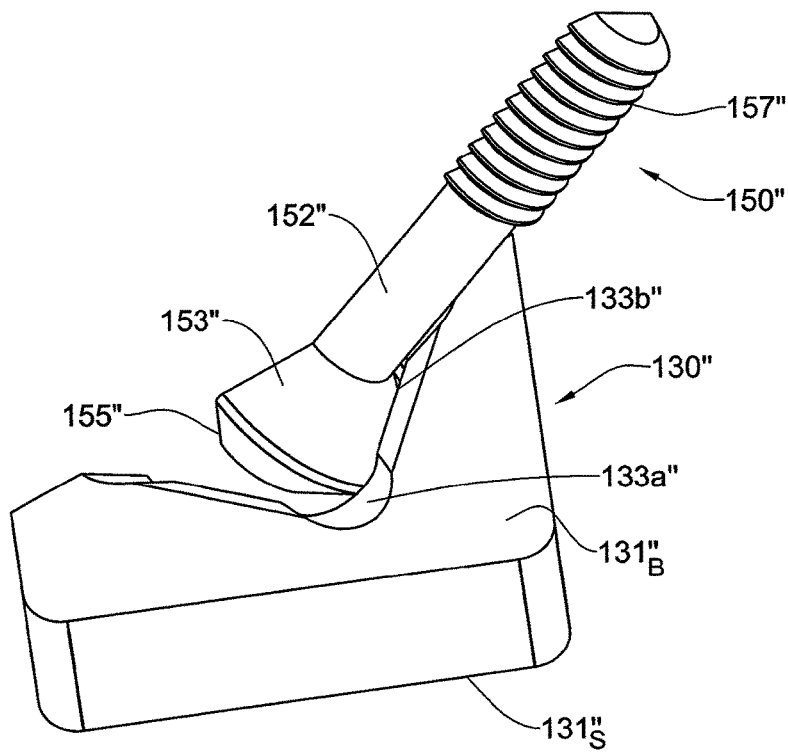

As can be seen from FIG. 11B, in the closed position, the screw 150" is supported on the one hand by the base surface 122" (resting flat against it) and on the other hand by the straight inner surface 133" of the insert bore 135".

In addition, it is noted that the head portion 151" of the fastening screw 150" does not fill the bore 135", and that there extends a considerable gap G between the second conical portion 155" and the inner surface 133b" of the cutting insert 130". However, this is not a necessity and the arrangement can be modified to conform the size of the bore 135" with that of the head portion 151".

In addition, it is observed that cutting insert 130" is formed with a second set of inner surfaces 133a" configured for receiving, or at least allowing the screw 150" to pass into the bore 125".

Figure 12:
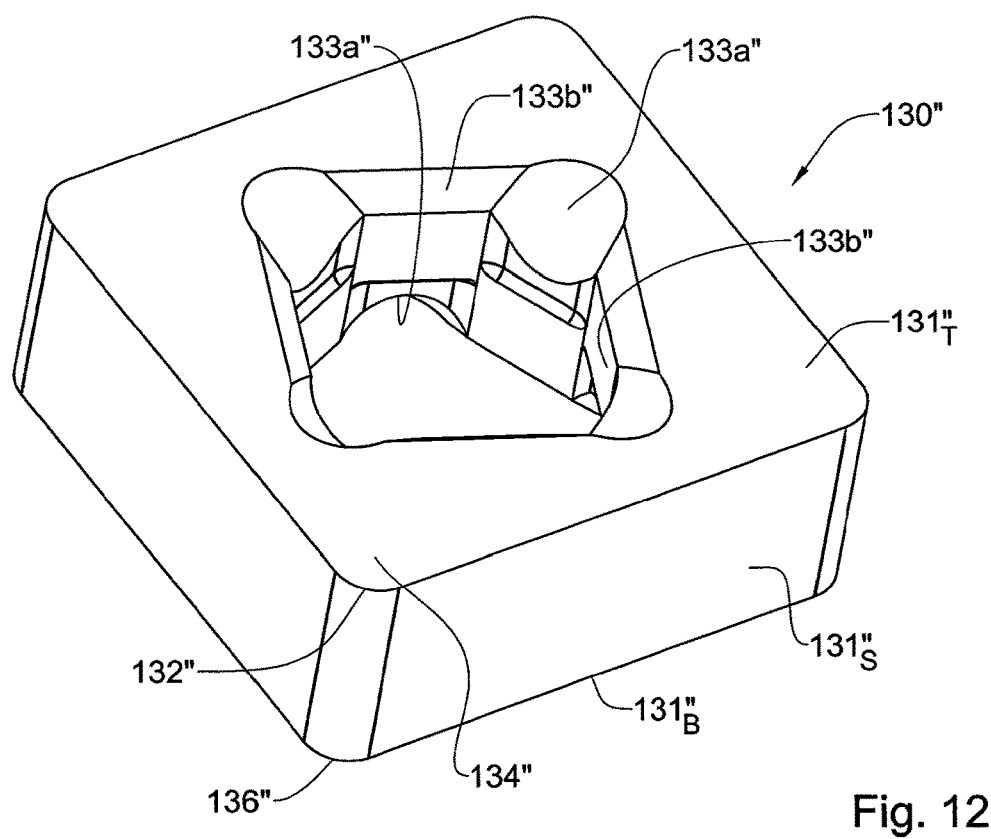
FIG. 12 is a schematic isometric view of a cutting insert used in the turning tool shown in FIGS. 11A to 11E.

As in previous examples, and as shown in FIG. 12, the cutting insert 130" is fully reversible and comprises eight cutting corners, each having a cutting edge 132", its inner surface is formed with alternative sets of straight and conical inner surfaces 133b" and 133a" respectively.

Figure 13A:
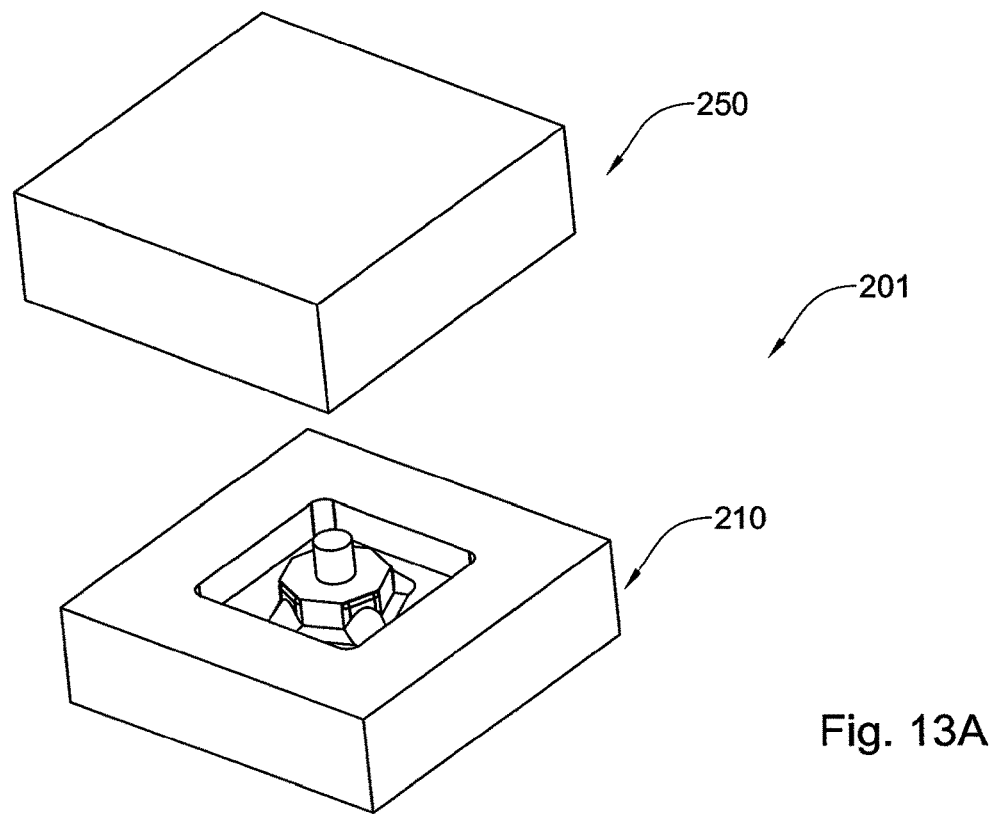
FIG. 13A is a schematic exploded isometric view of a mold used for the manufacture of the cutting insert shown in FIG. 12.
Figure 13B:
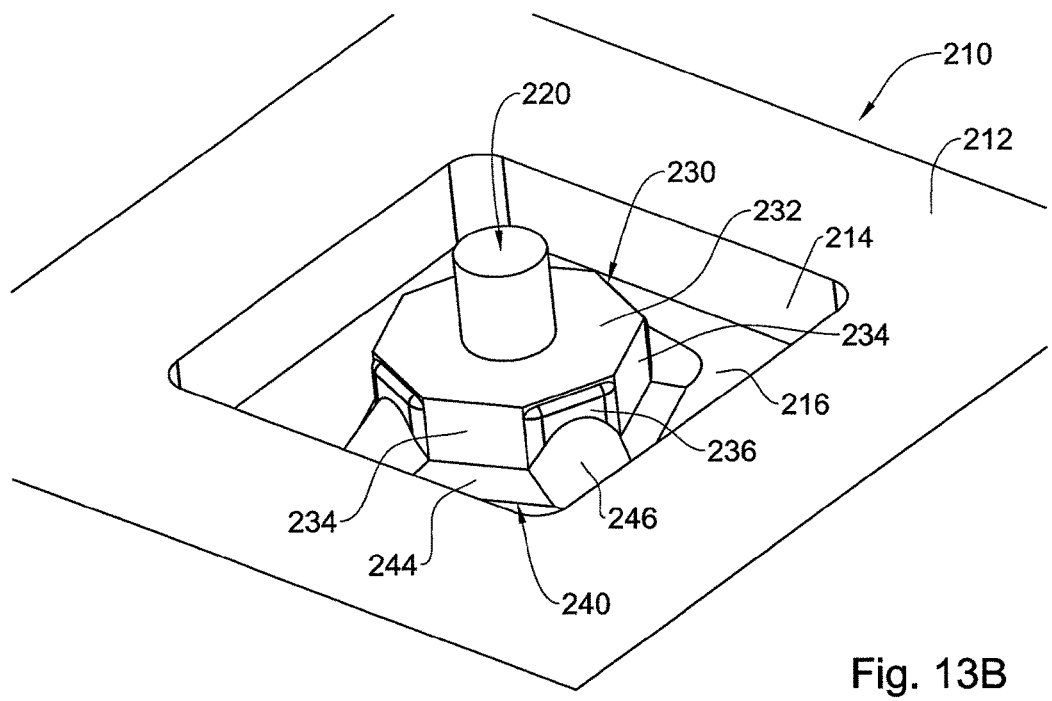
FIGS. 13B and 13C are schematic isometric views of respective members of the mold shown in FIG. 13A.
Figure 13C:
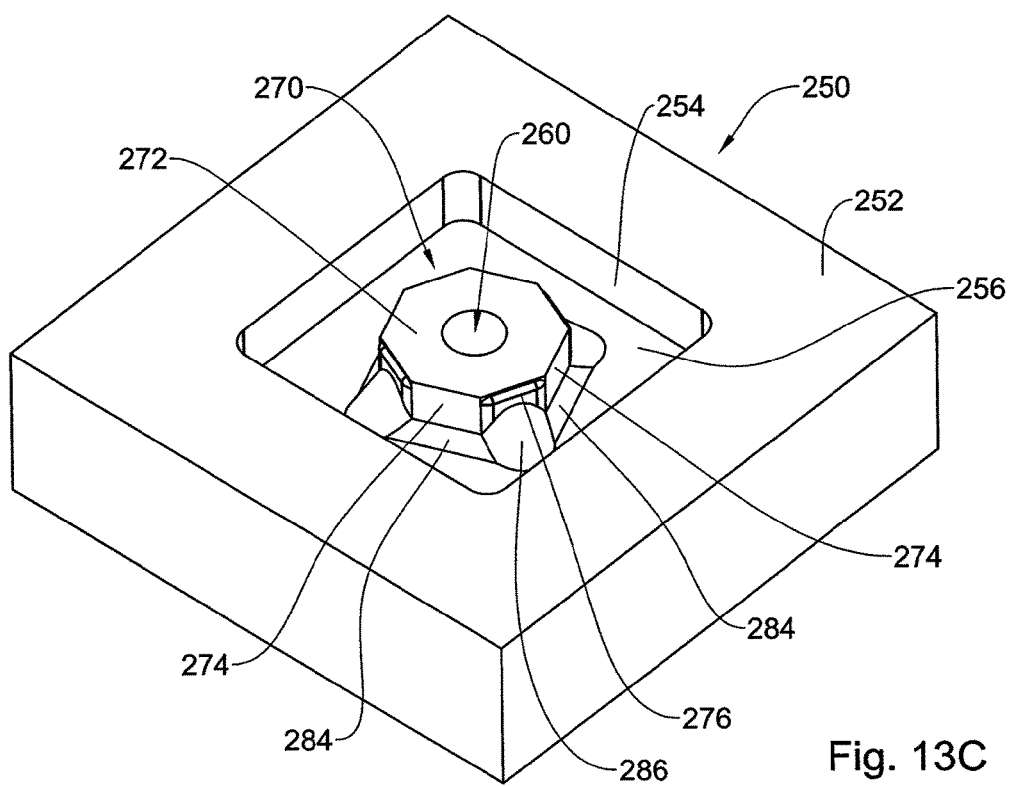

With reference to FIGS. 13A to 13C, the cutting insert 130" is manufactured in a sintering-pressing process between two mold members 210 and 250 of a mold 201. The first mold member 210 comprises a base surface 212 and a cavity 216 defined by sidewalls 216 and a bottom 218.

In the middle of the cavity there projects a main stub 220 and a platform 230 having an octagonal configuration similar to that of the cutting insert 130". The platform 230 comprises a top surface 232 and side surface of two kinds—planar 234 and shaped 236.

The platform 230 is merged to the surface 218 by a transition surface 240 constituted by an array of alternative surfaces 244, 246 corresponding to surfaces 234, 236 of the platform 230.

The second mold member 250 has an almost identical design with the only difference being in the fact that it has a main cavity 260 instead of the main stub 220. Therefore, the elements of the mold member 250 which are similar to those of mold member 210 have been give the same reference numeral but upped by 40 (element 210 is similar to element 250 etc.).

Figure 14A:
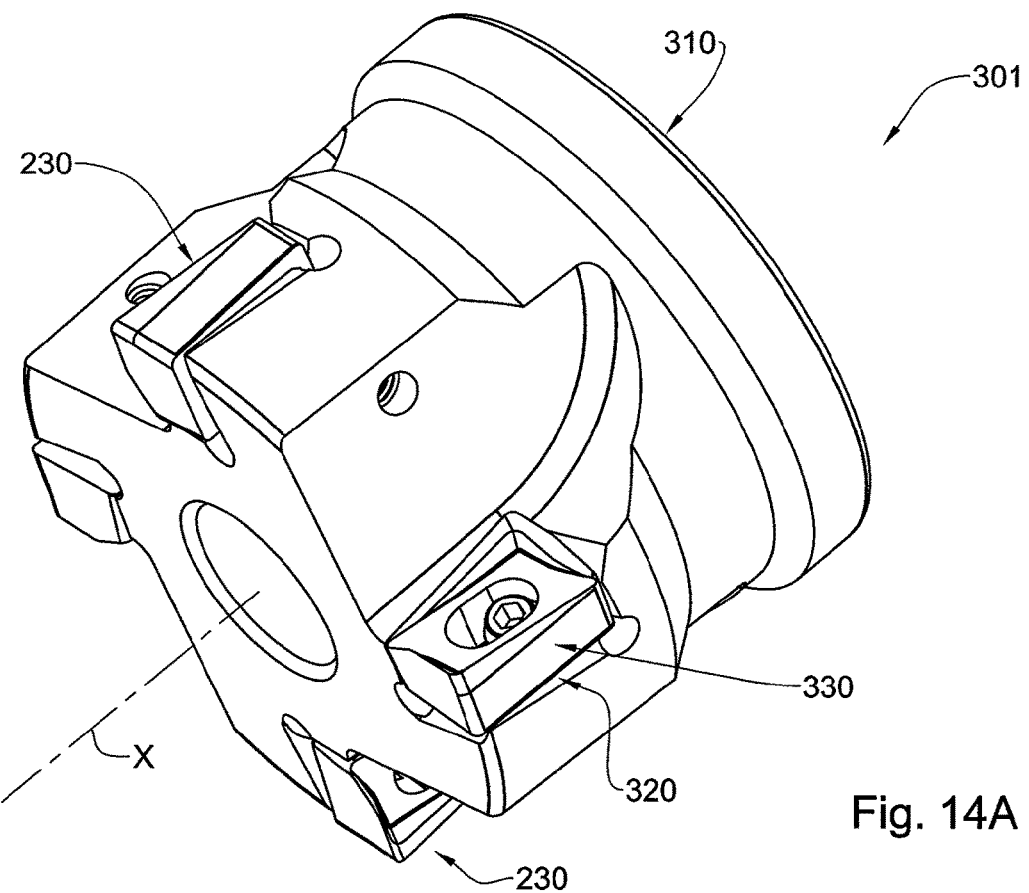
FIG. 14A is a schematic isometric view of a milling tool according to another example of the subject matter of the present application.
Figure 14B:
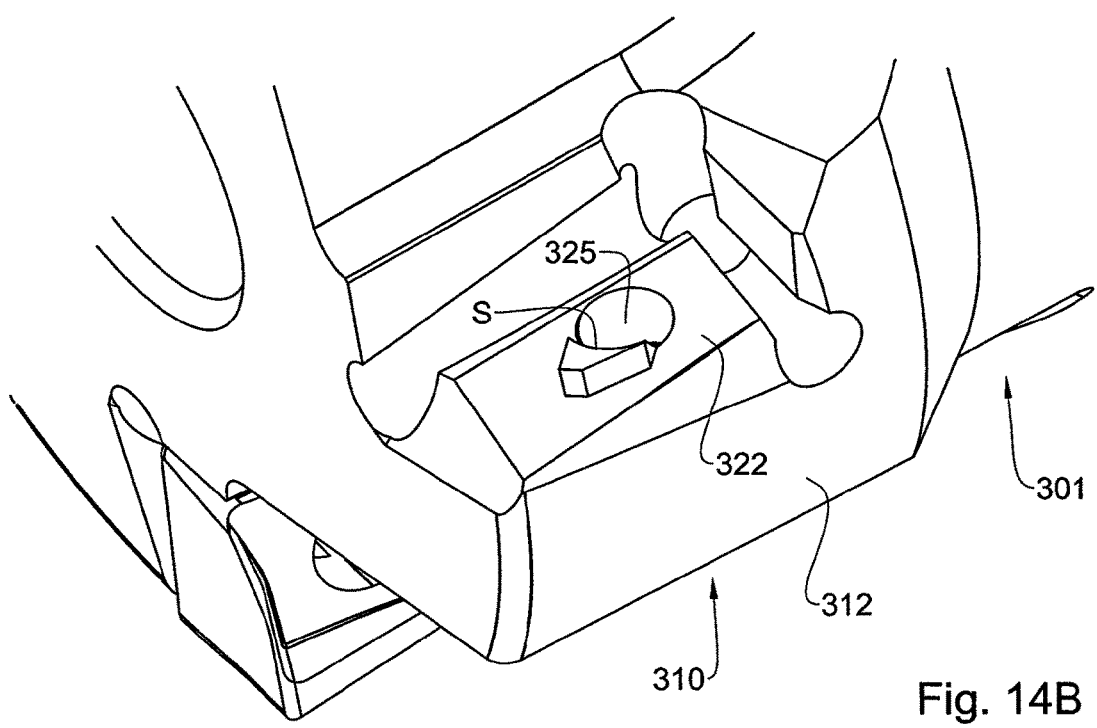
FIG. 14B is a schematic enlarged isometric view of a seat portion of the milling tool shown in FIG. 14A.

Turning now to FIGS. 14A and 14B, a milling tool is shown generally designated as 301, and comprising a holder 310 formed with a plurality of seats 320 receiving therein a plurality of cutting insert 330 fastened by screws 350. Similar elements have been designated with similar reference numbers with the addition of 300 (seat 320 is similar to seat 20 etc.).

As in a previously described example, the seat 320 is provided with a support structure 328 with a support surface S configured for extending the length at which the screw 350 is supported.

Figure 15A:
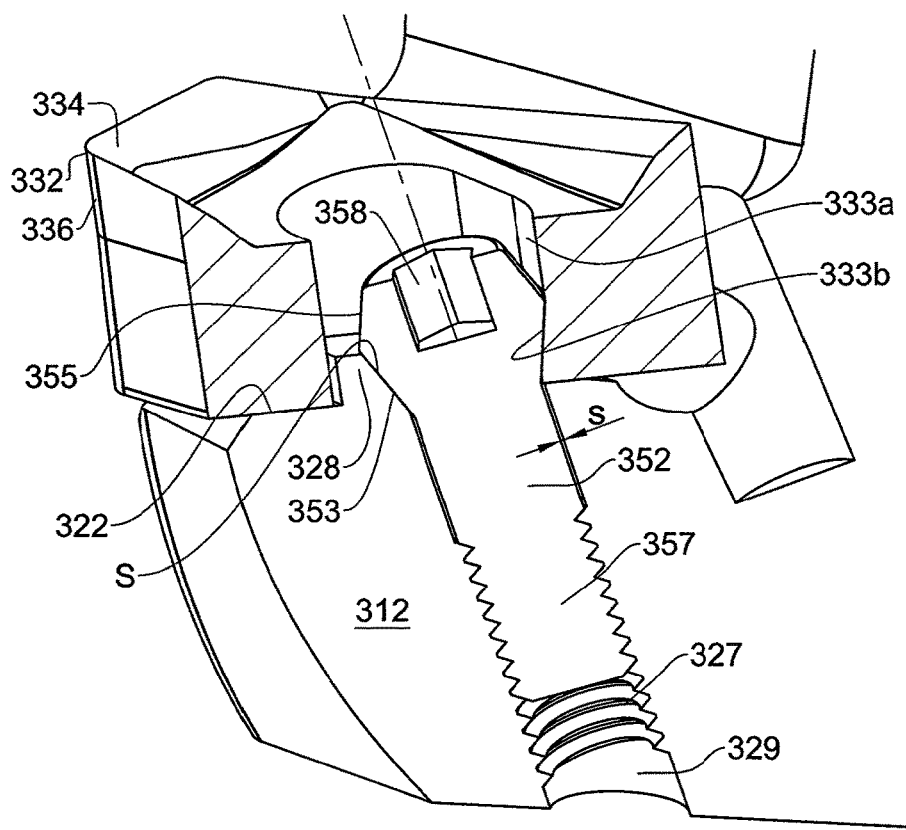
FIGS. 15A and 15B are schematic isometric and section views of the milling tool shown in FIGS. 14A and 14B, shown in a closed position of the securing mechanism thereof.
Figure 15B:
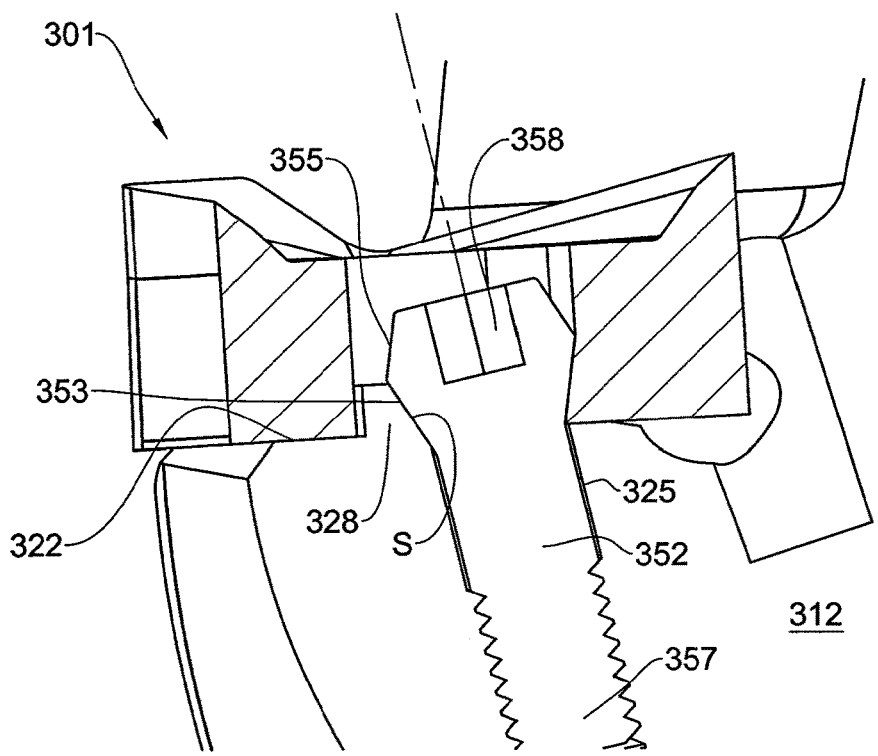
Figure 15C:
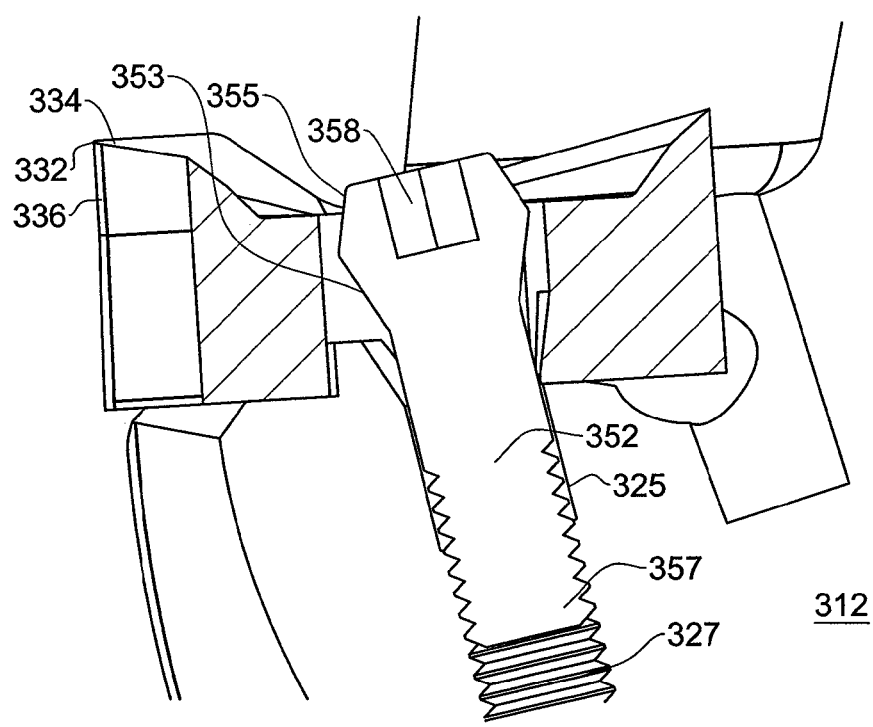
FIG. 15C is a schematic section view of the milling tool shown in FIGS. 14A and 14B in an open position thereof.
Figure 16:
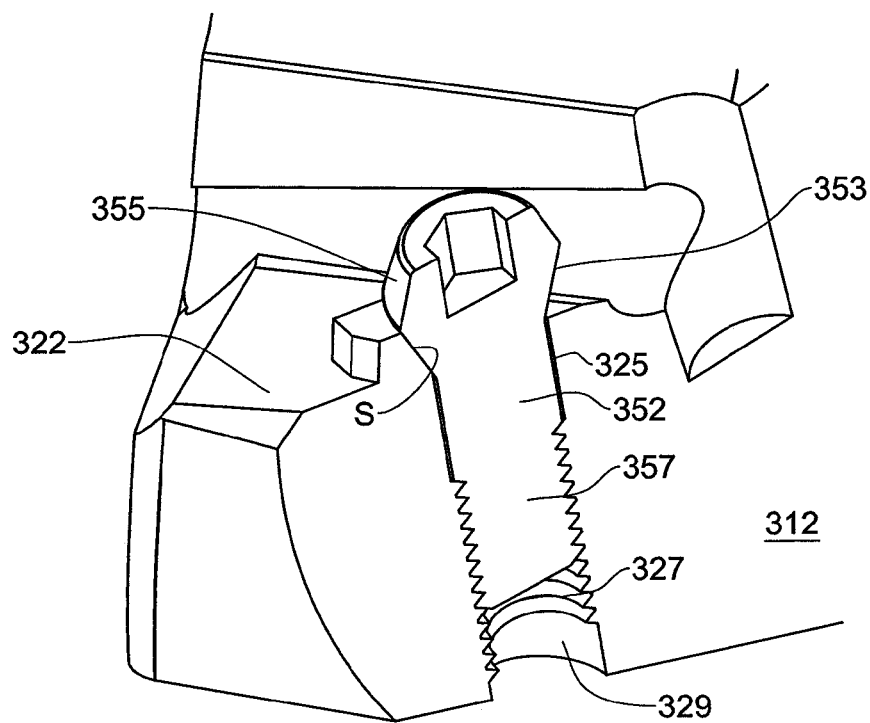
FIG. 16 is a schematic isometric view of the seat portion shown in FIG. 14B, when fitted with a securing bolt.

Attention is now turned to FIGS. 15A to 16, in which open and closed positions of the screw 350 are shown, with respective positions of the cutting insert 330. It is observed that the entire head portion 351 is supported by the support structure 328.

Figure 17A:
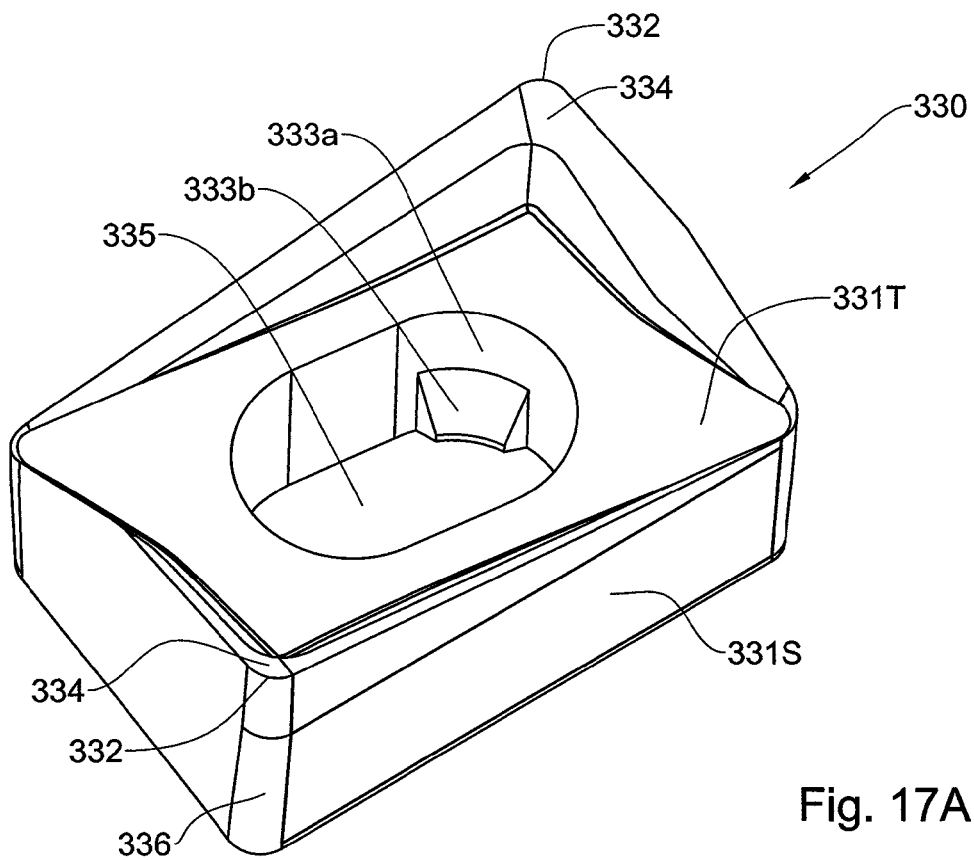
FIGS. 17A and 17B are schematic isometric and top views of a cutting insert used in the milling tool shown in FIGS. 14A and 14B.
Figure 17B:
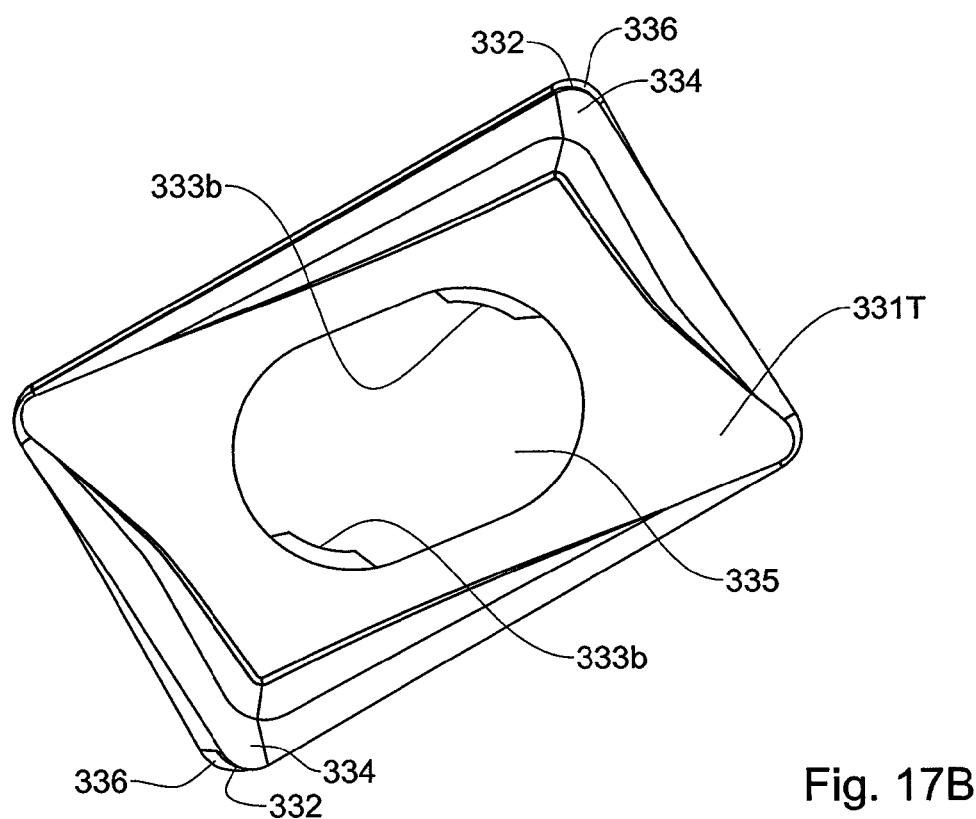
Figure 18A:
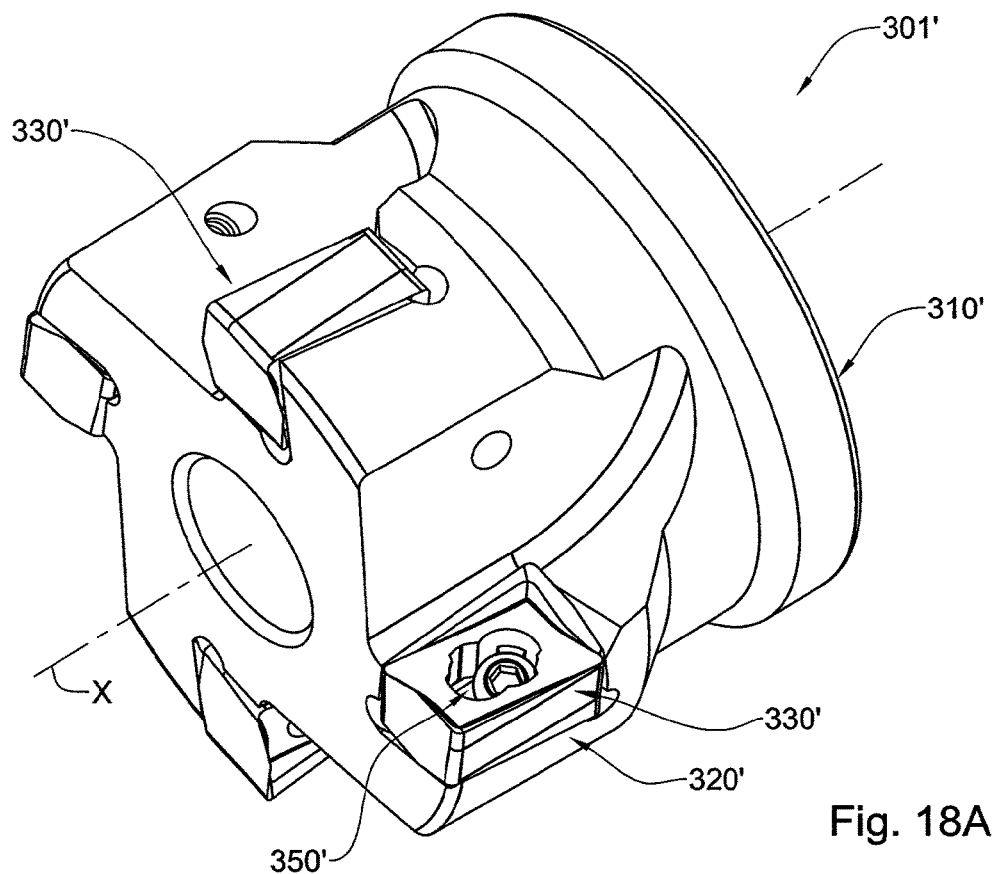
FIG. 18A is a schematic isometric view of a milling tool according to another example of the subject matter of the present application.
Figure 18B:
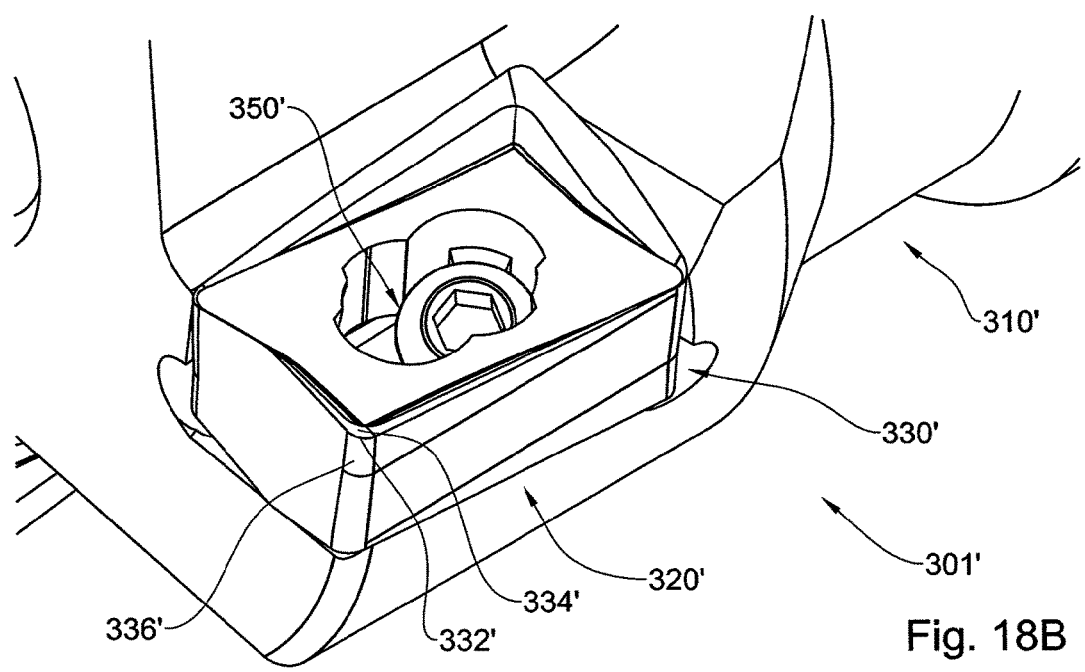
FIG. 18B is a schematic enlarged isometric view of a portion of the milling tool shown in FIG. 18A.
Figure 19A:
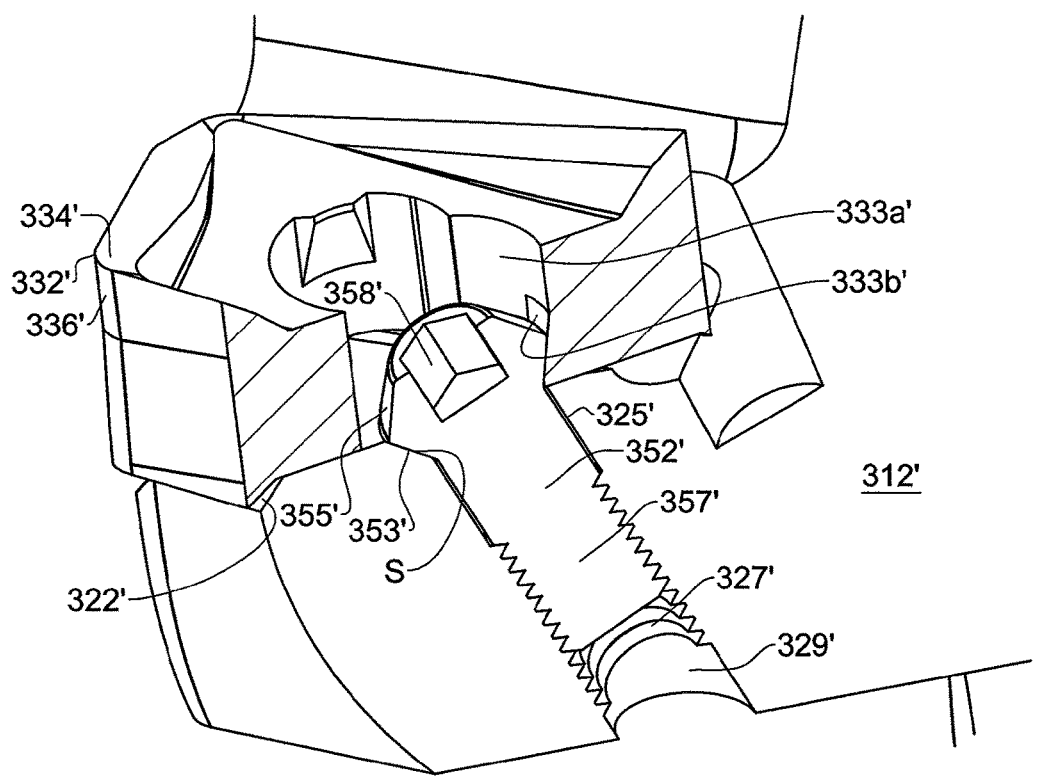
FIGS. 19A and 19B are schematic isometric and section views of the milling tool shown in FIGS. 18A and 18B, shown in a closed position of the securing mechanism thereof.
Figure 19B:
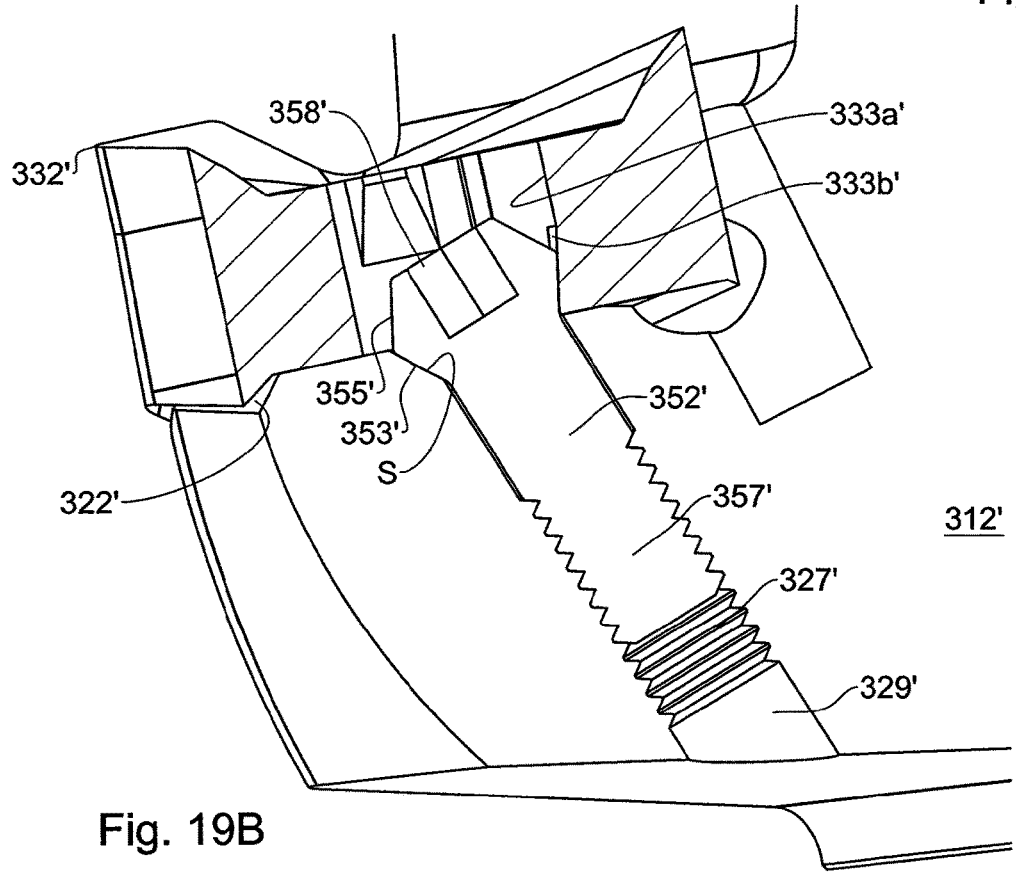
Figure 19C:
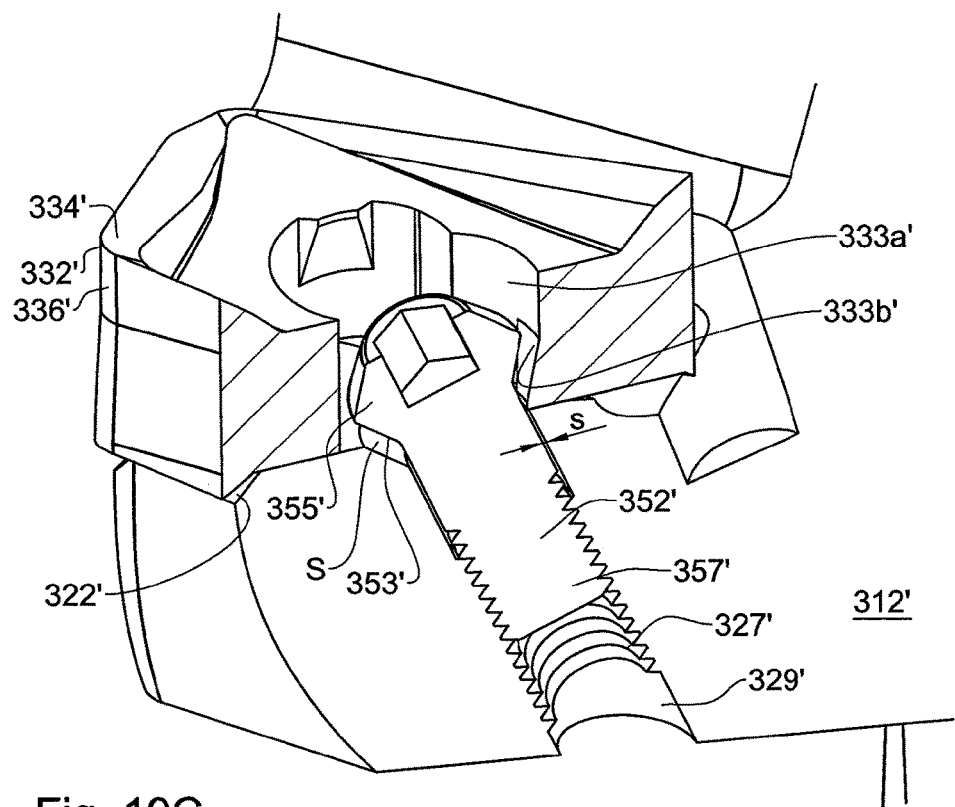
FIGS. 19C and 19D are schematic isometric and section views of the milling tool shown in FIGS. 18A and 18B, shown in an open position of the securing mechanism thereof.
Figure 19D:
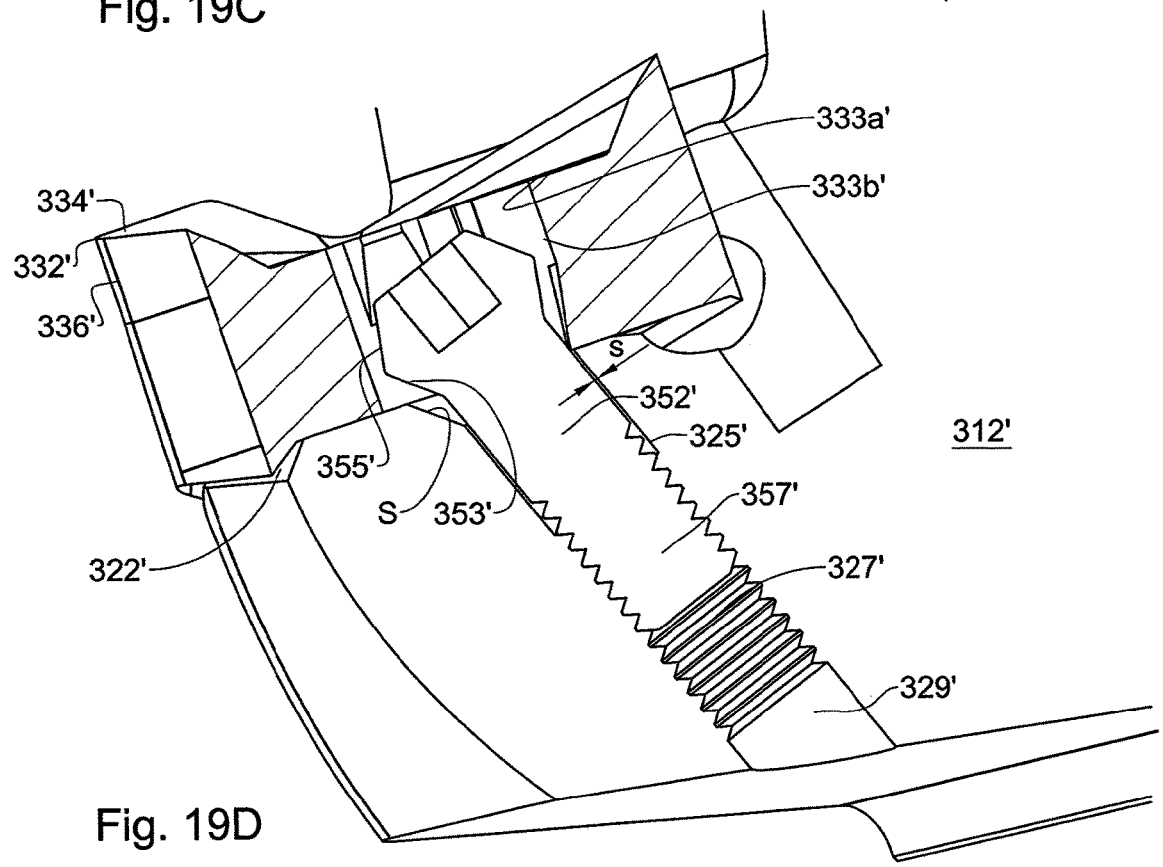

With reference to FIGS. 17A and 17B, it is observed that the cutting insert 330 comprises an inner surface 333a and two inner members, each having an inner surface 333a configured for engaging the respective portion of the head portion 351 of the screw 350. This insert 330 is not reversible, making it manufacture very simple.

Attention is now drawn to FIGS. 18A to 19D, in which another example of a milling tool is shown, generally designated 301' Similar elements have been designated with similar reference numbers with the addition of ('). The tool 301' comprises a holder 310' formed with a plurality of seats 320' receiving therein a plurality of cutting insert 330' fastened by screws 350'.

It is first noted that the seat 320' is not formed with a support structure 328' but simply with a support surface S extending below the level of the base surface 322'. Thus, in this example, the screw 350' has a greater cone angle (30° instead of 20°), and the angle of the bore 325' is greater with respect to the wall 324a', allowing the head portion 351' of the screw 350' to 'sink' into the seat 320'. Under the above arrangement, the seat 320' is of a more robust configuration.

Figure 20A:
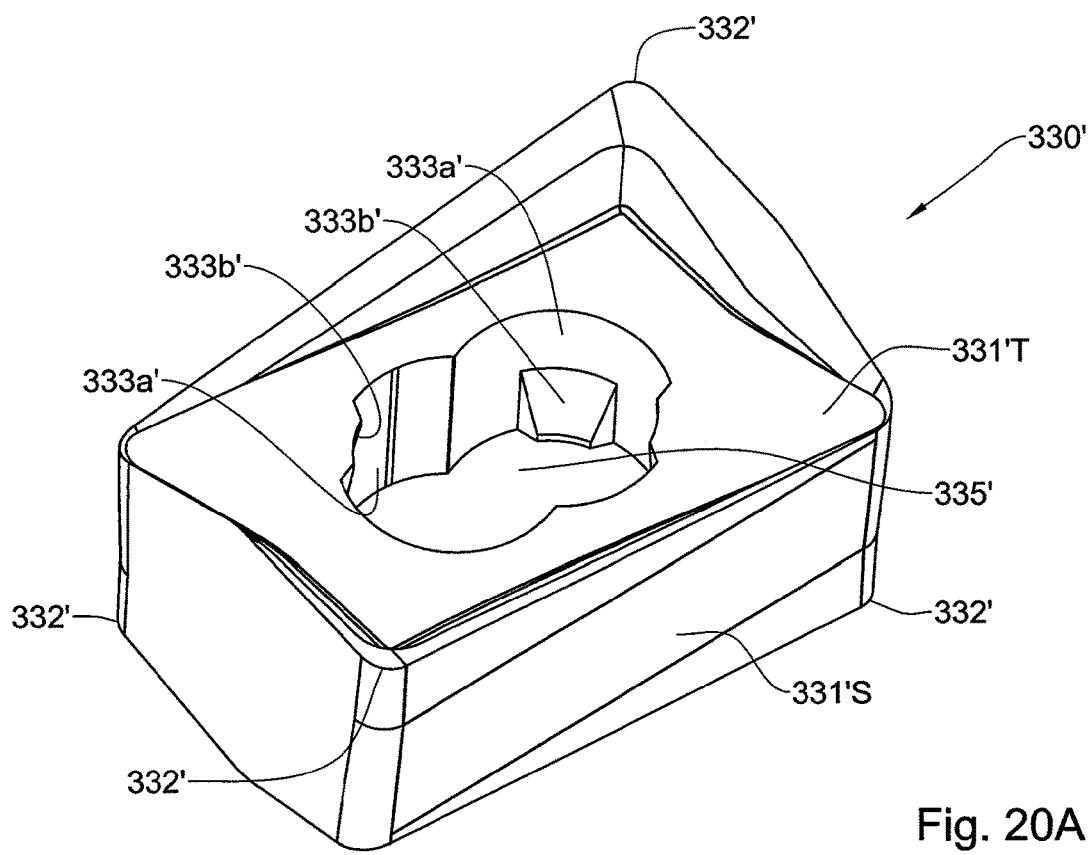
FIGS. 20A and 20B are schematic isometric and top views of a cutting insert used in the milling tool shown in FIGS. 18A and 18B.
Figure 20B:
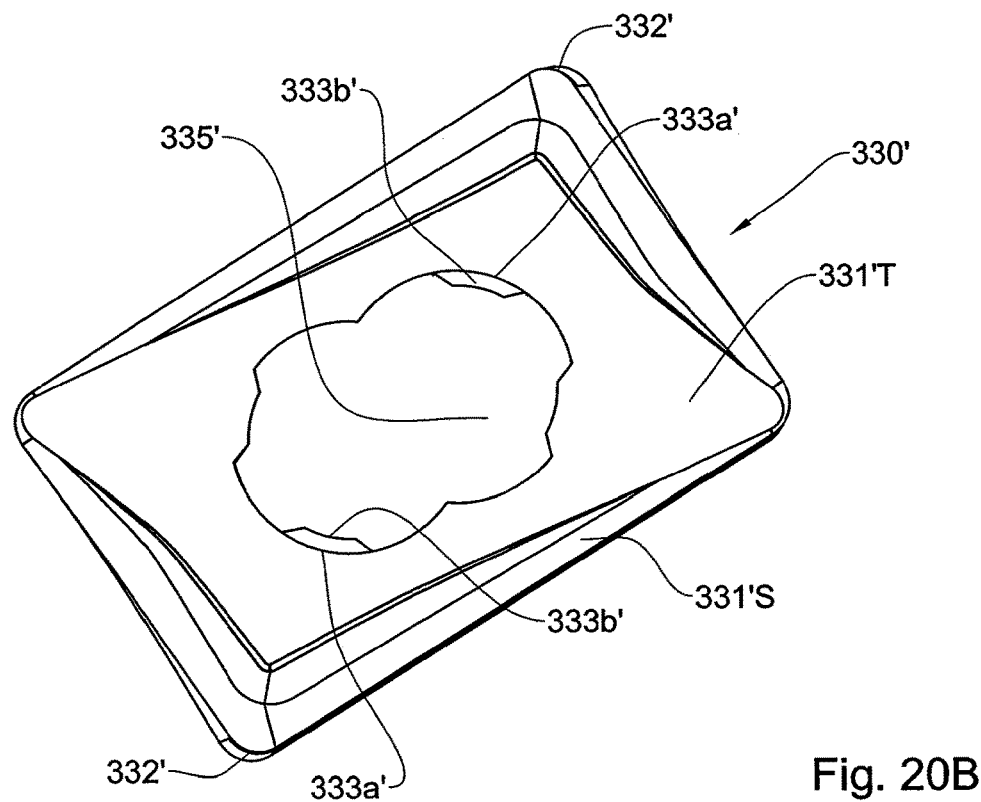

Turning to FIGS. 20A and 20B, the cutting insert 330' is now a reversibly cutting insert, having four working cutting corners, each with its own cutting edge 332'. Similarly to previously described reversible cutting inserts, this also comprises alternative surfaces 333a' and 333b'. In addition, the inner surfaces 333a' are formed as portions of a cylinder, providing additional support to the screw 350'.

Figure 21:
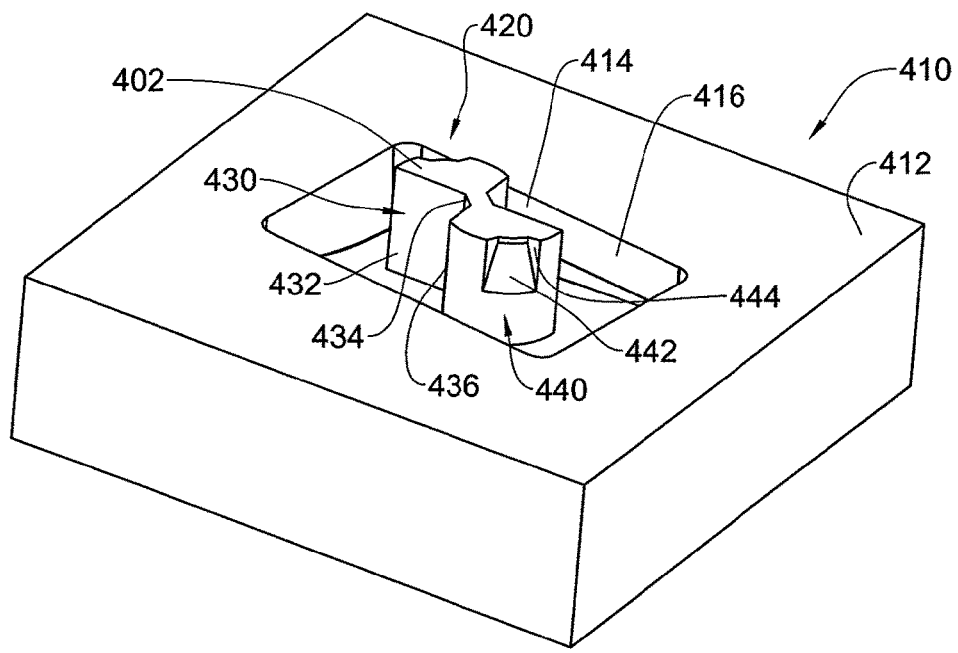
FIG. 21 is a schematic isometric view of a mold member used for the manufacture of the cutting insert shown in FIGS. 20A and 20B.

With respect to FIG. 21, a mold member 410 is shown, used in the manufacture of the cutting insert 330'. Two such members 410, angularly displaced with respect to one another at 90°, allow a full interlocking between the structures 420, 430, 440 of each one in the cavity 414 of the other.

Figure 22:
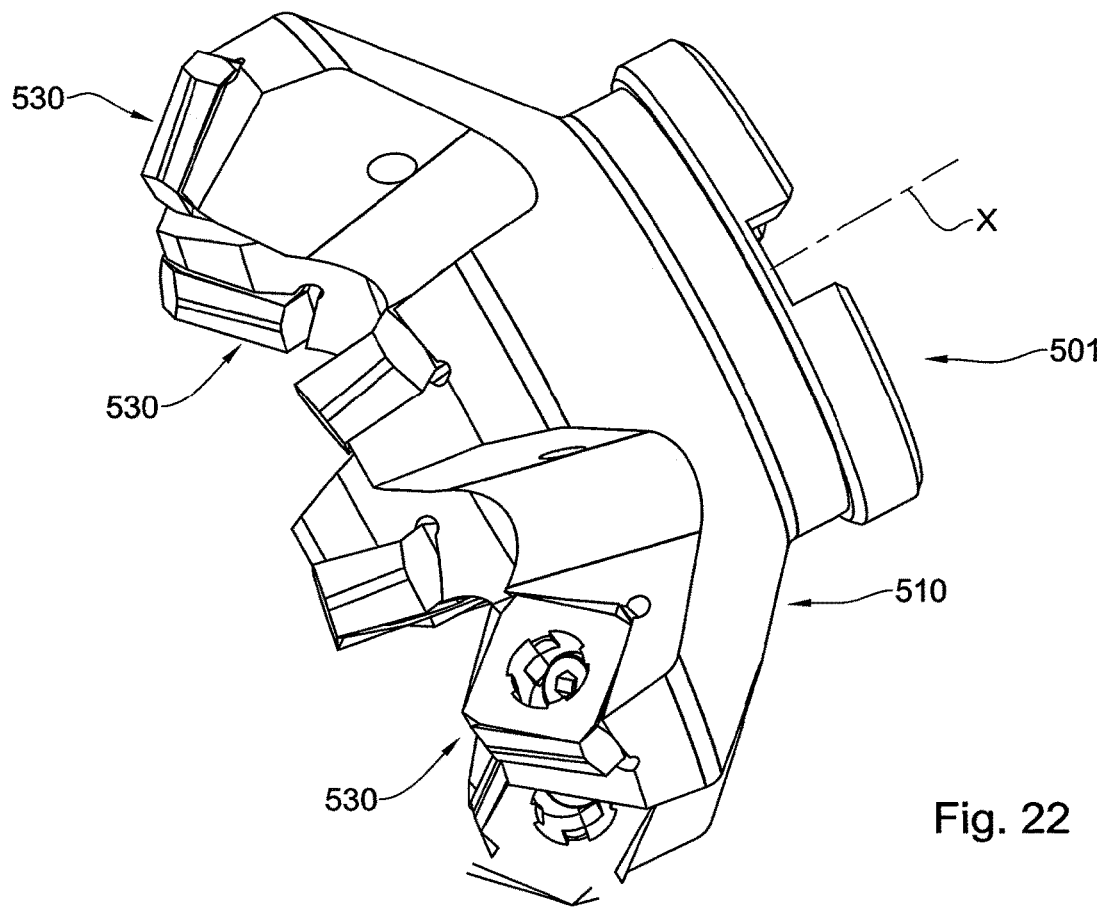
FIG. 22 is a schematic isometric view of a milling tool according to another example of the subject matter of the present application.
Figure 23A:
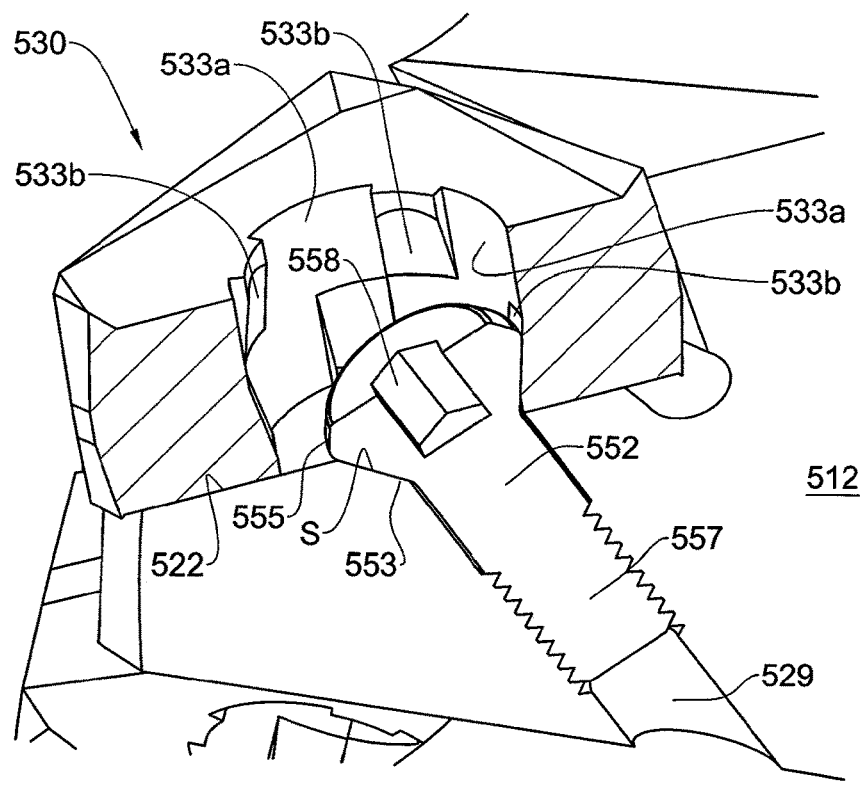
FIGS. 23A and 23B are schematic isometric and section views of the milling tool shown in FIG. 22, shown in a closed position of the securing mechanism thereof.
Figure 23B:
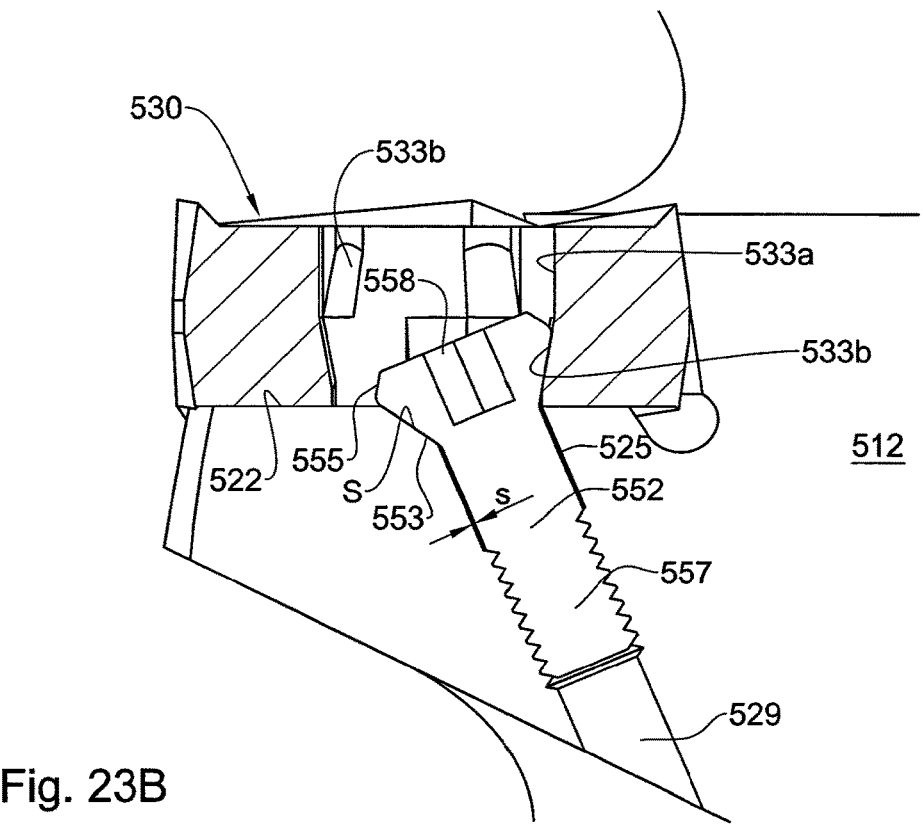

Attention is now drawn to FIG. 22, another example of a milling tool is shown, generally designated 501. Similar elements have been designated with similar reference numbers to that of tool 301 with the addition of 200 (seat 520 is similar to seat 320 etc.). The milling tool comprises a holder 510 formed with a plurality of seats 520 receiving therein a plurality of cutting insert 530 fastened by screws 550.

Turning to FIGS. 23A to 23D, closed and opened positions of the fastening screw 550 and the cutting insert 530 are shown. Contrary to the previously described milling tool 301, in the present example the surface 533a and 533b are both of cylindrical/conical configuration which is complementary to the geometry of the head portion 551 of the screw 550, so that there is provided full surface contact between the screw 550 and the insert 530.

Figure 24:
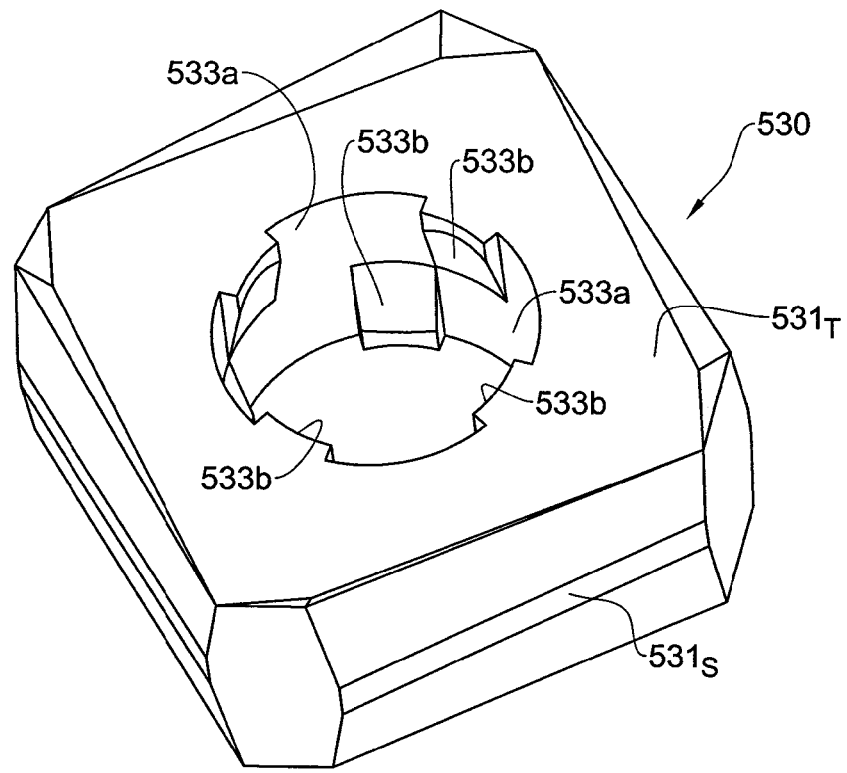
FIG. 24 is a schematic isometric view of a cutting insert used in the milling tool shown in FIG. 22.

With reference to FIG. 24, the cutting insert 530 is a fully reversible insert having eight cutting corners, each with a cutting edge 532 of its own. As in previous examples, the inner surface portions 533a, 533b alternate in order to allow reversibility. This cutting insert 530 is particularly suitable for surface milling.

Figure 25:
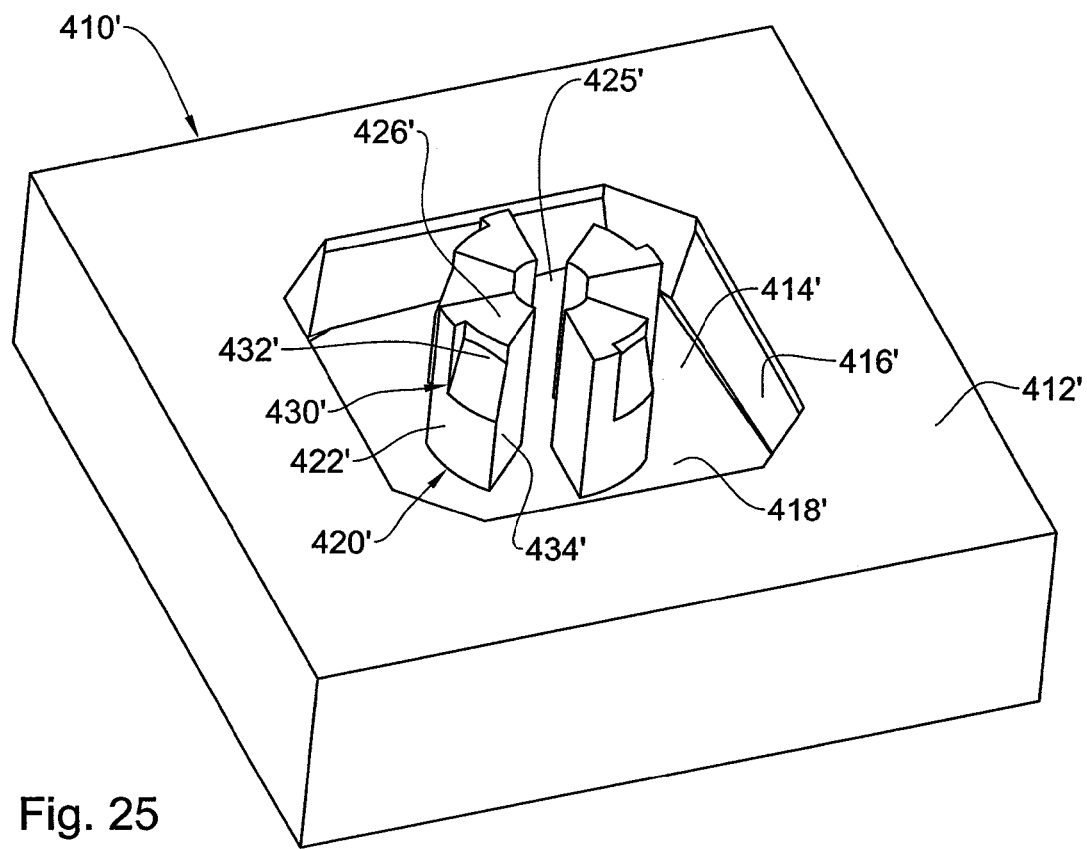
FIG. 25 is a schematic isometric view of a mold member used for the manufacture of the cutting insert shown in FIG. 24.

FIG. 25 illustrates a mold member 410' used in the manufacture of the cutting insert 530, so that two similar mold members 410' can be matched (angularly displaced at 90° with respect to each other) to form the geometry of the cutting insert 530.

Some advantages of the above milling tool 501 include a stronger hold of the screw 550 and less wear of the screw 550.

Figure 26:
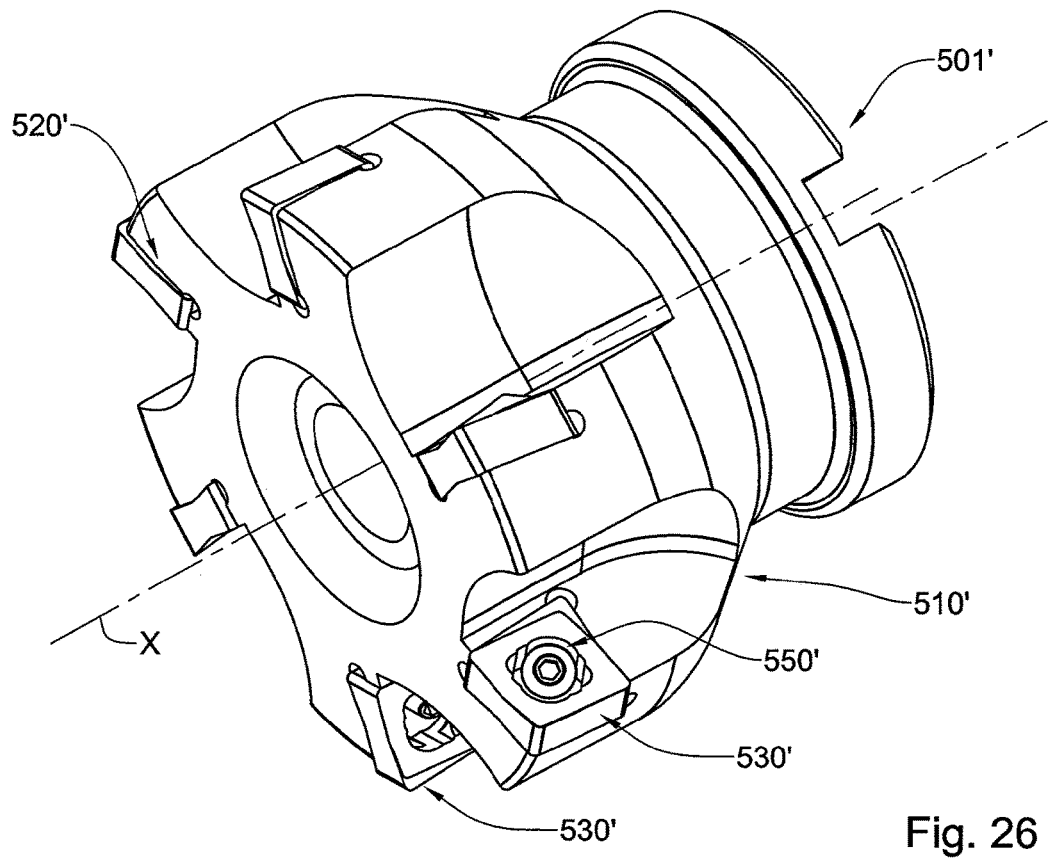
FIG. 26 is a schematic isometric view of a milling tool according to another example of the subject matter of the present application.

Turning now to FIG. 26, another milling tool is shown, generally designated 501' Similar elements have been designated with similar reference numbers to that of tool 301 with the addition of ('). The milling tool 501' comprises a holder 510' formed with a plurality of seats 520' receiving therein a plurality of cutting insert 530' fastened by screws 550'.

Figure 27A:
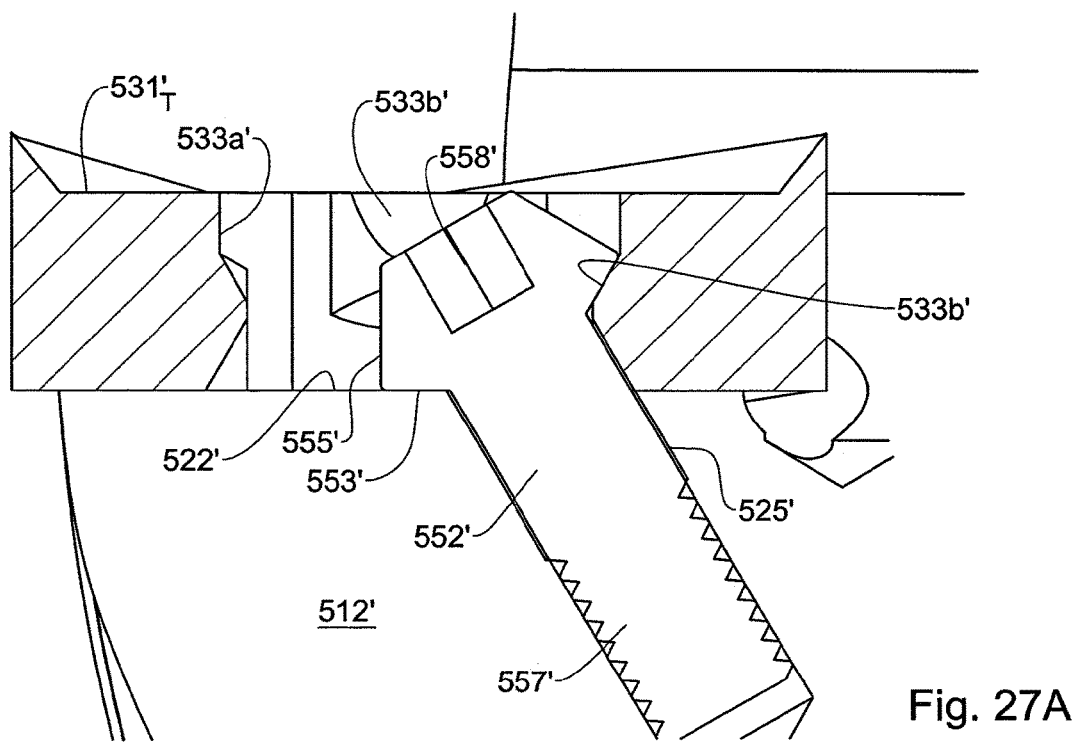
FIGS. 27A and 27B are schematic section views of the milling tool shown in FIG. 26, shown in respective closed and open positions of the securing mechanism thereof.
Figure 27B:
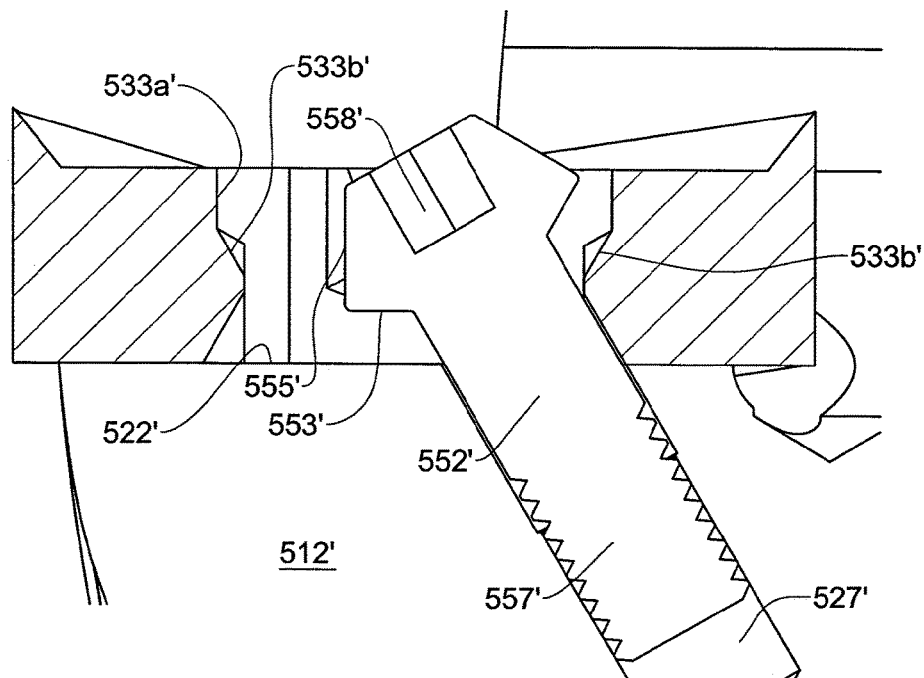

As in previously described example of the turning tool 101", in this example as well the screw 550' has a conical angle of 45° so that one segment thereof is aligned with the inner surface 533a' of the insert 530' and another segment thereof is aligned with the base surface 522', as can be seen in FIGS. 27A and 27B.

Figure 28:
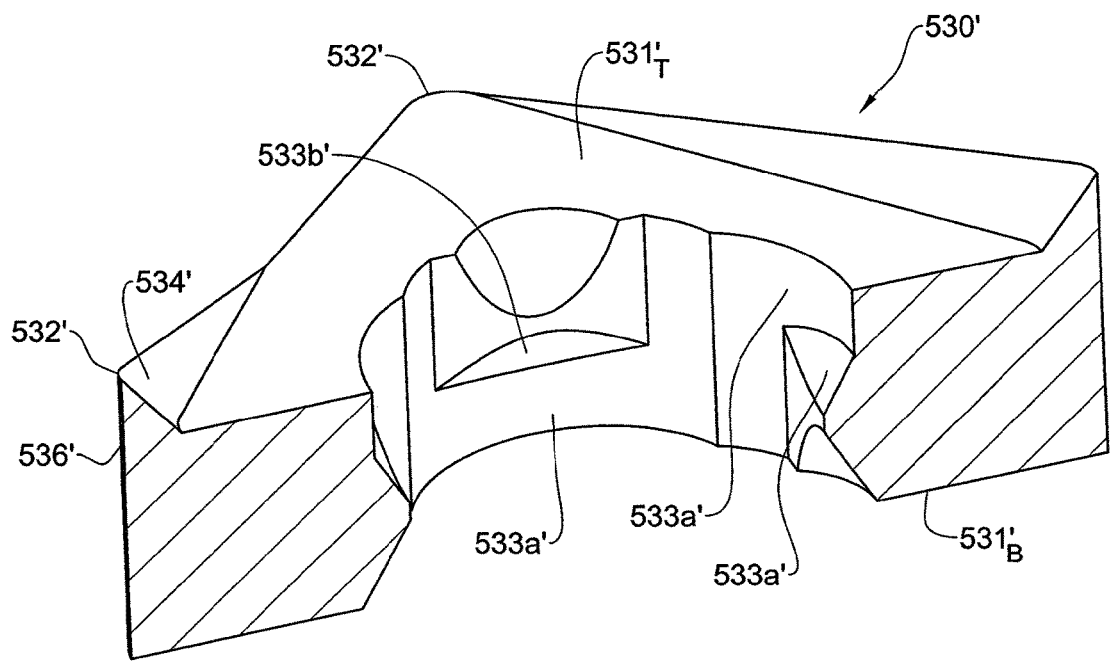
FIG. 28 is a schematic isometric section view of a cutting insert used in the milling tool shown in FIG. 26.

The cutting insert 530' is reversible and has four cutting corners, each with a cutting edge 532' of its own, as shown in FIG. 28. It also has the same alternative arrangement of surfaces 533a' and 533b'.

Figure 29:
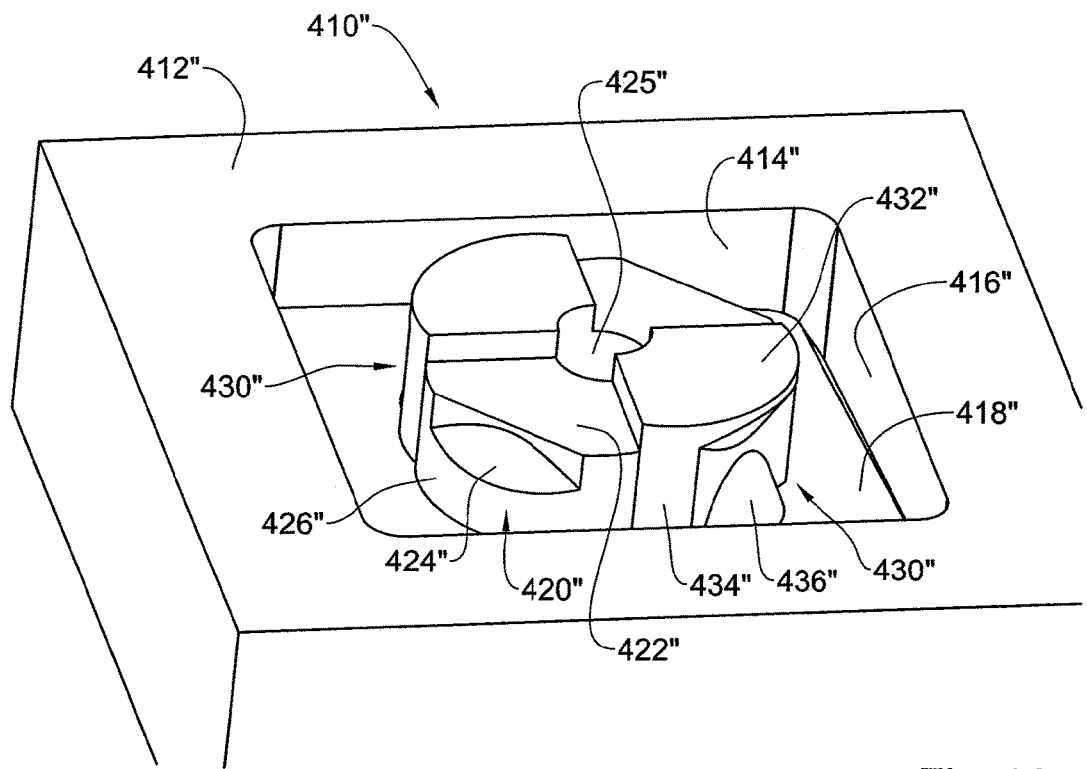
FIG. 29 is a schematic isometric view of a mold member used for the manufacture of the cutting insert shown in FIG. 26.

FIG. 29 illustrates a mold member 410" used in the manufacture of the cutting insert 530', so that two similar mold members 410" can be matched (angularly displaced at 90° with respect to each other) to form the geometry of the cutting insert 530'.

In all of the above described example of turning tools 1, 1', 1", 1', 101, 101', 101", 301, 301', 501 and 501', the cutting inserts can be fully removed and fully placed onto their respective seat portions over the head portions of the cutting tools, while the screws are engaged with the holders.

In other words, in order to remove the cutting insert and to replace it (or another insert) back onto the seat, the screw does not have to be removed from the seat bore (just slightly unscrews).

Attention is now drawn to FIGS. 30A to 30D illustrating another example of a turning tool, generally designated as 601, and also comprising a holder 610, a seat 620, a cutting insert 630 (can be similar to that previously described) and a screw 650. In this example, it is observed that the turning tool further comprises a base plate 670, fastened to the base surface 622 with an auxiliary screw.

Under the present example, it is observed that the side wall of the pocket of the tool holder 610 is constituted by two surfaces: 624a, 624b. It is further noted that the surfaces are not flush with one another and that surface 624b constitutes part of a nook in the cutting tool holder 610.

In particular, when the cutting insert 630 is securely mounted, a top portion of its side wall Pa abuts the surface 624a while the bottom portion of the side wall thereof, Pb, is spaced from surface 624b.

Figure 30A:
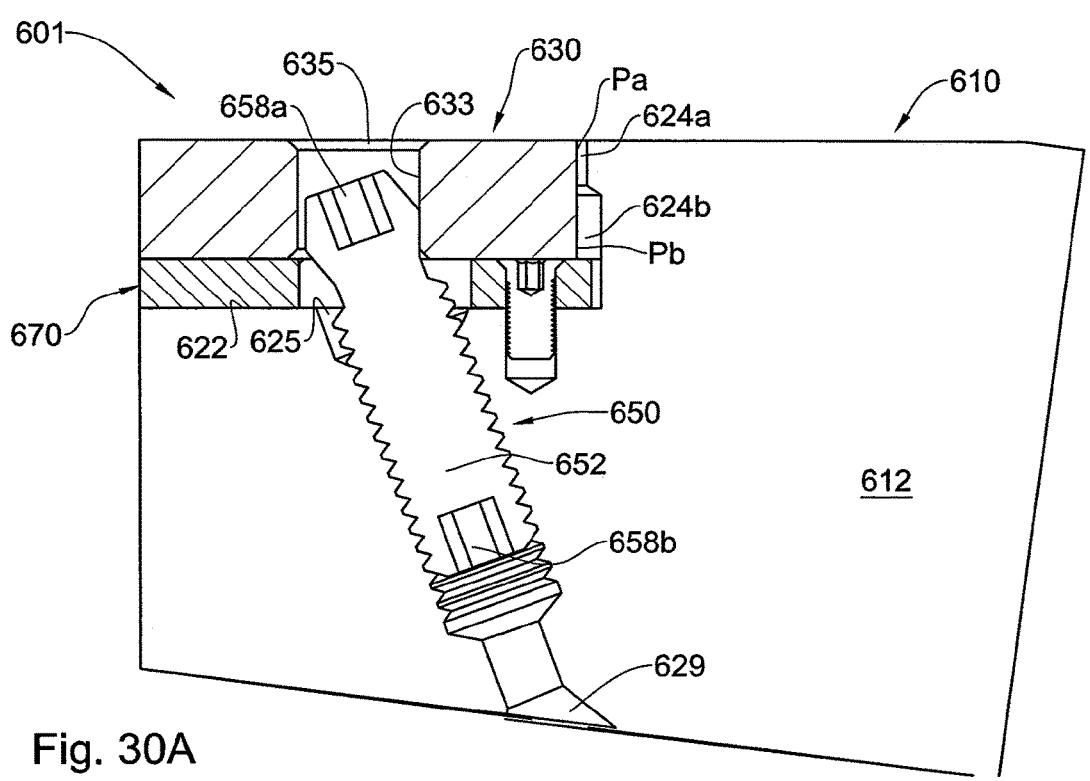
FIGS. 30A and 30B are schematic cross-section views of a turning tool according to another example of the present application, shown in open and closed positions respectively.
Figure 30B:
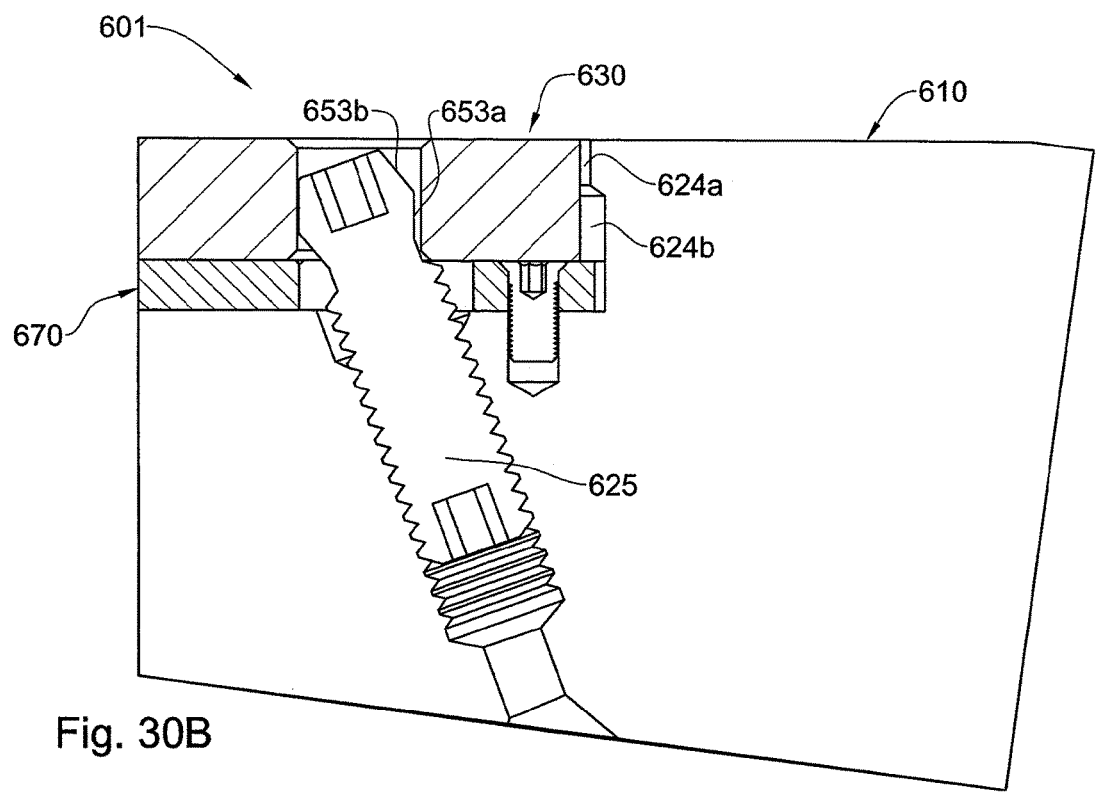
Figure 30C:
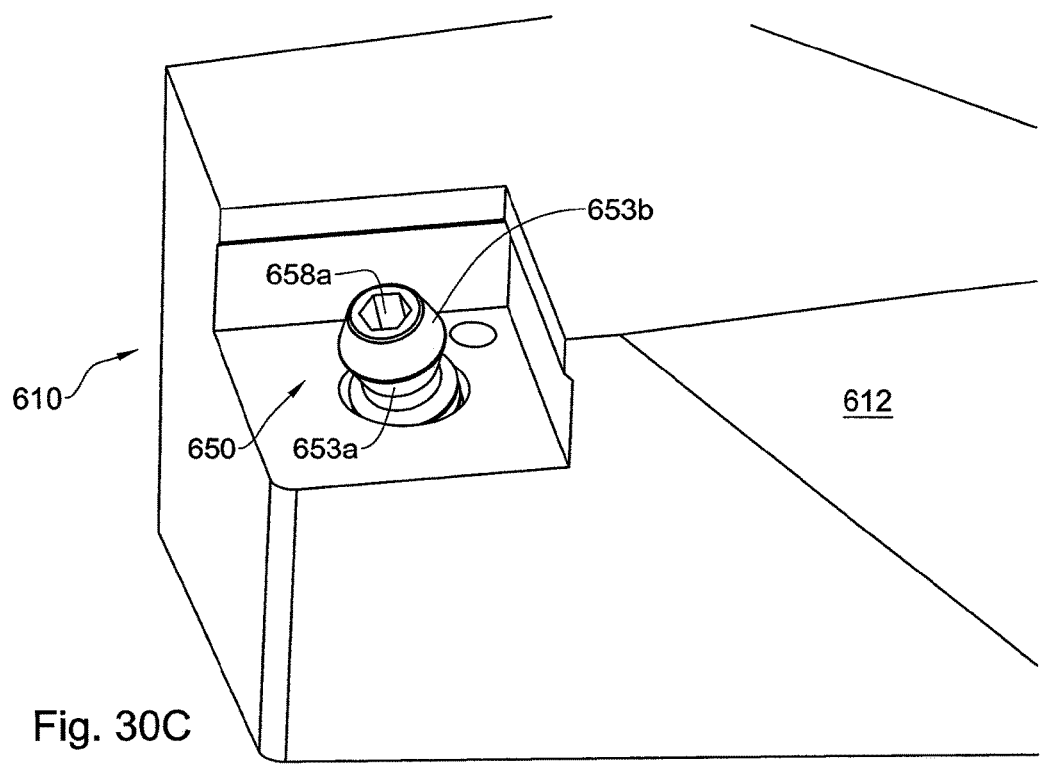
FIG. 30C is a schematic isometric view of the turning tool shown in FIGS. 30A and 30B.
Figure 30D:
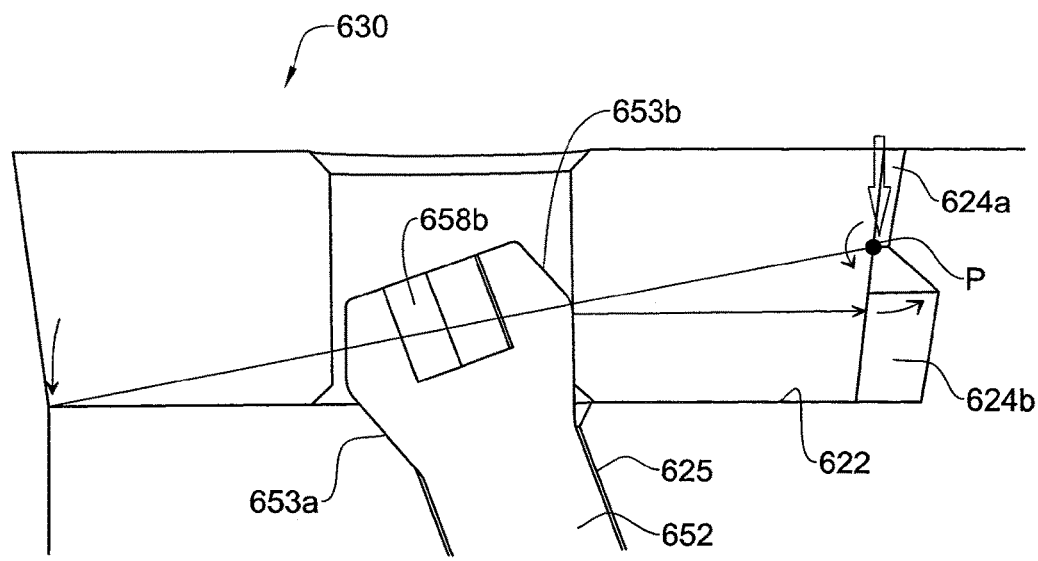
FIG. 30D is a schematic cross-section view of the turning tool shown in FIGS. 30A to 30C.

With particular reference being made to FIG. 30D, due to the above design, when the fastening screw 650 applies pressure to the cutting insert 630 against the sidewall 624, it results in an attempt to pivot the entire insert 630 about a pivot point P.

As a result, the cutting end of the cutting insert 630 is pressed in a downward direction (arrow F2), thereby fastening to cutting end to the base surface 622 and preventing disengagement of the cutting insert 630 therefrom.

Figure 31A:
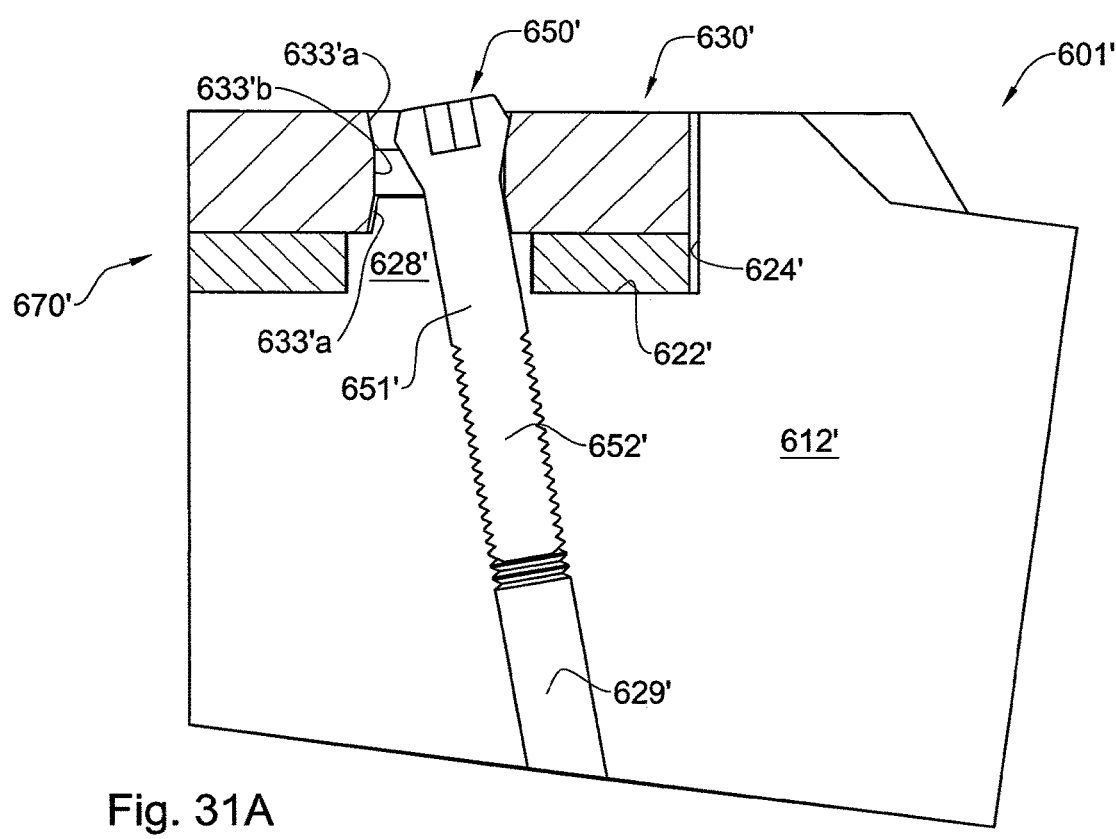
FIGS. 31A and 31B are schematic cross-section views of a turning tool according to another example of the present application, shown in open and closed positions respectively.
Figure 31B:
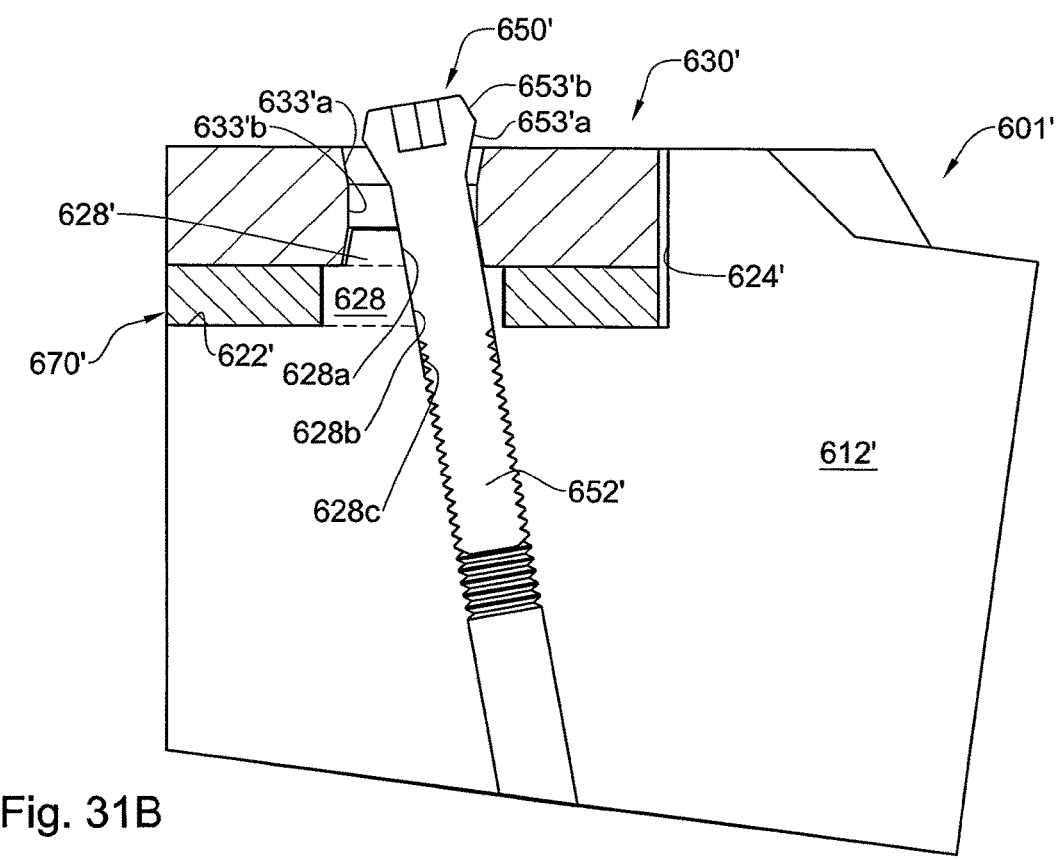
Figure 31C:
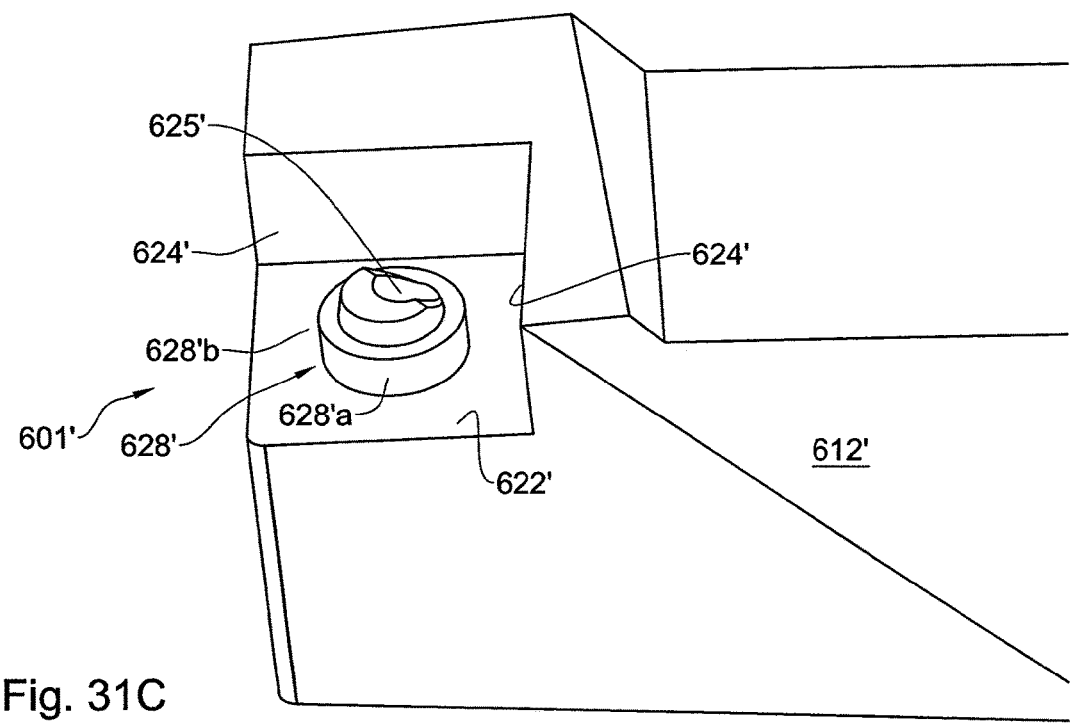
FIG. 31C is a schematic isometric view of the turning tool shown in FIGS. 31A and 31B.

Attention is now drawn to FIGS. 31A to 31C illustrating another example of a turning tool, generally designated as 601', and also comprising a holder 610', a seat 620', a cutting insert 630' (can be similar to that previously described) and a screw 650'.

One difference between the turning tool 601' and the previous turning tool 601, lies in the design of the cutting insert 630' and matching head 658' of the fastening screw 650'. In particular, the cutting insert 630 comprises a faceted inner surface of the insert bore thereof, so that, in fastening, the screw head 653' also presses down on the cutting insert 630', and doesn't jest press it against the side wall as in some of the previous example.

Another difference lies in the fact that the turning tool holder is formed with a static support 628' having a continuous support surface (non-threaded) with three consecutive portions —628a', 628b' and 628c'. It is observed that the surface portion 628a' lies above the base surface and above the surface of the support plate 670' (belongs to a portion of the support which is received within the bore of the cutting insert 630' itself), the surface portion 628b' which extends above the base surface 622' but below the surface of the support plate 670' (belongs to a portion of the support received within a bore of the support plate 670' and the surface portion 628c' extends below the base surface 622'.

It should be noted that the entire support surface 628' is configured for supporting the fastening screw 650', either the non-threaded portion 651' thereof or a portion of the screw head 653'.

Figure 32A:
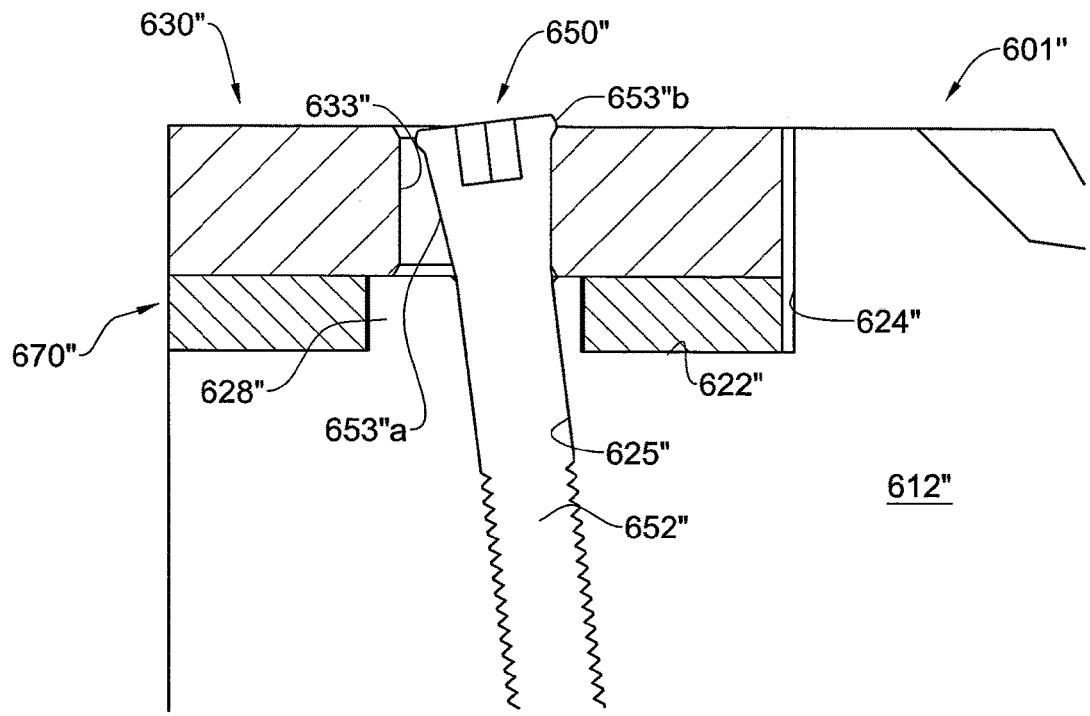
FIGS. 32A and 32B are schematic cross-section views of a turning tool according to another example of the present application, shown in open and closed positions respectively.
Figure 32B:
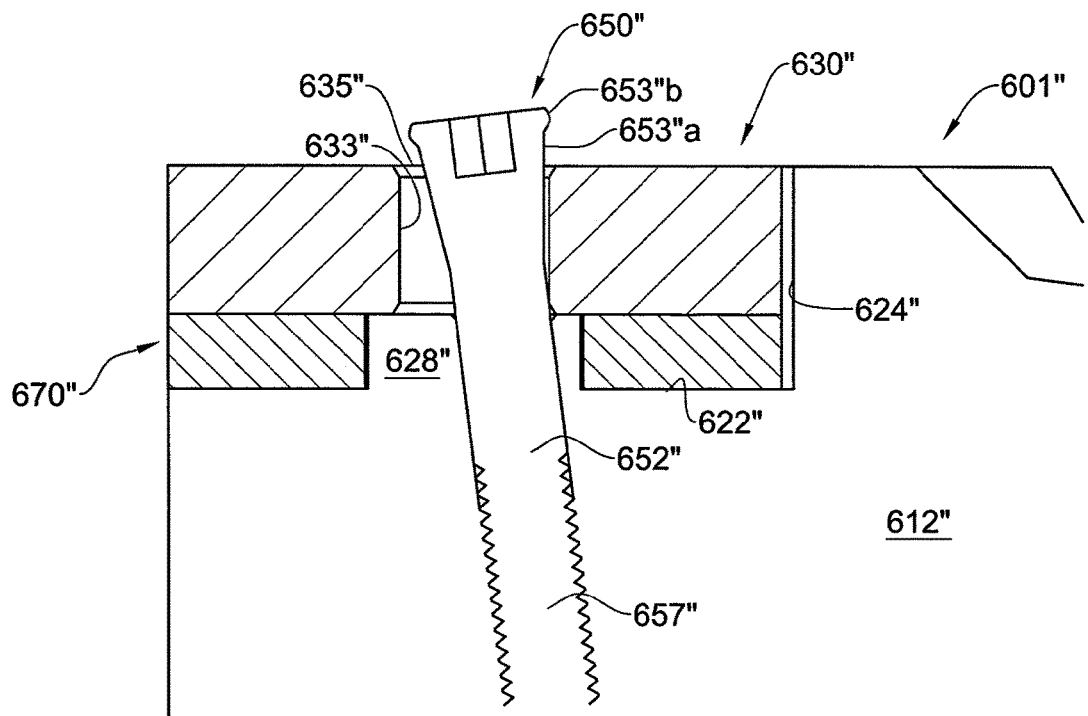

Attention is now drawn to FIGS. 32A to 32B illustrating another example of a turning tool, generally designated as 601", and also comprising a holder 610", a seat 620", a cutting insert 630" (can be similar to that previously described) and a screw 650".

In the present example, another variation is shown in which the cutting insert 630" is provided with chamfered areas 635" at the top and bottom ends of the insert bore thereof 633", and the fastening screw 650" is formed with an extended rim portion 653b" having an increased diameter, and configured for engaging with the chamfered portion 635" to thereby apply downward pressure on the turning insert 630".

Under the above arrangement, the fastening screw 650" is configured not only for pressing the cutting insert towards the side walls of the pocket of the cutting tool holder 610 but also press the cutting insert against the base surface 622" of the holder 610" and/or (in case of an existence of a support plate 670") the surface of the support plate.

Figure 32C:
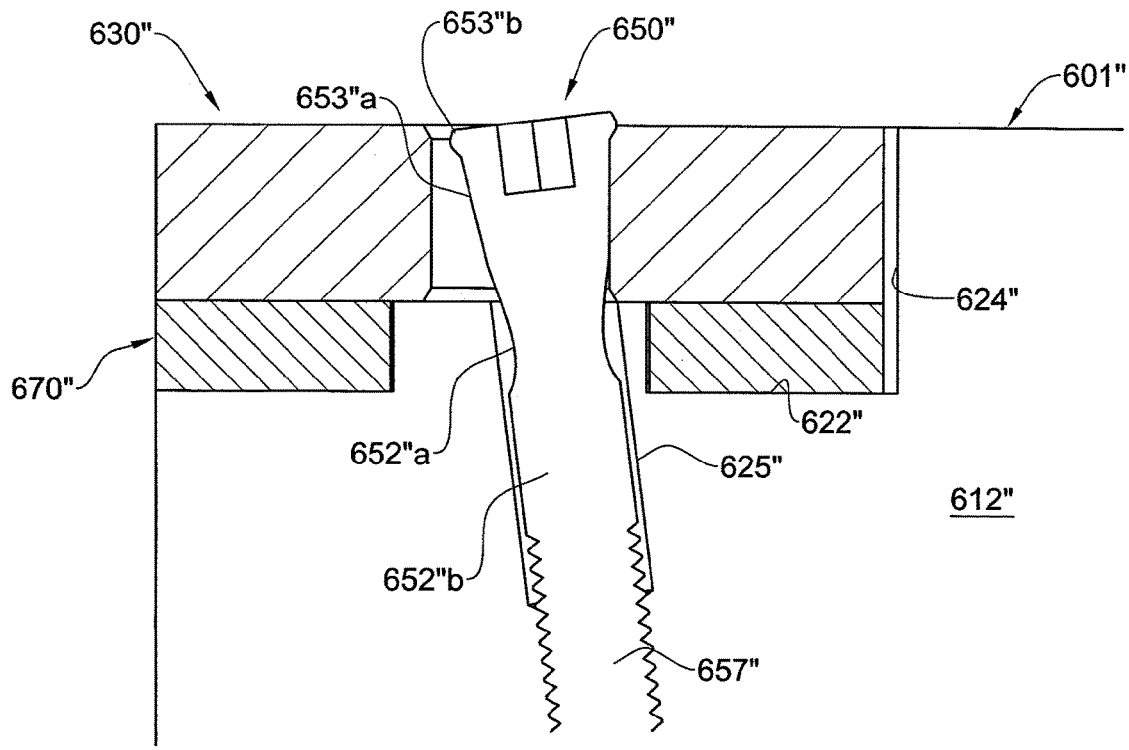
FIG. 32C is a schematic cross-section view of the turning tool shown in FIGS. 32A and 32B, with a different fastening screw being used therein.

With particular reference being made to FIG. 32C, a similar turning tool 601''' is shown, now comprising a different fastening screw 650''' and a slightly different configuration of the pocket. In particular, the fastening screw 650''' comprises a narrow neck portion 652b''' and the bore of the holder 625" which is wider than the stem of the fastening screw. Under this above design, the fastening screw can be allowed to slightly deform in order to increase the fastening capabilities thereof.

Figure 33A:
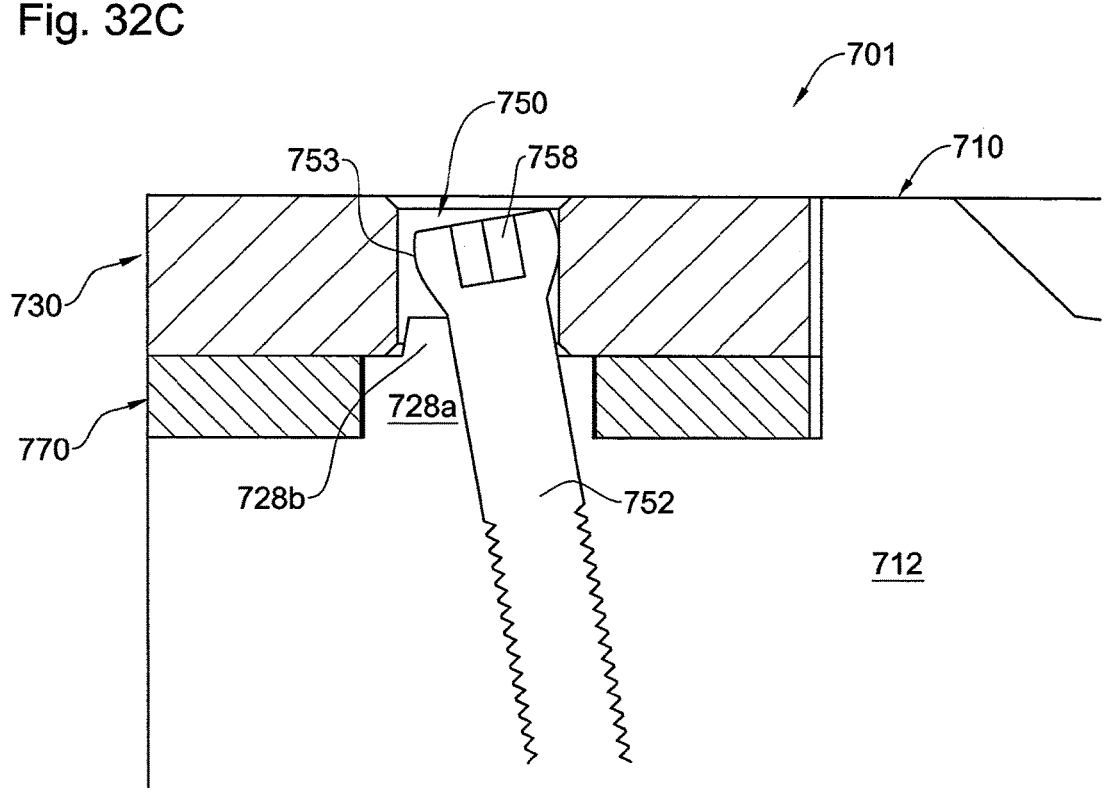
FIGS. 33A and 33B are schematic cross-section views of a turning tool according to another example of the present application, shown in open and closed positions respectively.
Figure 33B:
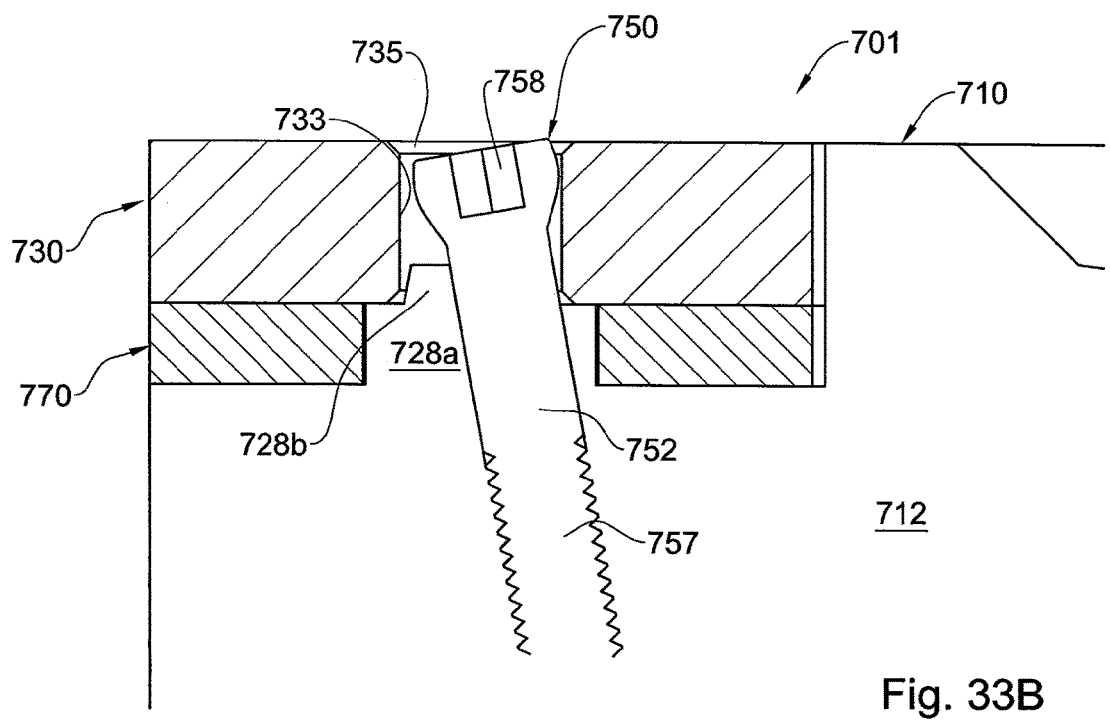

Attention is now drawn to FIGS. 33A and 33B illustrating another example of a turning tool, generally designated as 701, and also comprising a holder 710, a seat 720, a cutting insert 730 (can be similar to that previously described) and a screw 750.

As in previous examples, in the turning tool 701 there is also a support area 728 which extends both above and below the base surface 722 of the holder 710. Specifically, portion 728a extends above the base surface and below the cutting insert while portion 728b is configured for extending within the cutting insert. Both portion are configured for providing support to the stem and/or head of the fastening screw 750.

In addition, another difference lies in the design of the shape of the head of the screw 750, which has a spherical portion 753 configured for engaging the inner surface of the cutting insert 730.

Figure 34A:
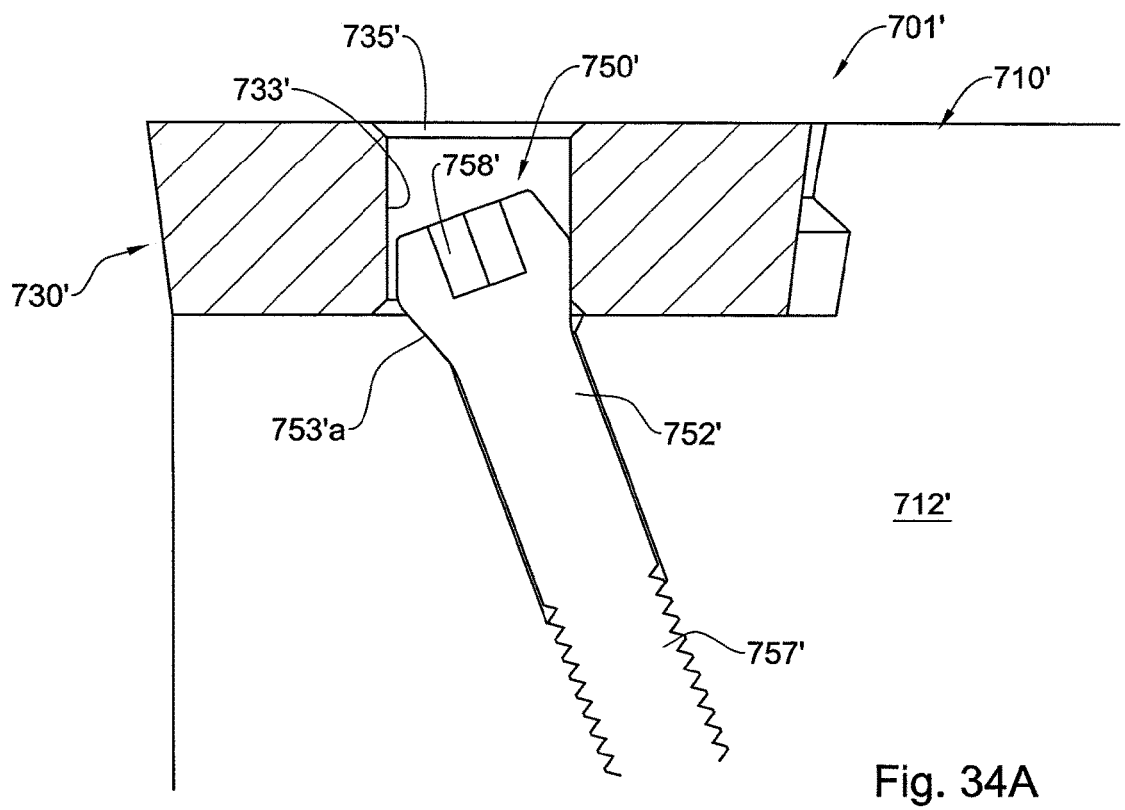
FIGS. 34A and 34B are schematic cross-section views of a turning tool according to another example of the present application, shown in open and closed positions respectively.
Figure 34B:
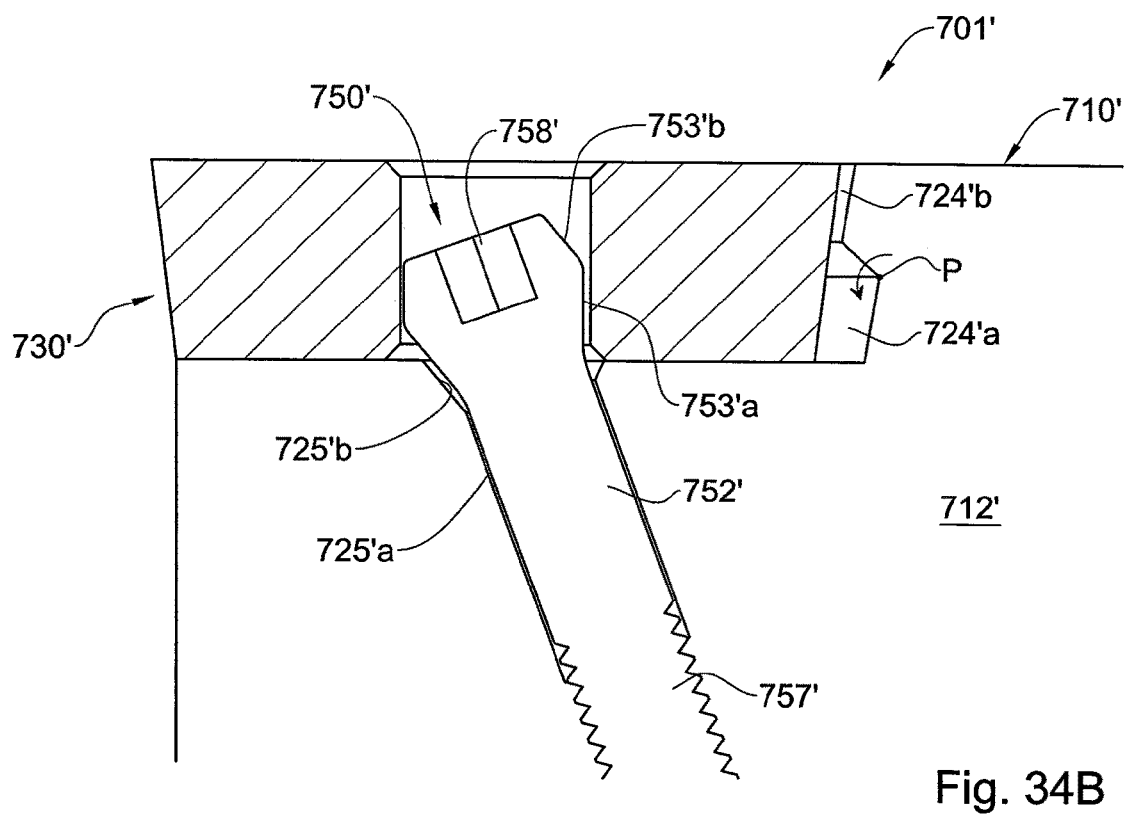
Figure 34C:
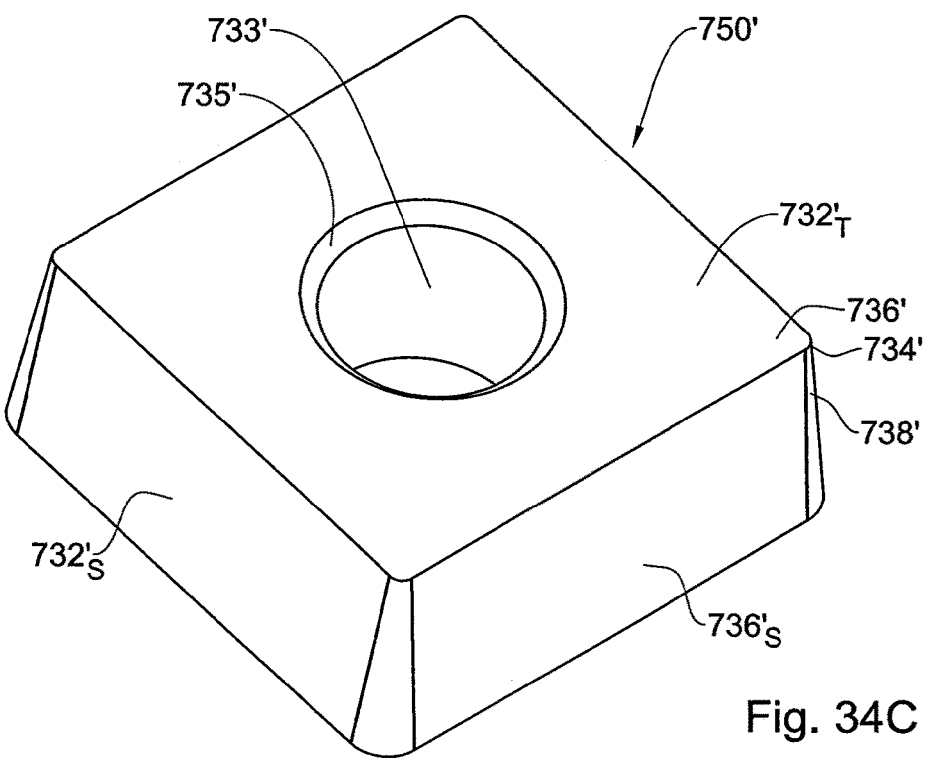
FIG. 34C is a schematic isometric view of a cutting insert used in the turning tool shown in FIGS. 34A and 34B.

Attention is now drawn to FIGS. 34A and 34B illustrating another example of a turning tool, generally designated as 701', and also comprising a holder 710', a seat 720', a cutting insert 730' (can be similar to that previously described) and a screw 750'.

In this particular example, a surface of the head 753a' of the screw 750' is supported by a support surface 725b' which is disposed below the level of the base surface 722'.

In addition, the bore portion 725a' through which the non-threaded portion of the screw 750' is received is also non-threaded and has a slightly larger diameter that than of the stem of the screw 750'. This allows for a certain degree of freedom during the fastening of the screw to the holder.

It is also noted that the turning insert 730' used herein is a positive turning insert, i.e. it tapers outwardly and therefore does not require considerably tilting thereof to get the cutting angle to the appropriate degree.

In this example, as in several previous examples, the side wall of the pocket of the holder 710' comprises two spaced apart support surfaces 724a, 724b, such that the upper surface 724b abuts the cutting insert 730' while the bottom surface 724b' does not, yielding a pivoting effect about a pivot point P, thereby pressing the working portion of the cutting insert downwards.

Figure 35A:
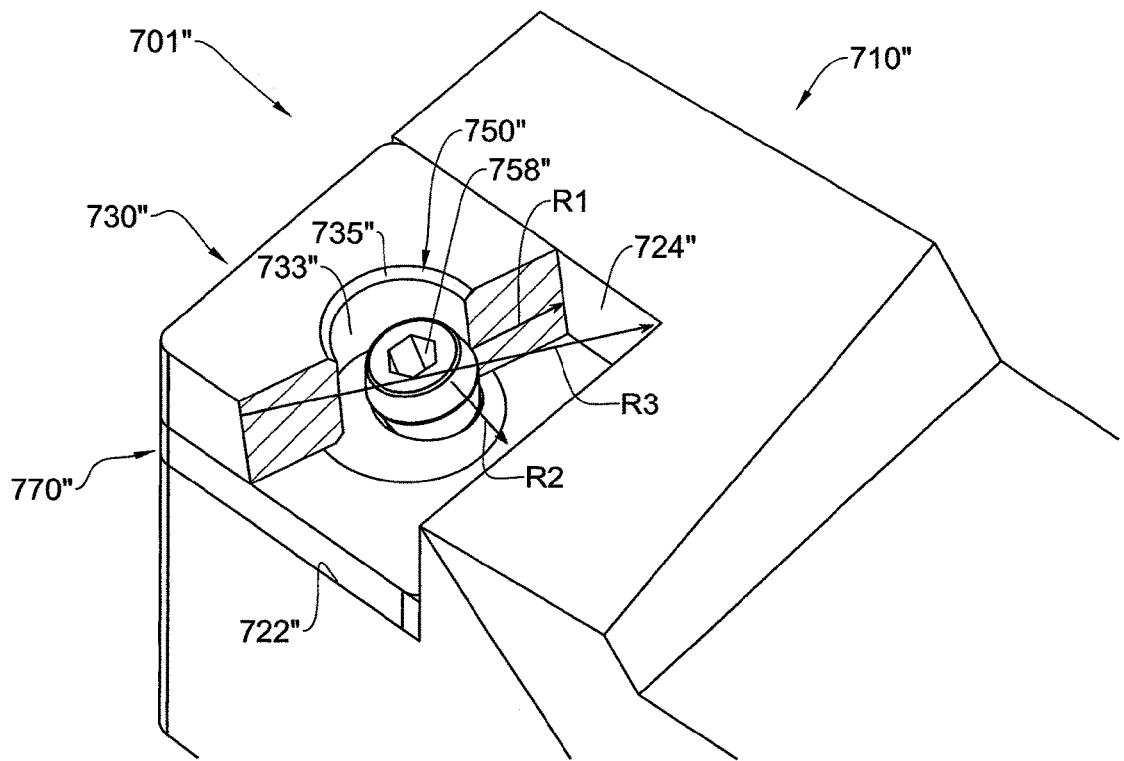
FIG. 35A is a schematic isometric view of a turning tool according to another example of the present application, show with a cutting insert thereof being sectioned.
Figure 35B:
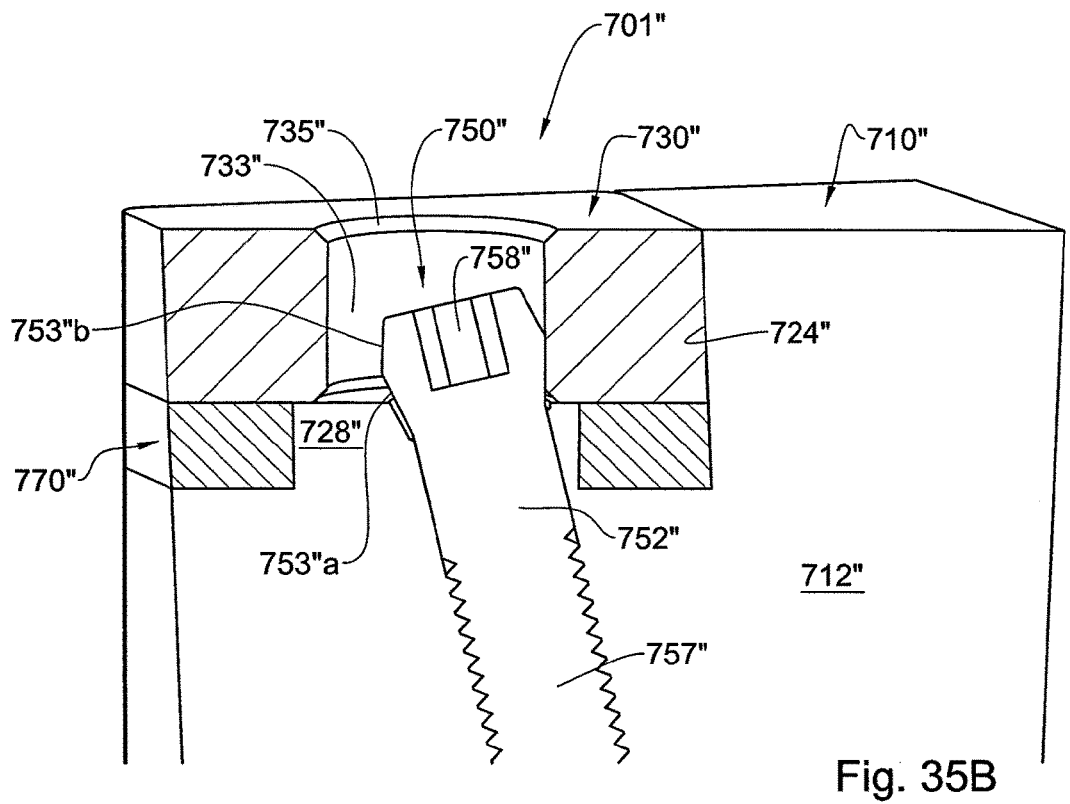
FIGS. 35B and 35C are schematic cross-section views of the turning tool shown in FIG. 35A, illustrated in open and closed positions respectively.
Figure 35C:
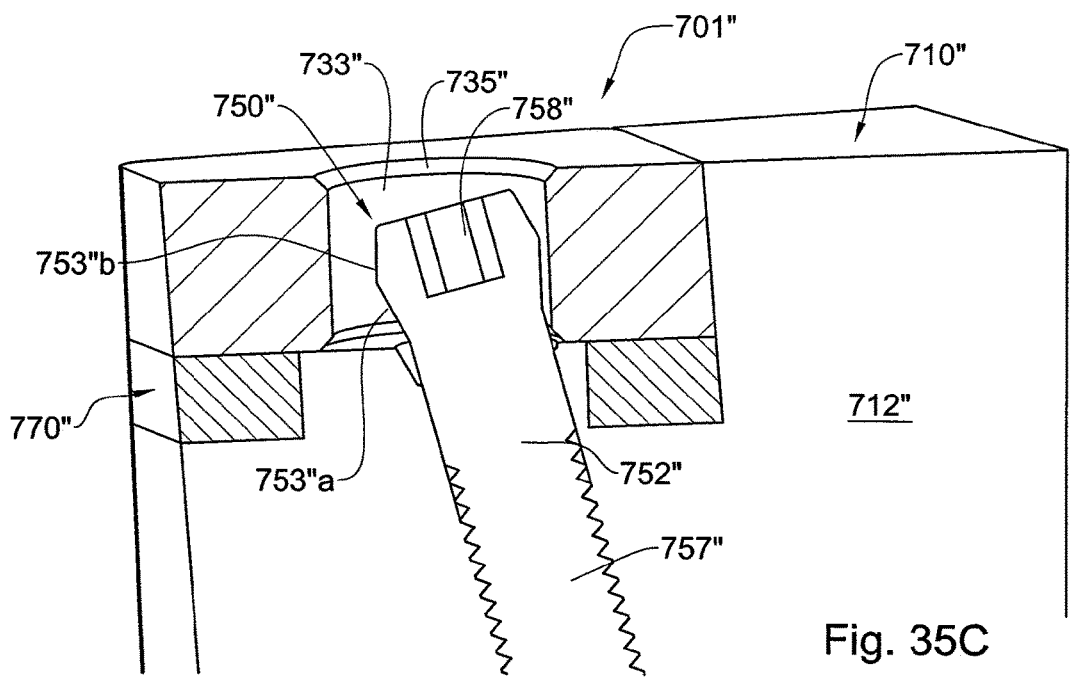

Attention is now drawn to FIGS. 35A to 35C illustrating another example of a turning tool, generally designated as 701", and also comprising a holder 710", a seat 720", a cutting insert 730" (can be similar to that previously described) and a screw 750".

The turning tool 701" of the above example defers from previous turning tools in that the fastening screw is angled with respect to the base surface such that it is not tilted directly towards the corner of the pocket of the turning tool holder 710" but rather tilting more towards one of the side walls.

Under the above design, the pressure applied to the cutting insert in direction R1 is greater than the pressure applied to the cutting insert 730" in direction R2. This can be particularly useful for side cutting operations in which the turning tool is configured for displacement in a direction opposite R1.

However, it is appreciated that a similar example could have been suggested, specifically beneficial for front cutting operation, in which the fastening screw is tilted to a greater extent towards the other side wall of the pocket.

In addition, in these example, it is observed that the support element 728" has a surface extending above the base surface 722" and configured for engaging and supporting the screw head in the closed position thereof.

Figure 36A:
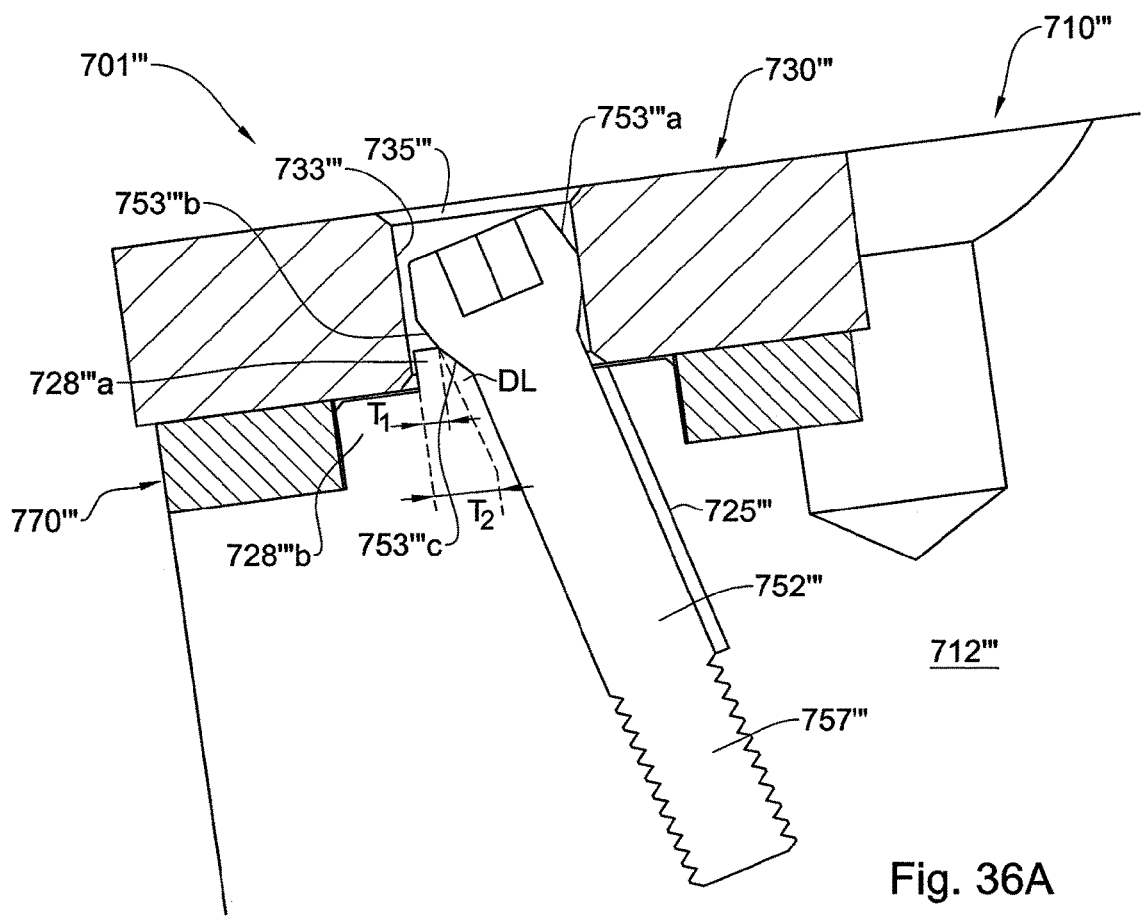
FIGS. 36A and 36B are schematic cross-section views of a turning tool according to another example of the present application, shown in open and closed positions respectively.
Figure 36B:
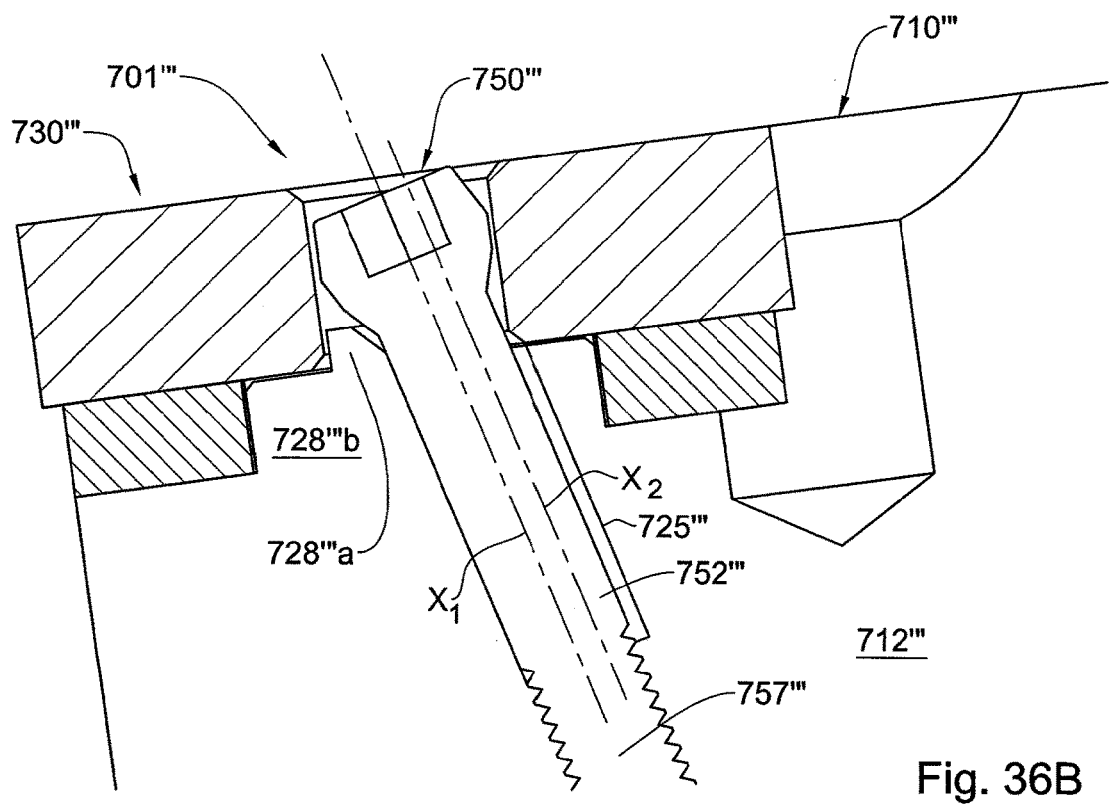
Figure 36C:
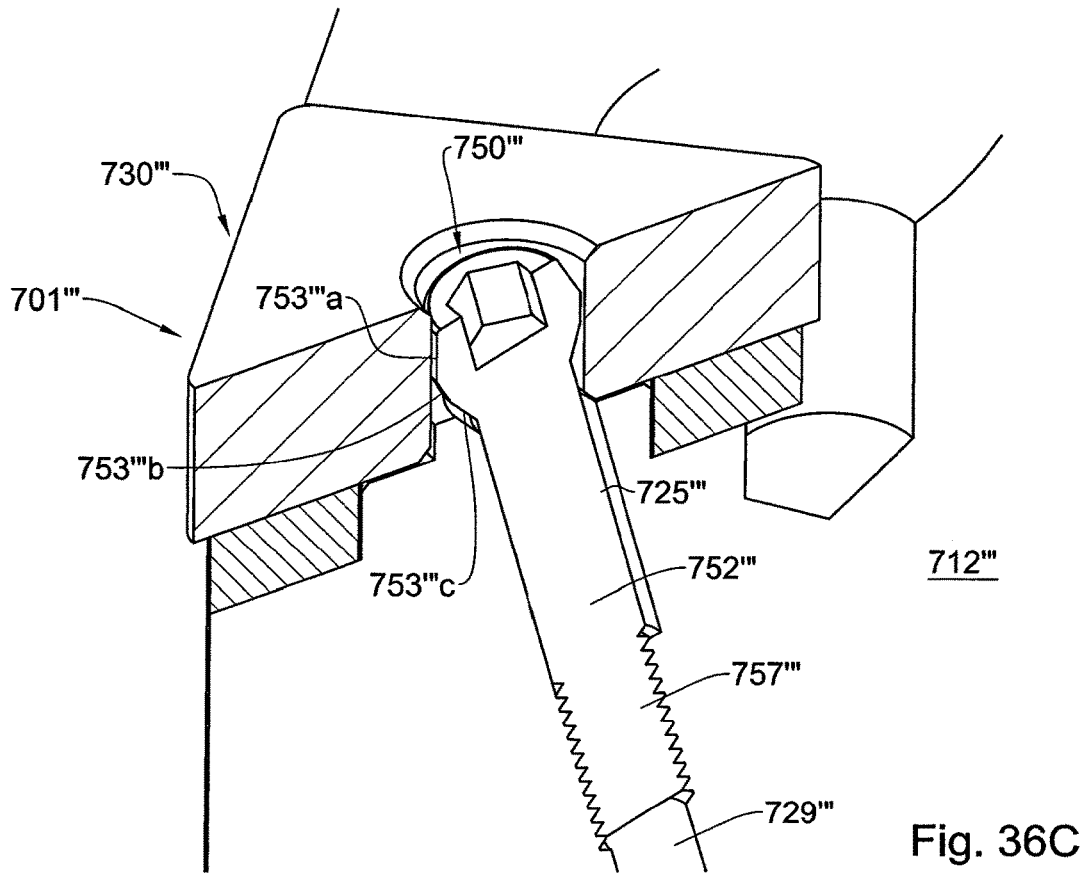
FIG. 36C is a schematic isometric cross-section view of the turning tool shown in FIGS. 36A and 36B.

Attention is now drawn to FIGS. 36A to 36C illustrating another example of a turning tool, generally designated as 701''', and also comprising a holder 710''', a seat 720''', a cutting insert 730''' (can be similar to that previously described) and a screw 750'''.

In this particular example, the head of the screw 750''' has three surfaces 753a''', 753b''' and 753c''', all angled to one another. The arrangement is such that the bottom surface 753c" is configured for engaging with the support 728''', the middle surface 753b''' is configured for engaging with the inner surface of the cutting insert and the top surface 753a''' is configured for guiding the cutting insert during its mounting onto the fastening screw 750'''.

It is also noted that compared to the previous examples in which there were only two surfaces, the support 728" is now more robust (more material). In particular, the dotted line DL denotes the support of previous examples, showing it to be of thickness T1, whereas in the present example the thickness is increased to T2.

In addition, it is observed that the bore of the tool holder 710''' is configured for supporting the stem of the screw 750''' on the side opposite the side walls of the holder 710'''. Specifically, the axis X1 of the screw 750''' and the axis X2 of the bore 725''' are offset one another. This provides another degree of freedom in fixing the fastening screw.

Figure 37A:
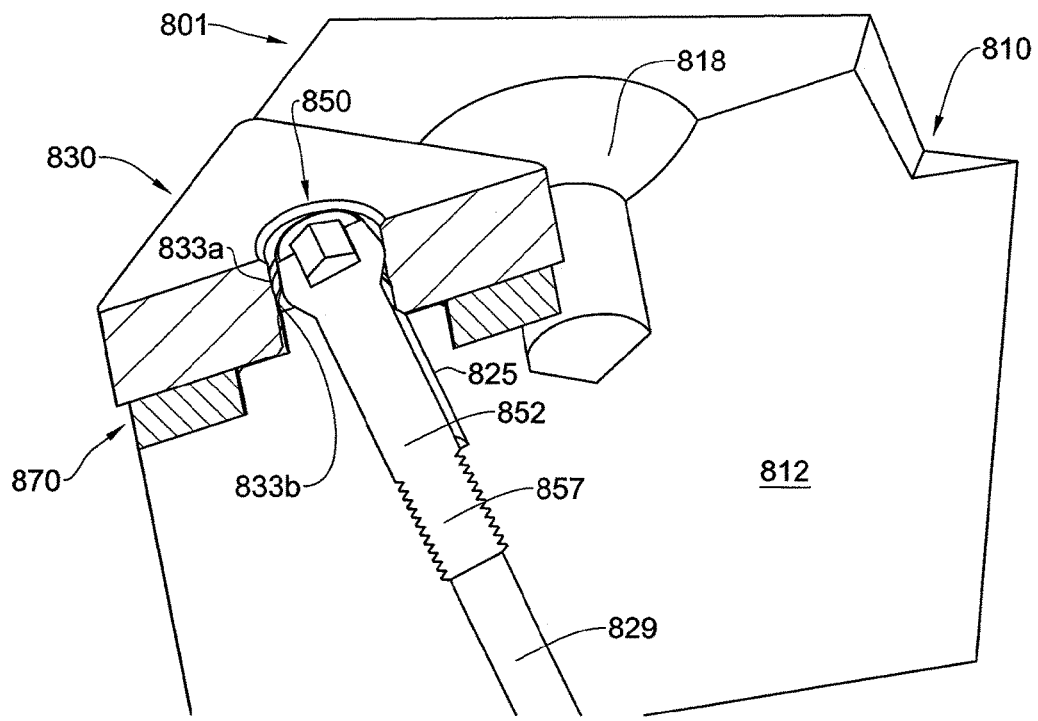
FIG. 37A is a schematic isometric view of a turning tool according to another example of the present application, show with a cutting insert thereof being sectioned.
Figure 37B:
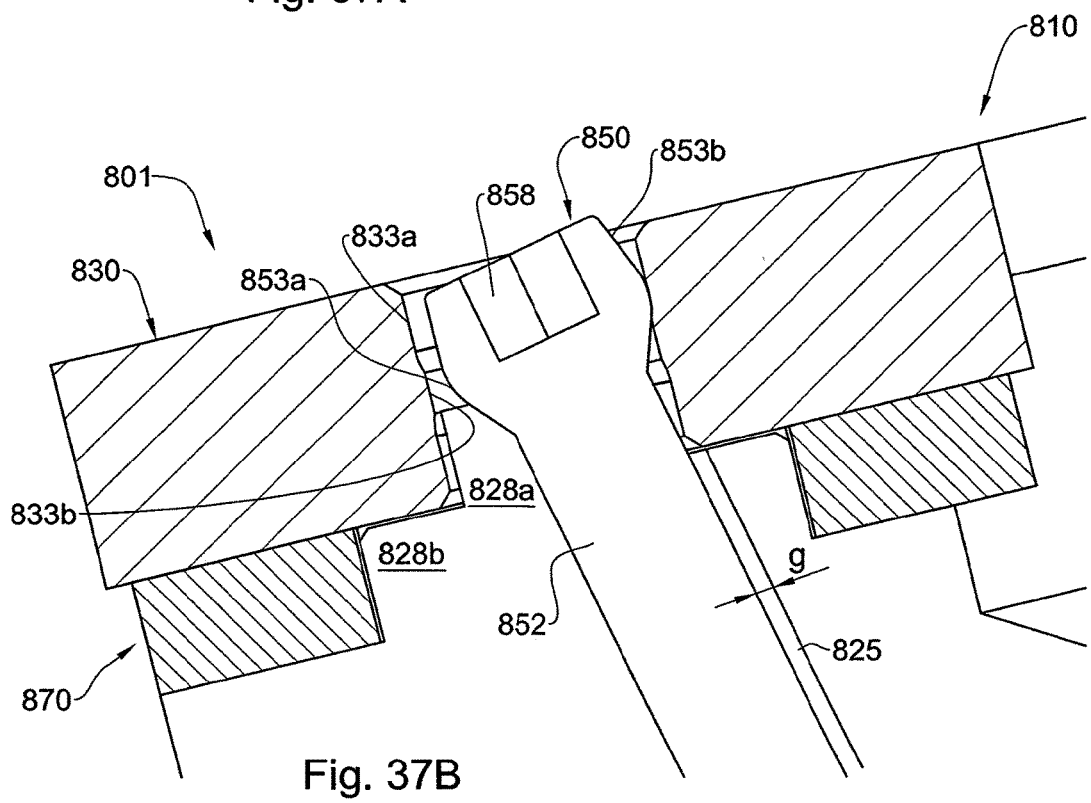
FIGS. 37B and 37C are schematic cross-section views of the turning tool shown in FIG. 37A, illustrated in open and closed positions respectively.
Figure 37C:
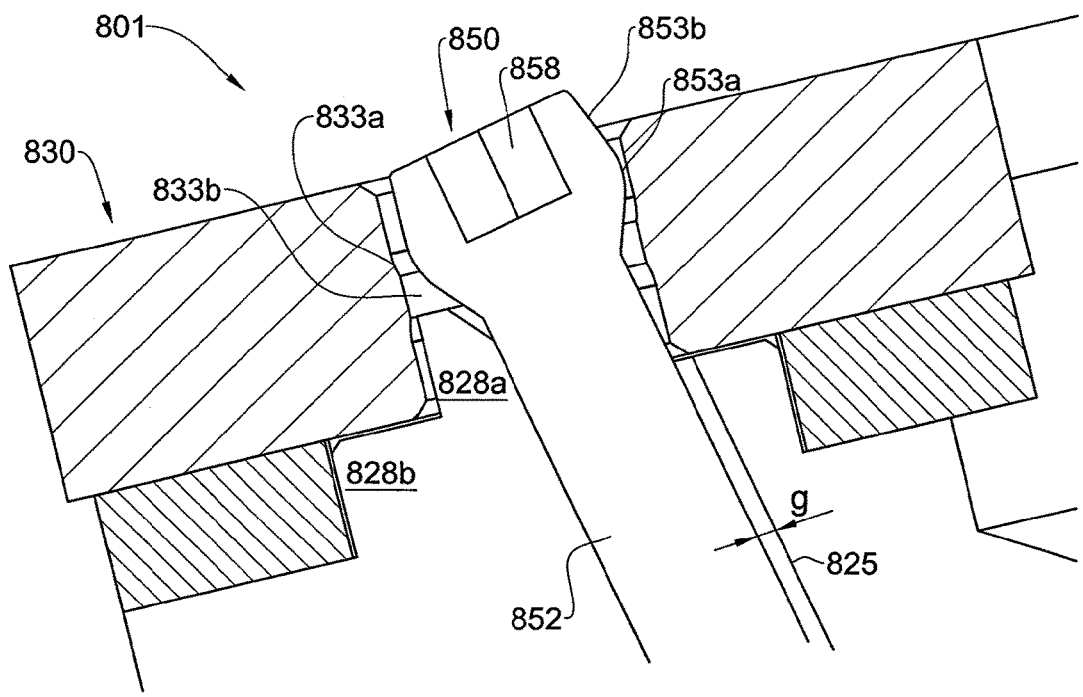

Attention is now drawn to FIGS. 37A to 37C illustrating another example of a turning tool, generally designated as 801, and also comprising a holder 810, a seat 820, a cutting insert 830 (can be similar to that previously described) and a screw 850.

As in the previously disclosed example of turning tool 610', the cutting insert 830 is reversible but is formed with two spherical surfaces 833a which correspond to the spherical surface of the head of the screw 853a. The engagement between spherical surfaces increases the contact area between the head of the screw and the cutting insert, allowing for firmer engagement therebetween.

In addition, it is noted that the turning tool 801 is provided with an indent 818 configured for allowing the user to easily extract the cutting insert 830 from the holder 801 by providing a space for a user's finger.

Figure 38A:
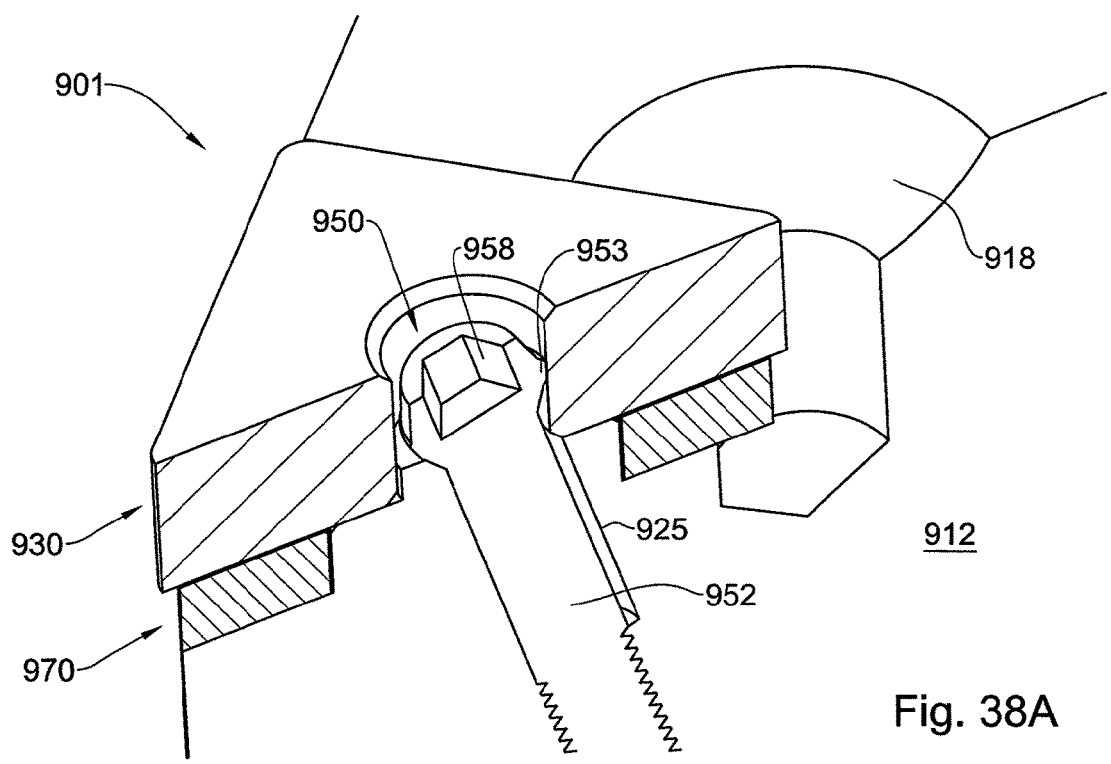
FIGS. 38A and 38B are schematic isometric cross-section views of a turning tool according to another example of the present application, shown in open and closed positions respectively.
Figure 38B:
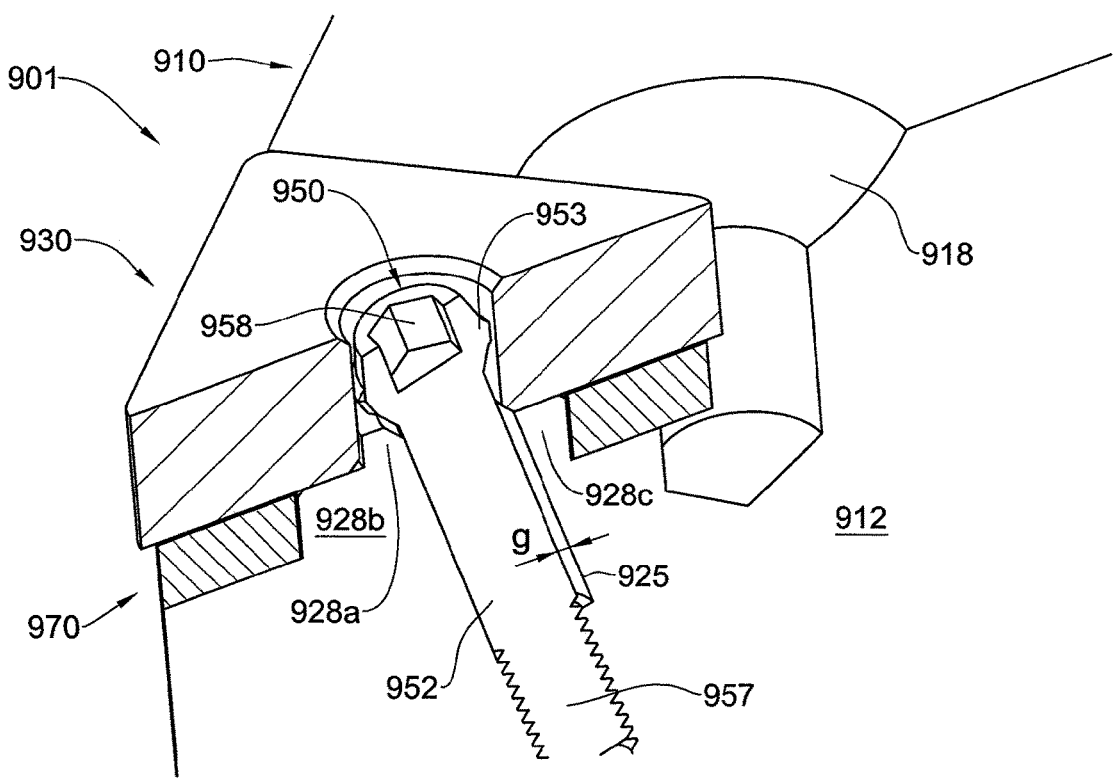
Figure 38C:
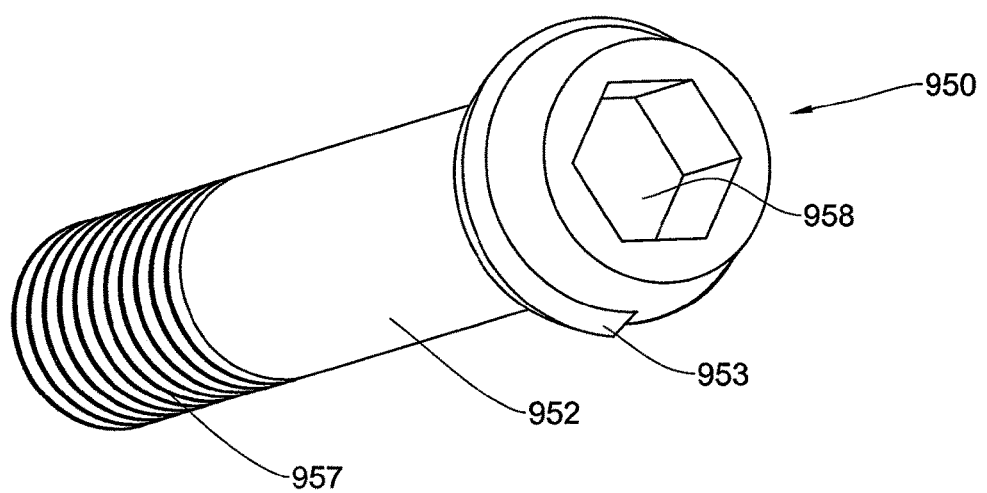
FIG. 38C is a schematic isometric view of a fastening screw used in the turning tool shown in FIGS. 38A and 38B.

Turning now to FIGS. 38A to 38C, yet another example of a cutting tool is shown, generally designated as 901, and comprising a cutting tool holder 910, a cutting insert 930 and a clamping screw 950.

Contrary to the previous examples, the clamping screw 950 of the cutting tool 901 is provided with an eccentric head portion 953, so that upon revolving the clamping screw 950 about its axis, not only does the head 953 thereof displaces closer to the side wall of the seat 920, but the eccentricity of the head portion facilitates further clamping and better pressure on the cutting insert.

It is noted that, as in previous examples, the seat 920 is formed with a support portion 928a which is configured for engaging a portion of the head 953 of the clamping screw 950. Moreover, it is observed that a part of the support portion 928b is received within the support plate 970, so that the bottom of the cutting insert rests on both the support plate 970 and the support portion 928b.

Figure 39A:
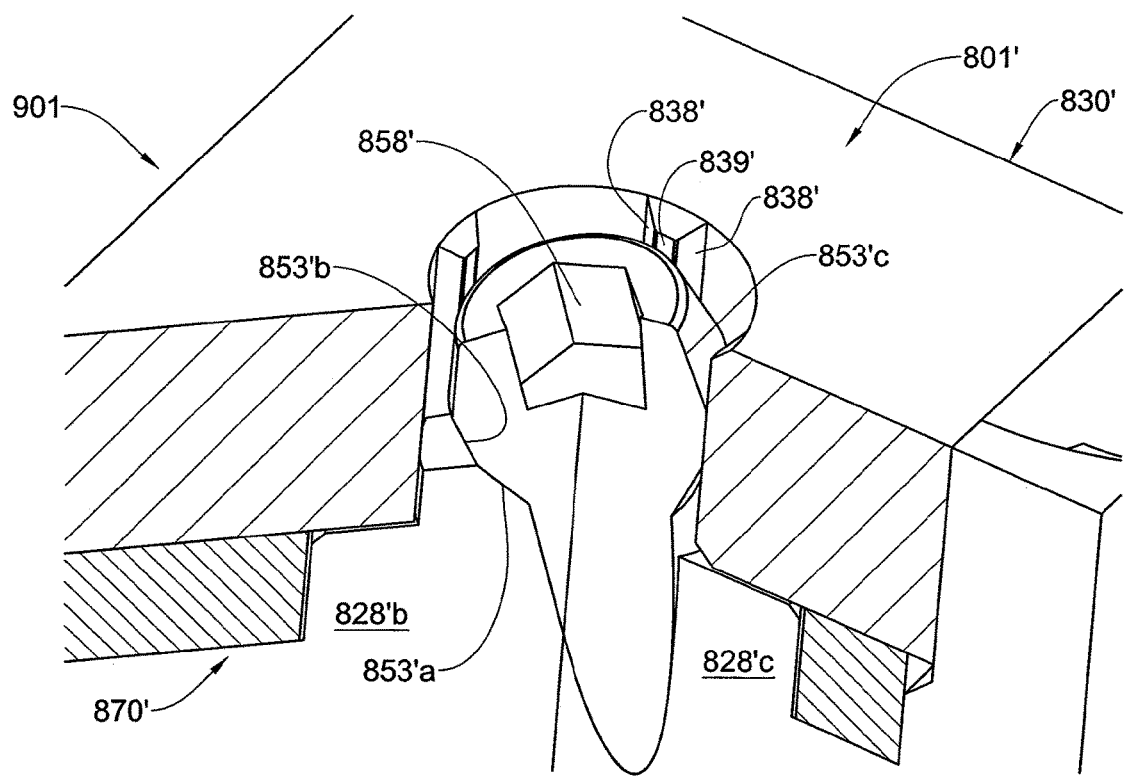
FIG. 39A is a schematic isometric cross-section view of a turning tool according to another example of the present application.
Figure 39B:
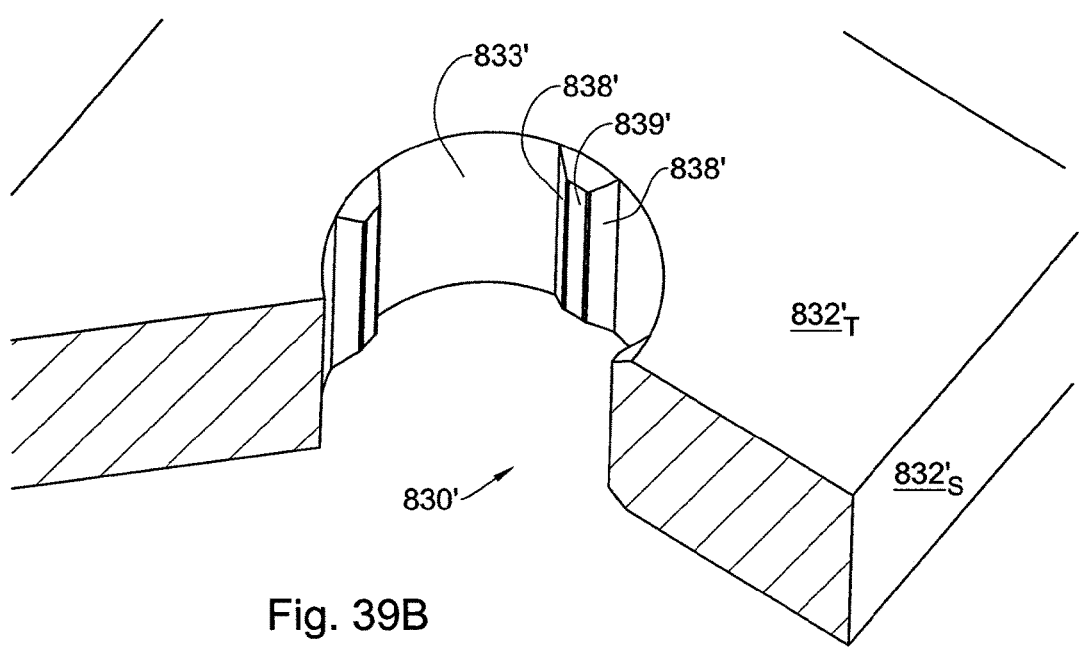
FIG. 39B is a schematic isometric cross-section view of a turning insert used in the turning tool shown in FIG. 39A.

Attention is now drawn to FIGS. 39A and 39B, in which another example of a turning tool is shown, generally and comprising a cutting tool holder 910", a cutting insert 930" and a clamping screw 950".

It is observed that the bore 935' of the cutting insert 930' is provided with inwardly extending support elements 938', equally disposed about the axis of the bore. The elements 938' are configured for engagement with the head portion 953' of the clamping screw, defining a smaller diameter than that of the insert bore 935'. It is noted that the support elements do not extend all the way along the bore of the cutting insert 930'.

It is further observed that the seat is provided with a support structure, similarly to the previous example, which has a support portion 928' configured for being received within the bore of the cutting insert.

Thus, the cutting tool 901' is limited to the use of this specific cutting insert 930'. In particular, should someone use a cutting insert with an insert bore without support elements, the head portion 953' of the clamping screw 950' will not engage the inner surface of the bore and thus will not be able to properly secure the cutting insert. Alternatively, should someone use an insert with an insert bore of a smaller diameter, equivalent to that defined by the support elements 938', the cutting insert would not be able to fit over the support portion 928a'.

Figure 40A:
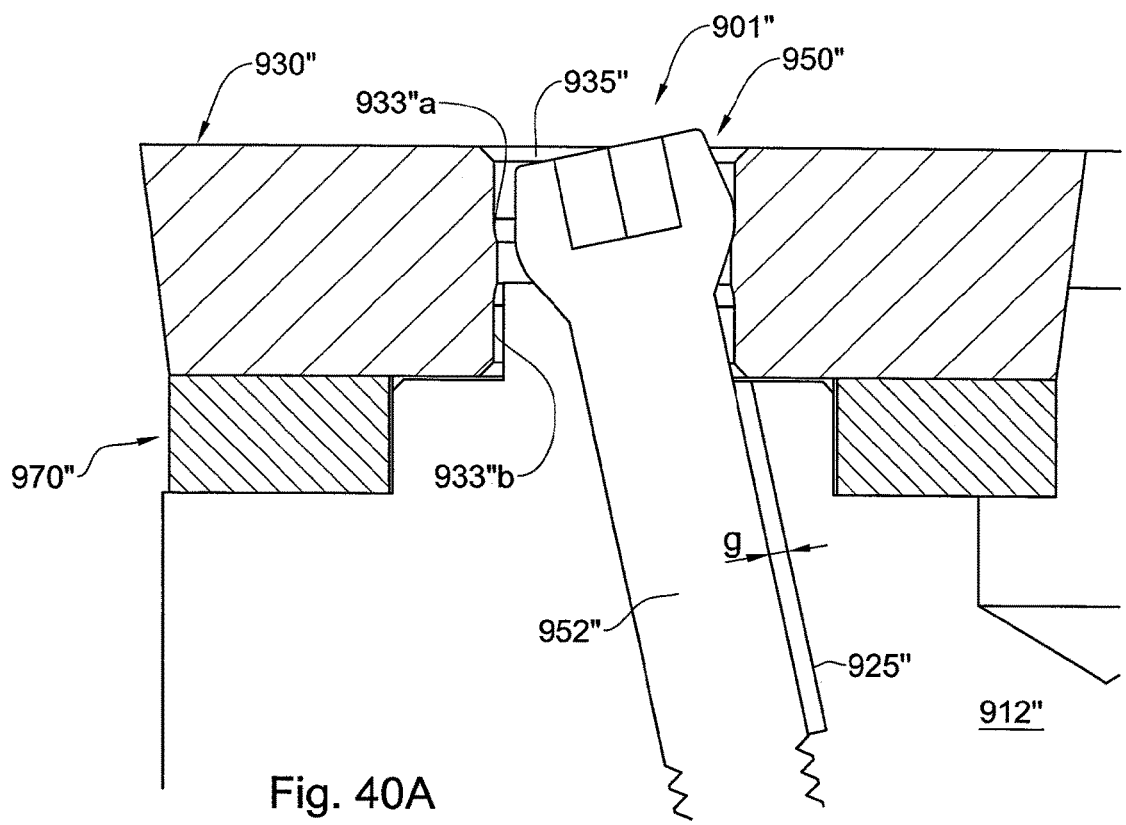
FIGS. 40A and 40B are schematic cross-section views of a turning tool according to another example of the present application, shown in open and closed positions respectively.
Figure 40B:
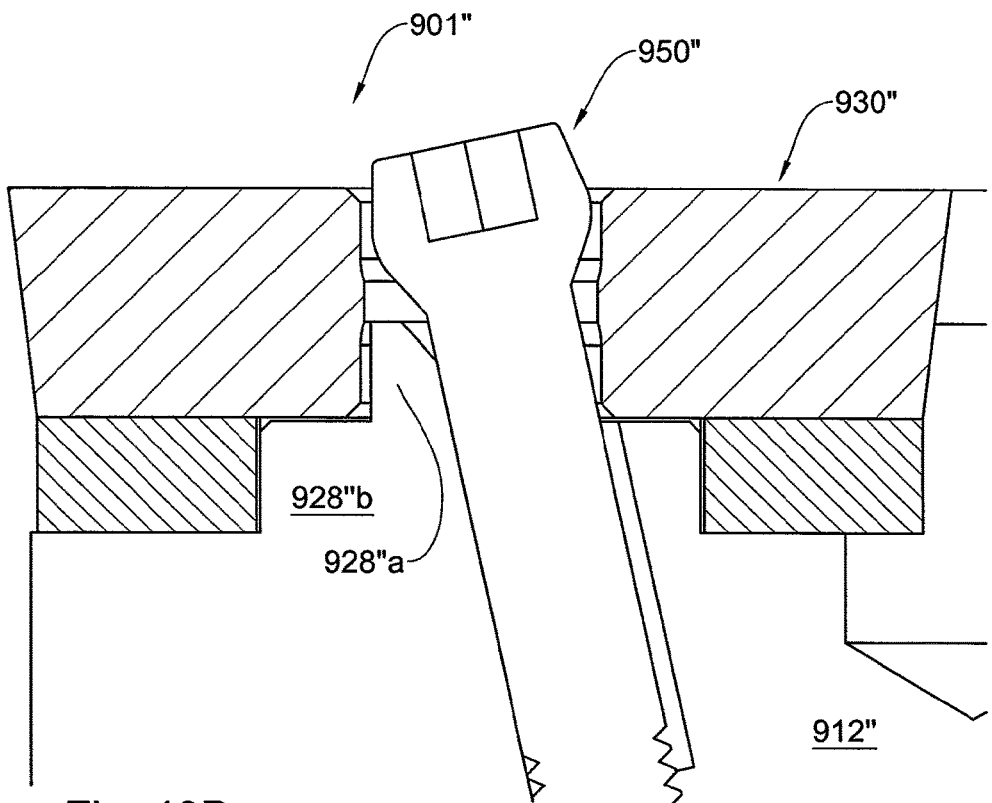

Turning now to FIGS. 40A and 40B, another example of a cutting tool is shown, generally designated as 901", and comprising a cutting tool holder 910", a cutting insert 930" and a clamping screw 950".

The cutting tool 901" is similar to the previously described cutting tool 901', with the difference being that the support element 938' is radially disposed (and not axially). Similar to the previous example, in this case it would also be difficult to use a different cutting insert and clamping screw with the same cutting tool holder 910".

In addition, the bore of the cutting insert 930" comprises a spherical inner surface which is configured to engage a corresponding spherical surface of the clamping screw, thereby providing an extended contact surface between the latter and the former (this being opposed to a conical configuration in which the contact is along a contact line).

Figure 41A:
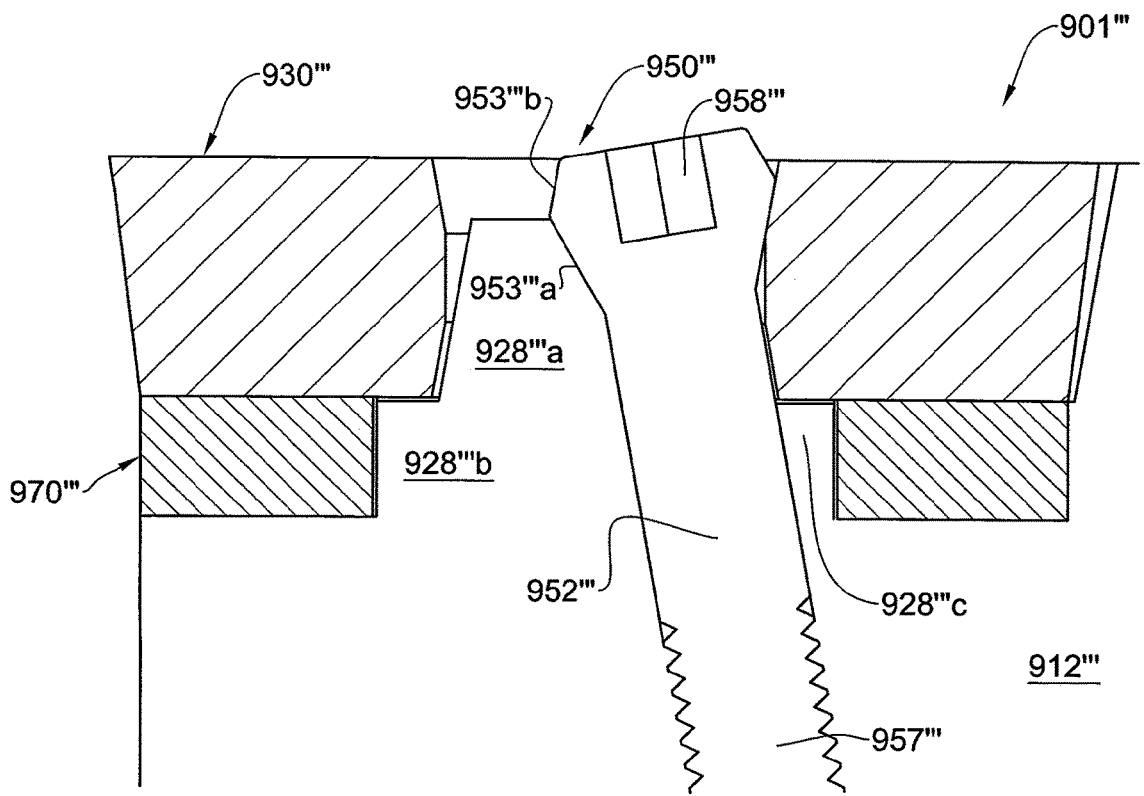
FIGS. 41A and 41B are schematic cross-section views of a turning tool according to another example of the present application, shown in open and closed positions respectively.
Figure 41B:
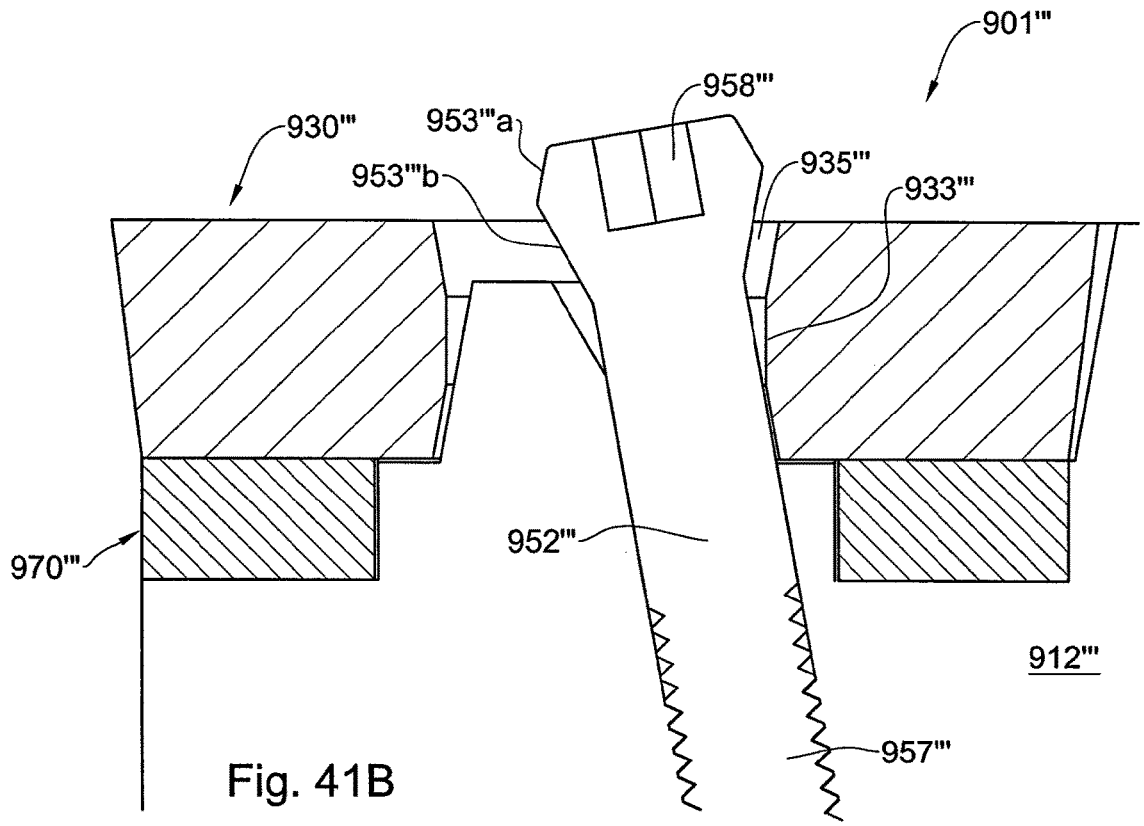

Attention is now drawn to FIGS. 41A and 41B, in which yet another example of a cutting tool is shown, generally designated as 901''', and comprising a cutting tool holder 910''', a cutting insert 930''' and a clamping screw 950'''.

In the present example, the cutting insert 930''' is a positive angle cutting insert, meaning that the cutting tool 901''' is not required to be tilted during operation thereof.

With respect to the present example, it is also noted that when the clamping screw 950''' is in its second, secured position, one portion of the surface 953a''' engages the support portion 928a''' and another portion of the same surface 953a''' engages the inner surface 935''' of the bore of the cutting insert 930'''. Thus, in the secured position, the head portion of the clamping screw 950''' is held tight, whereby deformation to the head portion about the neck of the clamping screw is prevented or at least highly reduced.

Figure 42A:
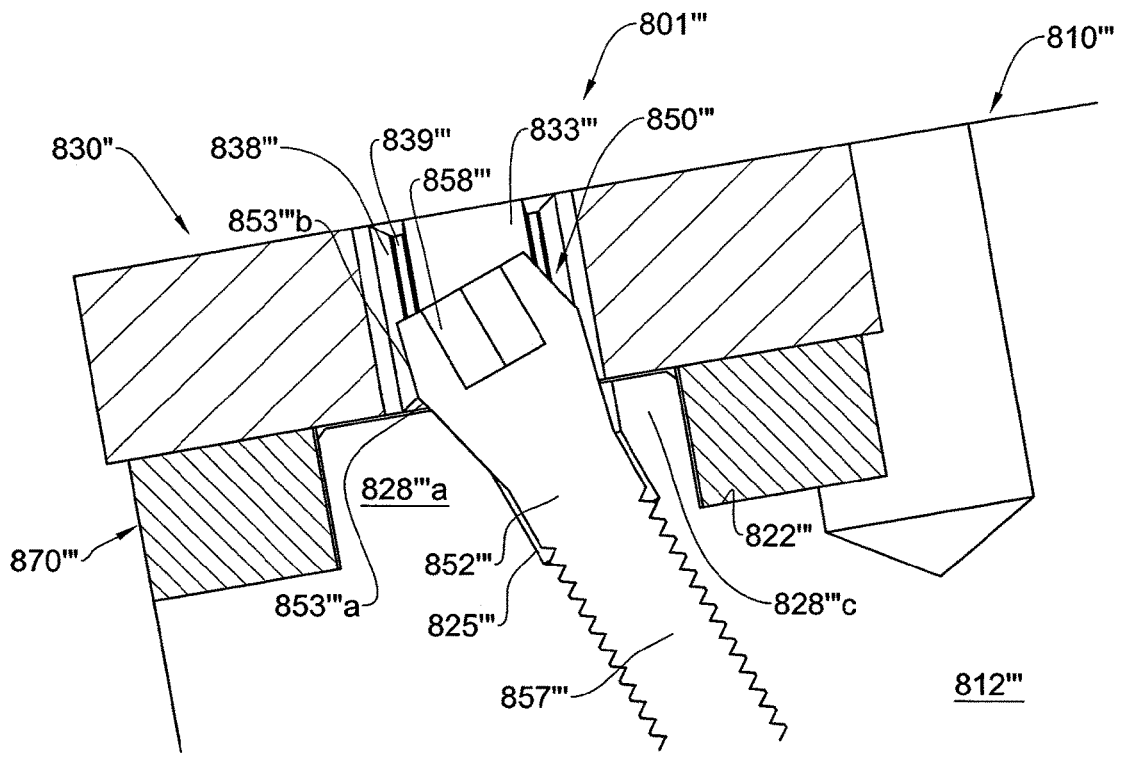
FIGS. 42A and 42B are schematic cross-section views of a turning tool according to another example of the present application, shown in open and closed positions respectively.
Figure 42B:
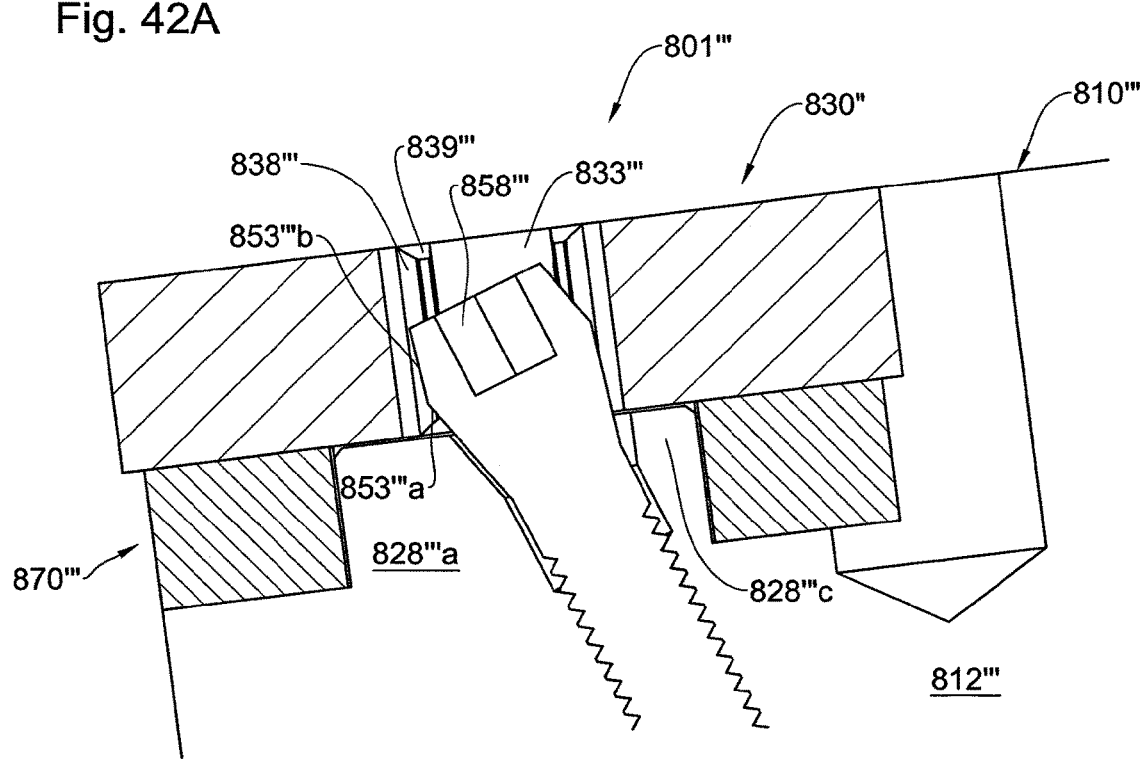

Turning now to FIGS. 42A and 42B, another example of a turning tool is shown, generally designated as 801''', and also comprising a holder 810', a seat 820''', a cutting insert 830''' and a screw 850'.

The cutting tool 810''' is similar to the cutting tool 801' previously described, with the difference being that the support elements 838''' of the cutting insert 830''' extend all the way along the bore 835''' thereof and the support structure 828''' is not configured for being received within the insert bore 835'''.

Figure 43A:
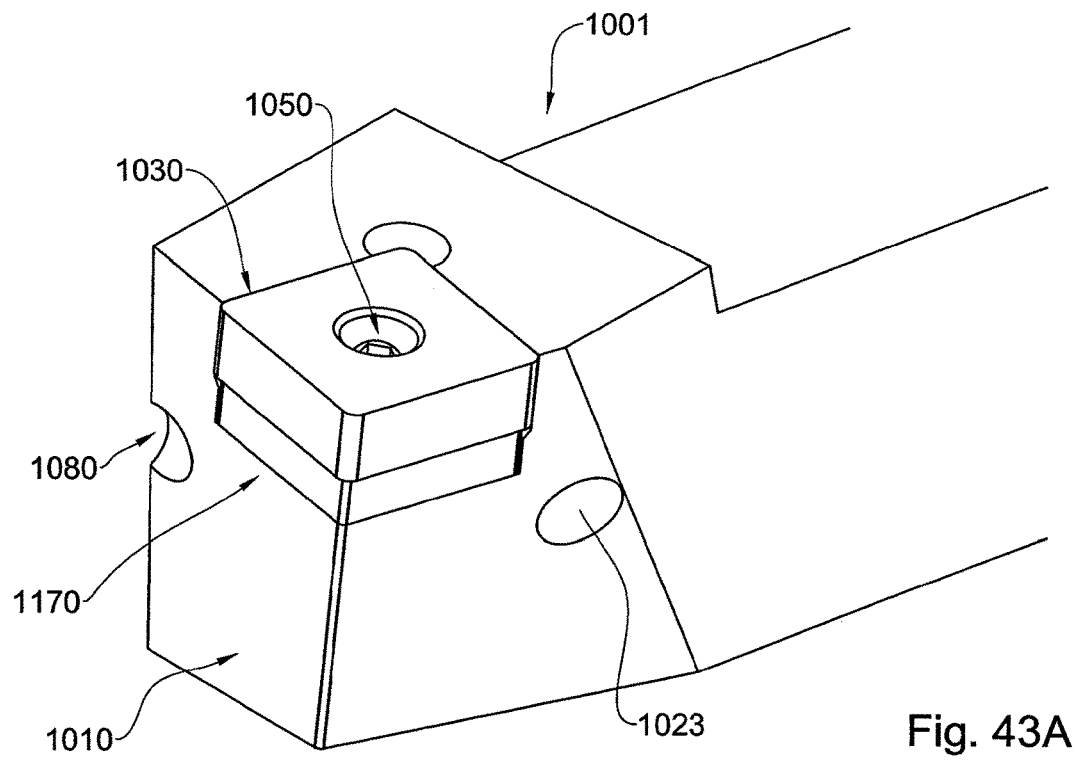
FIG. 43A is a schematic isometric view of a turning tool according to still another example of the present application.
Figure 43B:
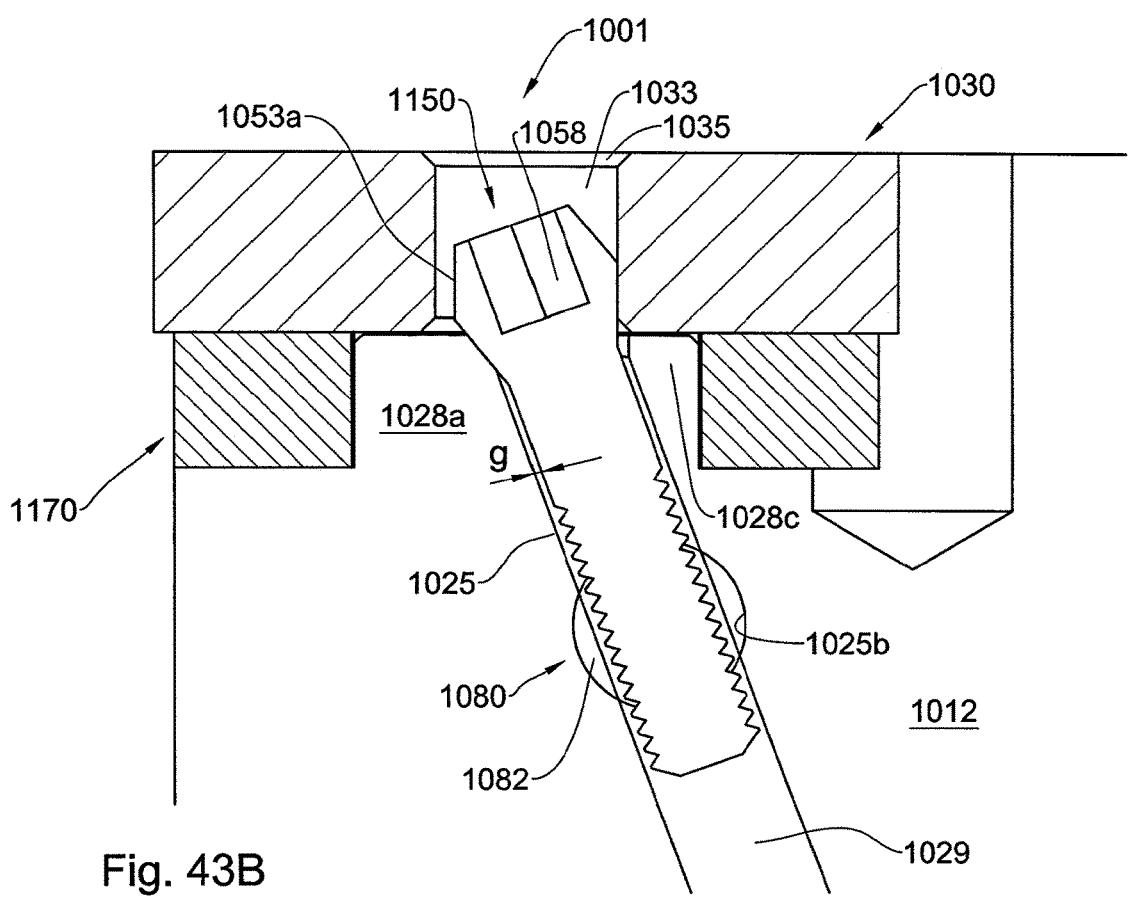
FIG. 43B is a schematic cross-section view of the turning tool shown in FIG. 43A.
Figure 43C:
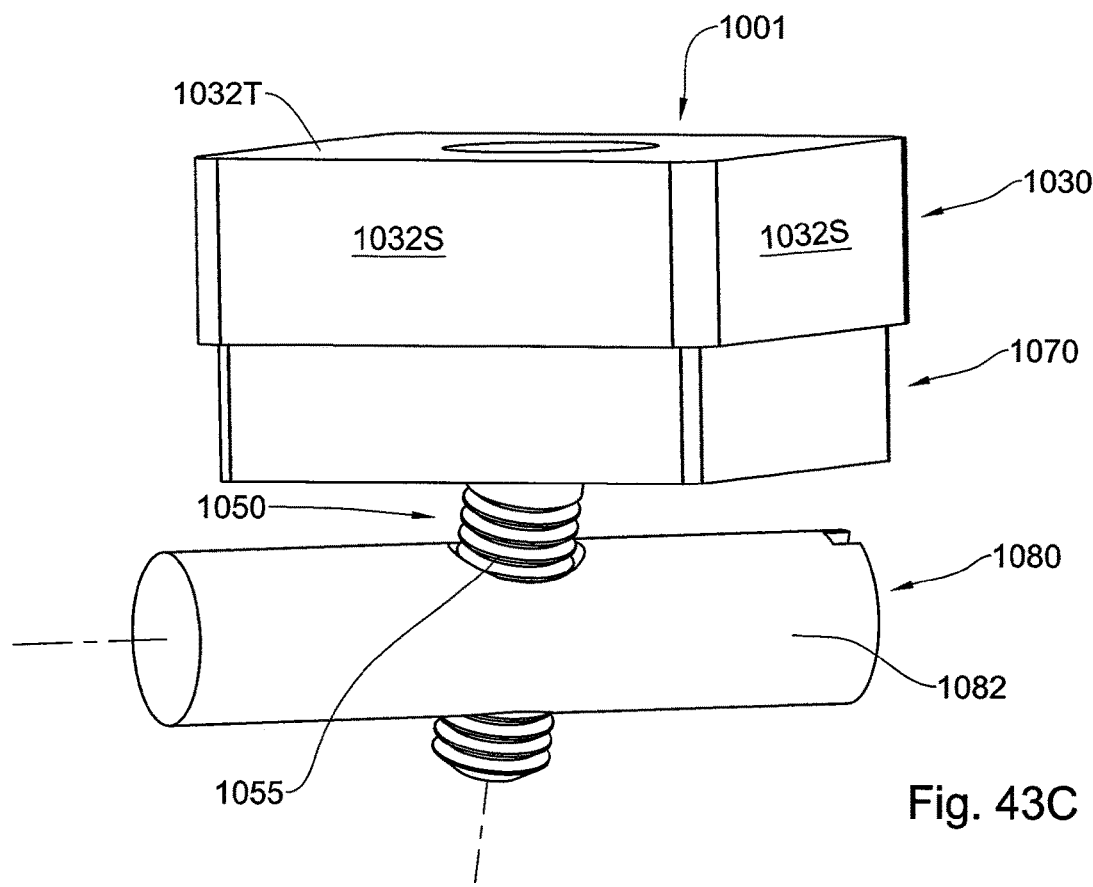
FIG. 43C is a schematic isometric view of a restraining mechanism used in the turning tool shown in FIGS. 43A and 43B.

Attention is now drawn to FIGS. 43A to 43C, in which still another example of a cutting tool is shown, generally designated as 1001, and comprising a holder 1010, a seat 1020, a cutting insert 1030 (can be similar to that previously described) and a screw 1050.

However, contrary to previously described examples, it is note that the seat bore is completely unthreaded, i.e. it has no inner thread configured for engaging the clamping screw 1050. Instead, the holder 1010 is formed with a lateral channel 1023 intersecting the seat bore 1025, and the cutting tool 1001 further comprises a sliding thread element 1080 received within the channel 1023, and formed with an inner thread 1082 configured for engaging the external thread of the clamping screw 1050.

It is further noted that the bore 1025 is of larger diameter than the diameter of the clamping screw 1050, and that the thread element 1080 is freely revolvable about the axis of the channel 1023 and freely displaceable therealong. As such, a certain degree of freedom is provided in mounting and removing the clamping screw 1050, while the thread element 1080 revolves about the axis and displaces along it to fit any movements of the clamping screw owing to clamping pressure or loads exerted during operation of the cutting tool.

Figure 44A:
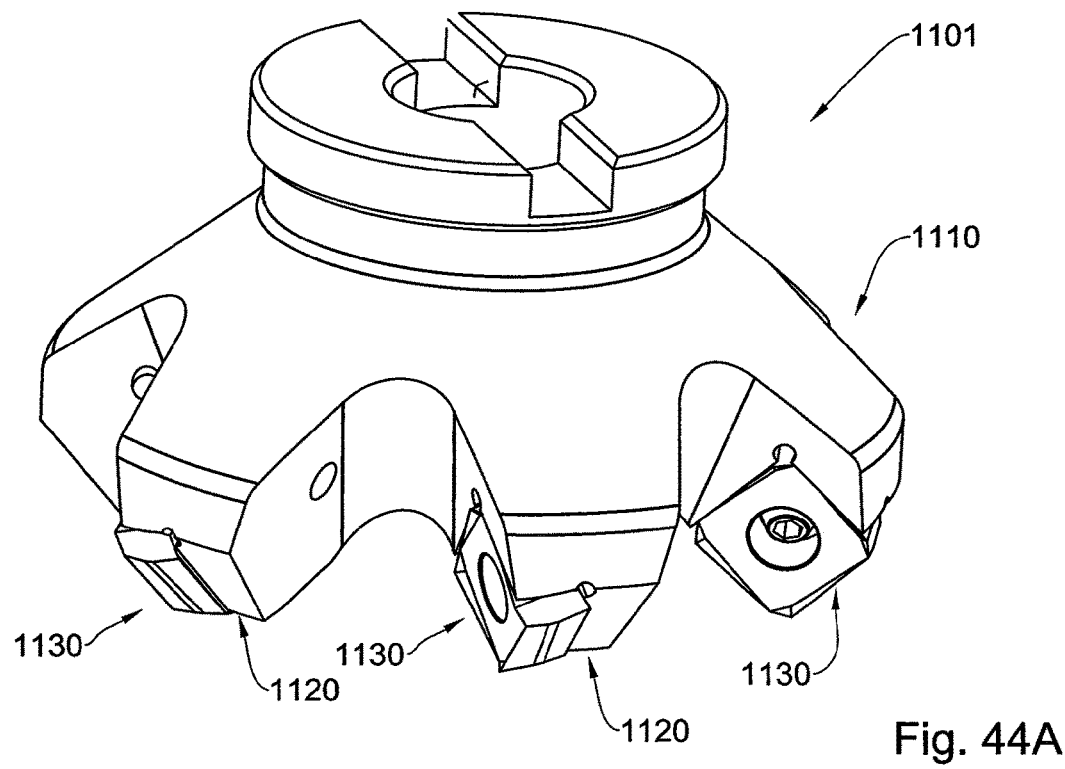
FIG. 44A is a schematic isometric view of a milling tool according to another example of the present application.
Figure 44B:
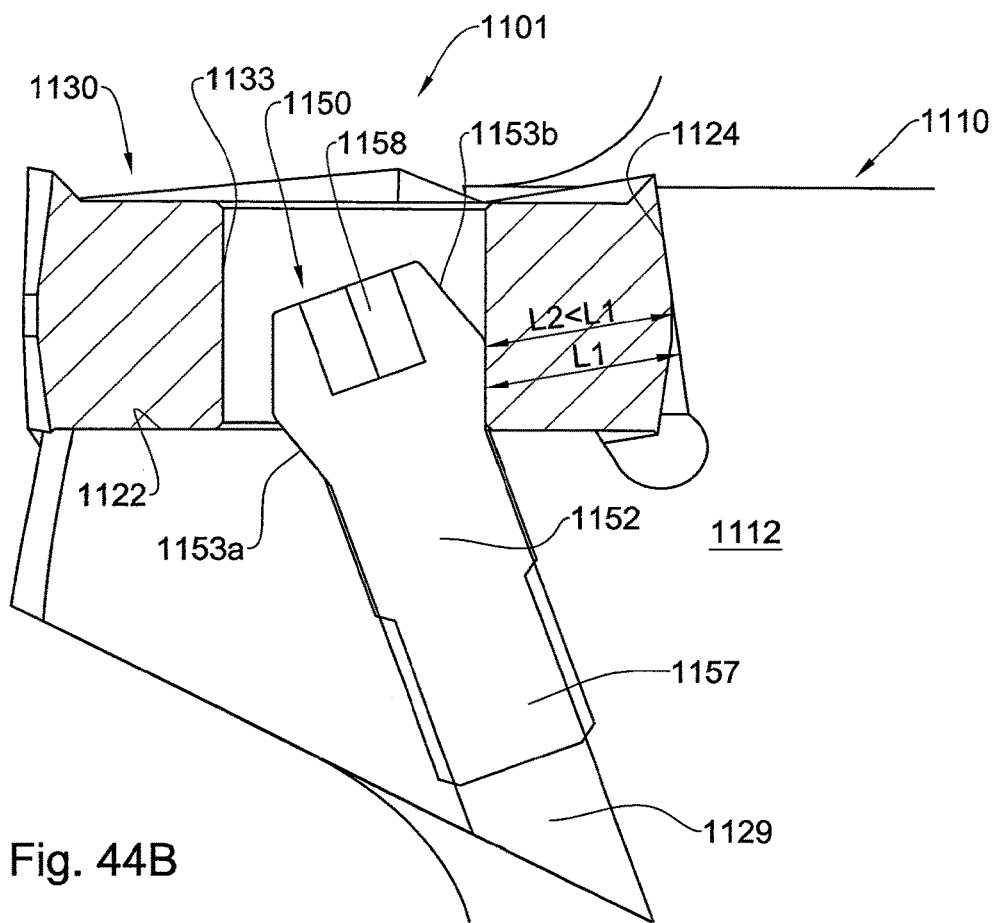
FIG. 44B is a schematic cross-section view of a portion of the milling tool shown in FIG. 44A.

Attention is now drawn to FIGS. 44A and 44B, in which a milling tool is shown, generally designated as 1101, and comprising a holder 1110 and a plurality of cutting inserts 1130, each being received within an insert seat 1120 and secured in place by a clamping screw 1150.

With particular reference being drawn to FIG. 44B, it is observed that in the securing position of the clamping screw, the head portion of the screw 1153a and the side wall of the seat 1124 form a dove-tail geometry, preventing the cutting insert 1130 from being removed from the seat 1120.

Figure 45A:
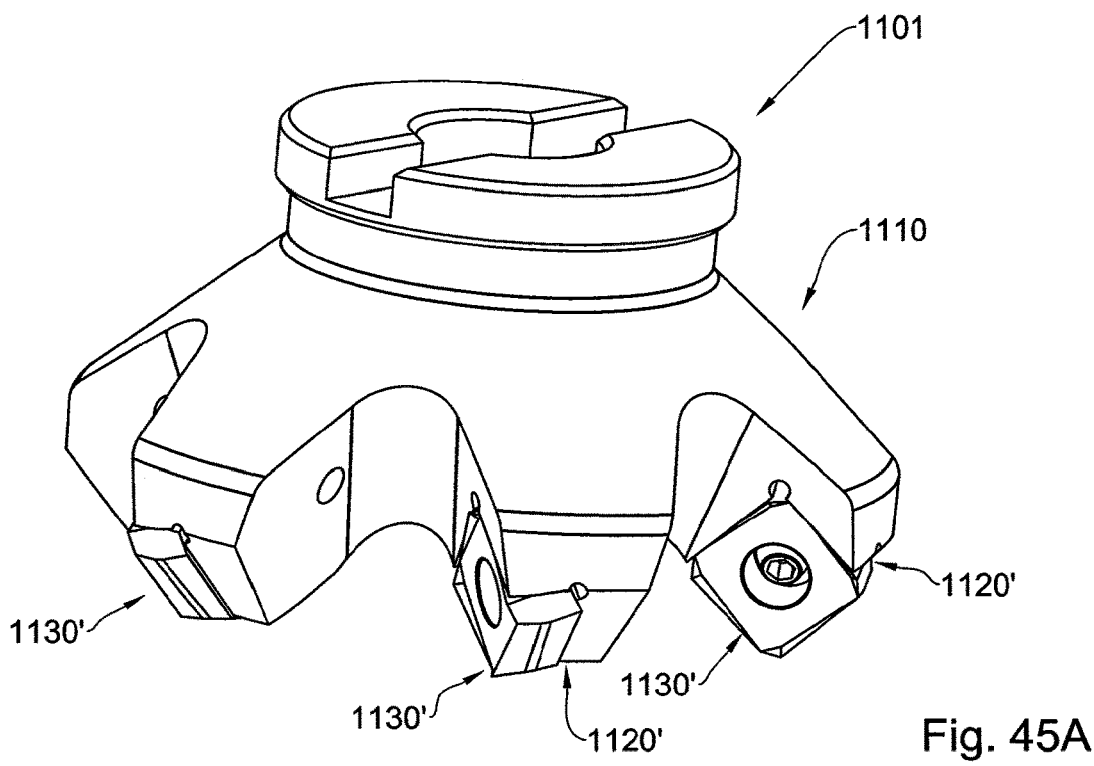
FIG. 45A is a schematic isometric view of a milling tool according to another example of the present application.
Figure 45B:
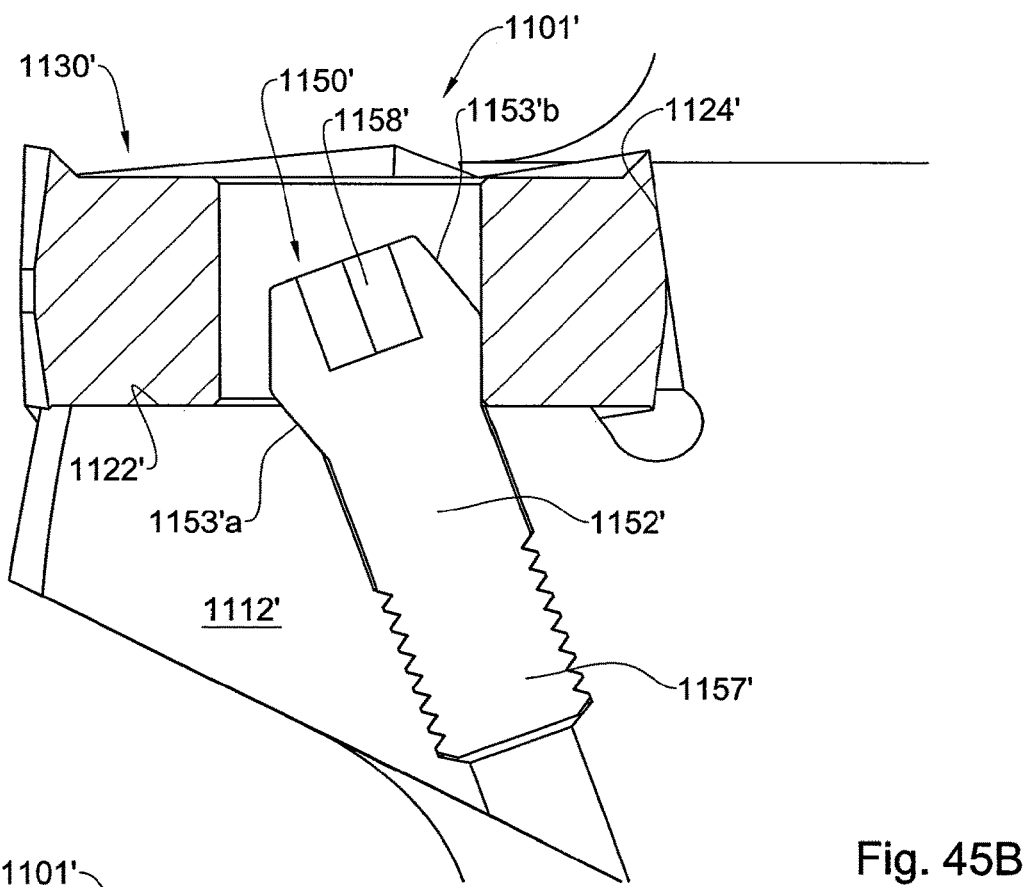
FIGS. 45B and 45C are schematic cross-section views of a portion of the milling tool shown in FIG. 45A, shown in open and closed positions respectively.
Figure 45C:
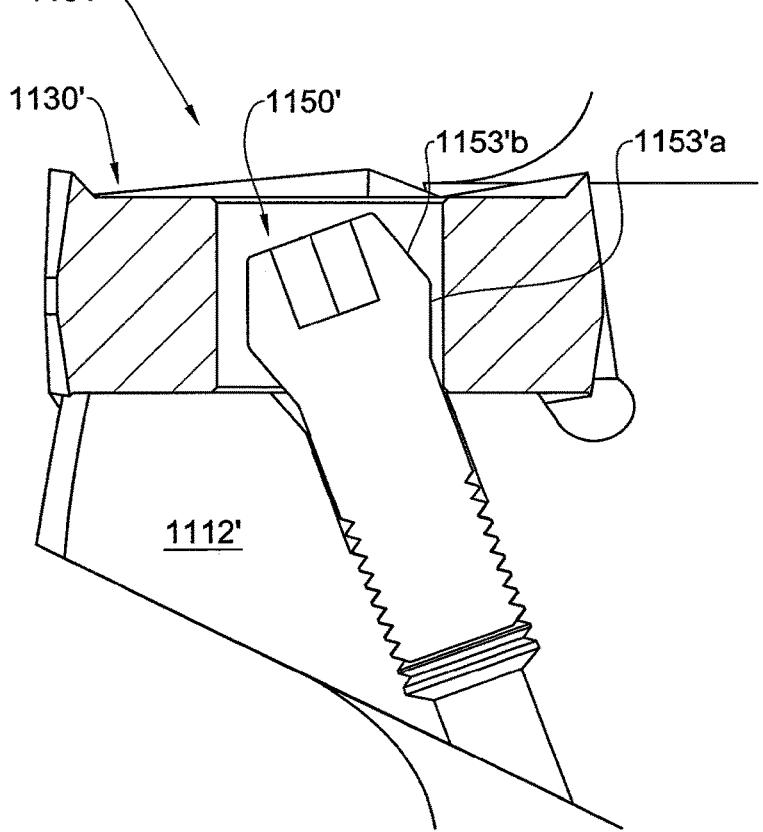
Figure 46A:
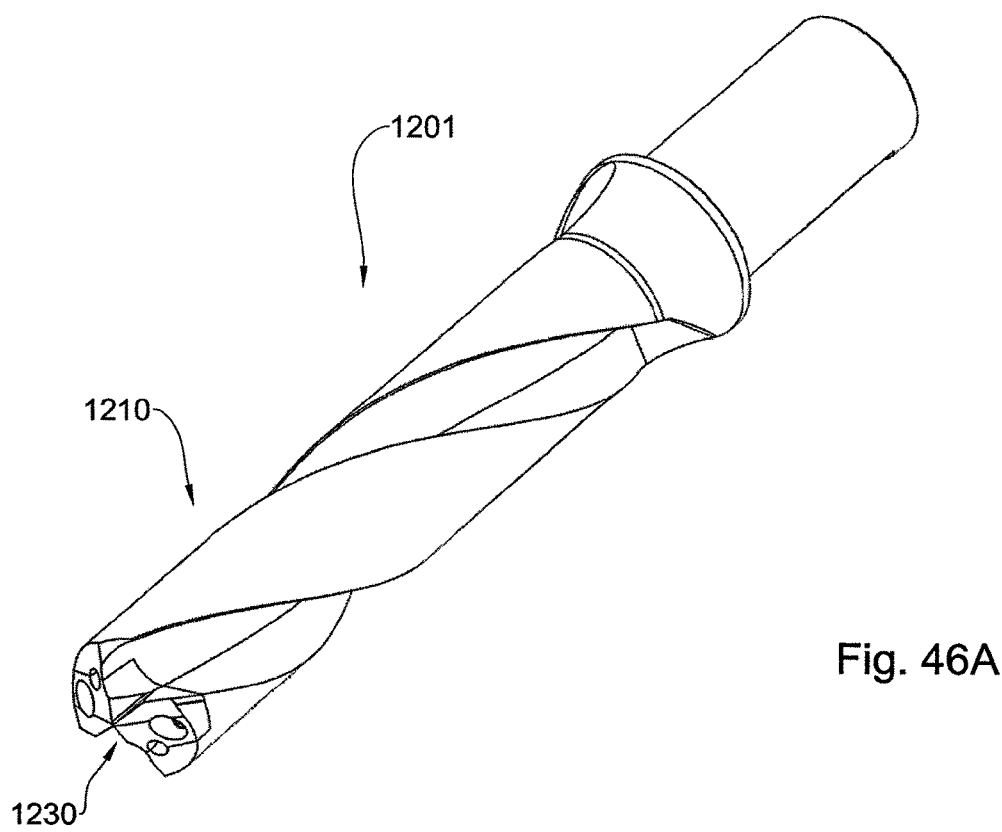
FIG. 46A is a schematic isometric view of a drill according to the present application.
Figure 46B:
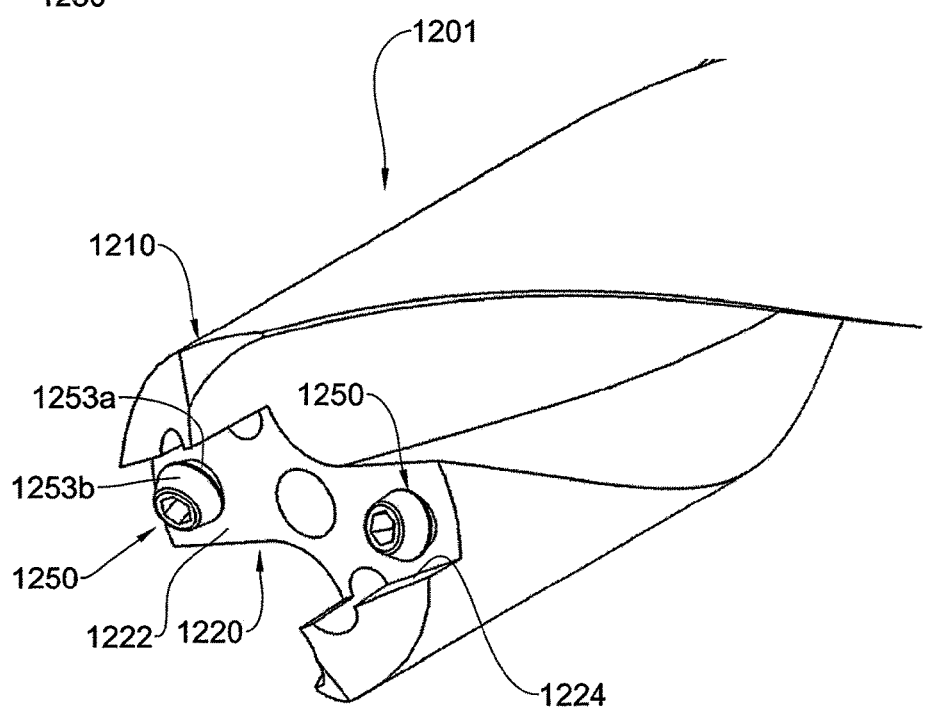
FIG. 46B is a schematic enlarged view of a head portion of a holder of the drill shown in FIG. 46A.
Figure 46C:
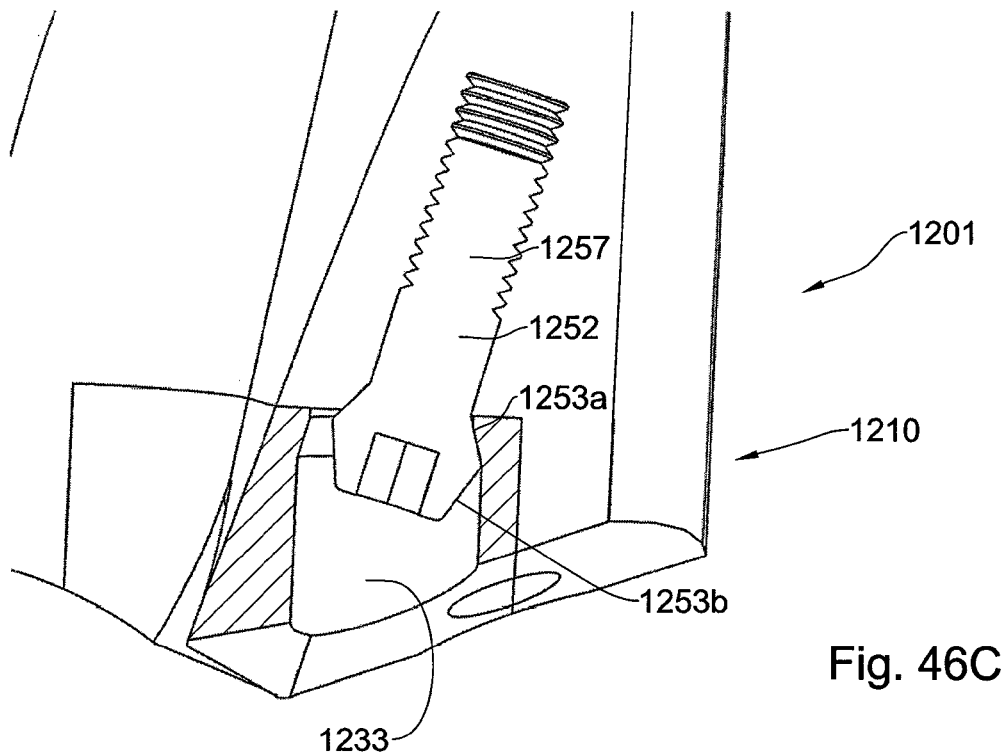
FIGS. 46C and 46D are schematic cross-section views of a portion of the drill shown in FIGS. 46A and 46B, shown in open and closed positions respectively.
Figure 46D:
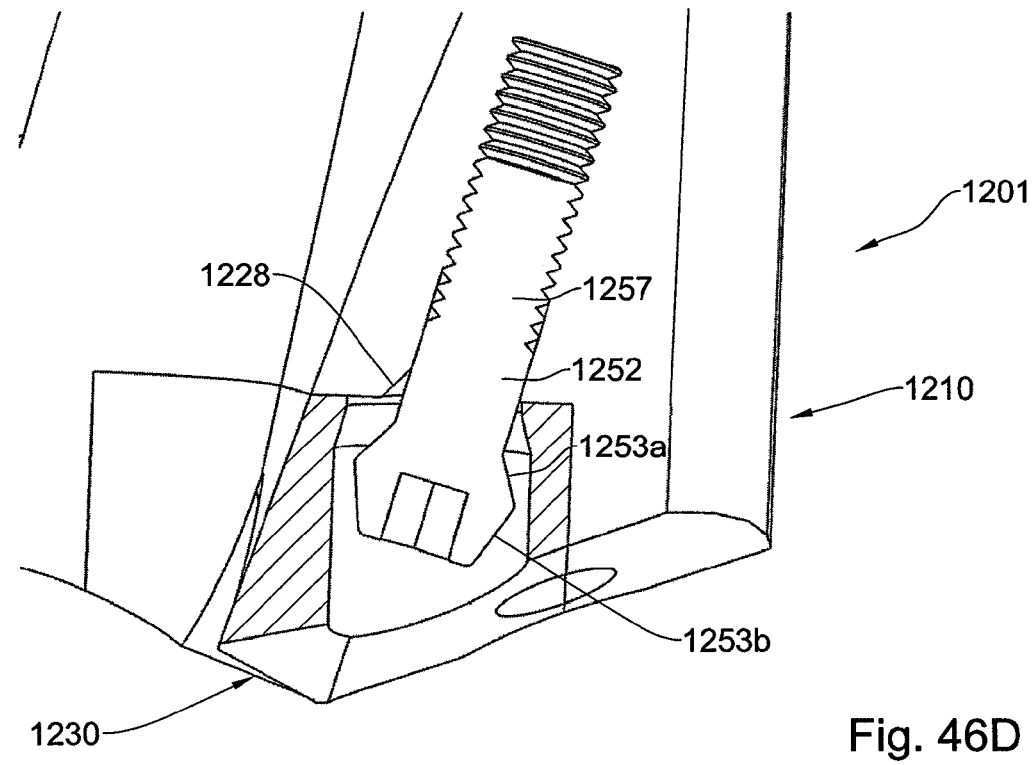
Figure 47A:
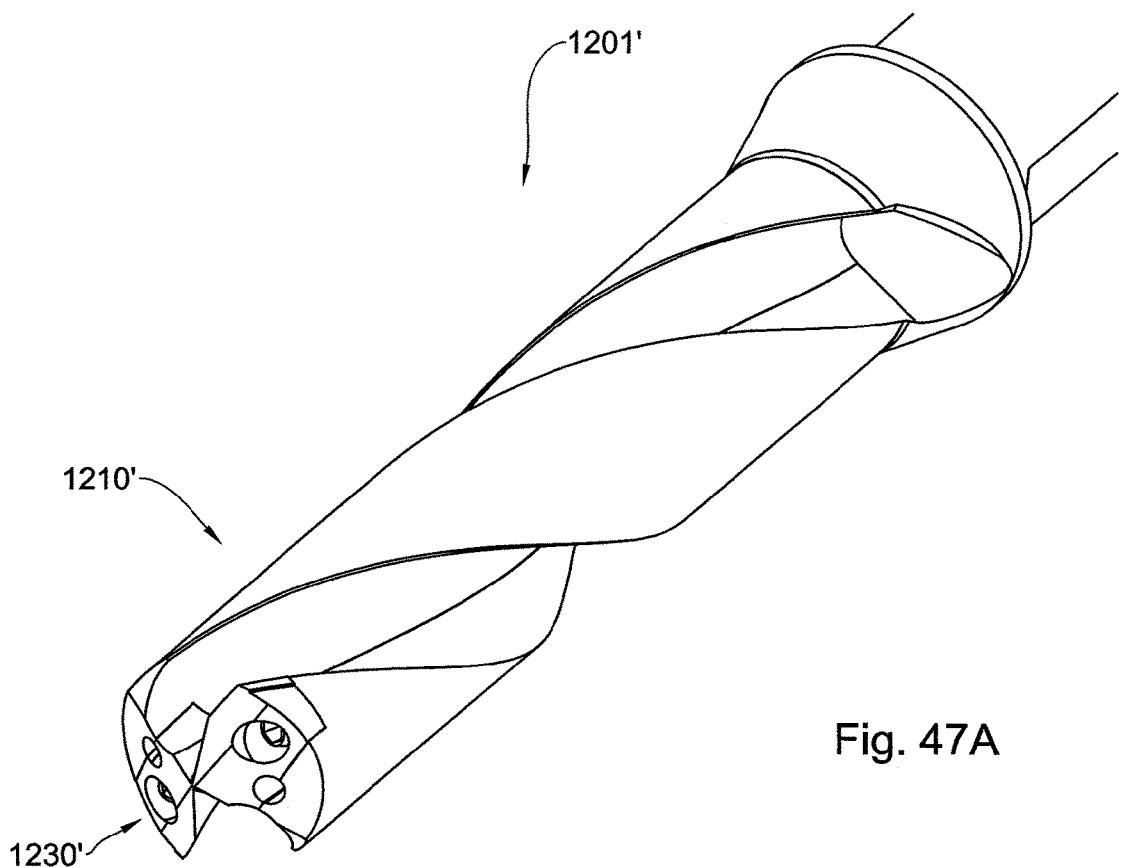
FIG. 47A is a schematic isometric view of a drill according to the present application.
Figure 47B:
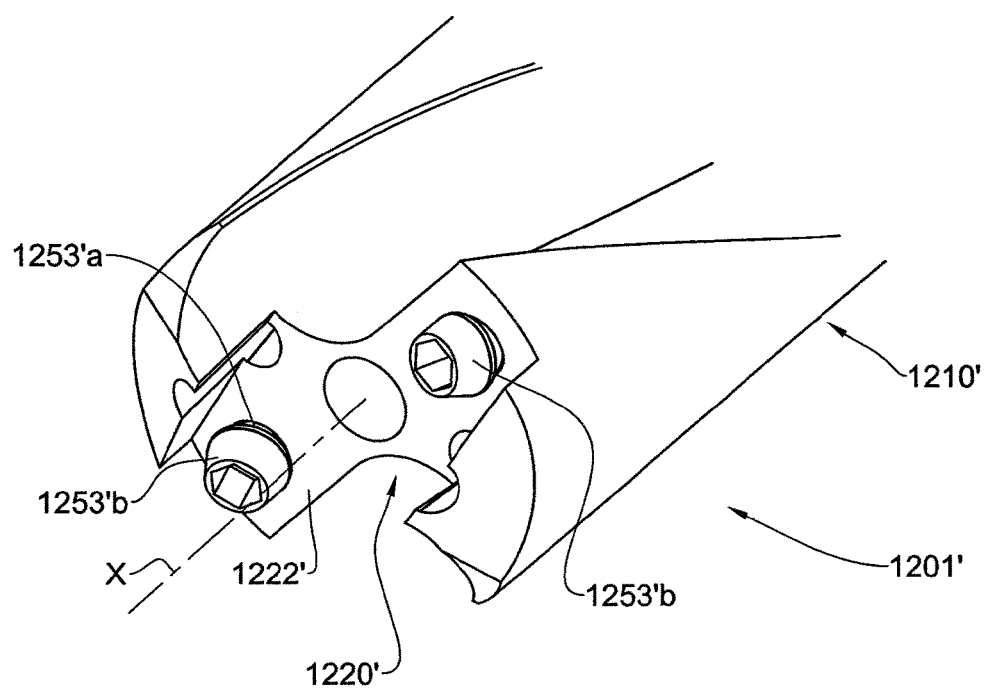
FIG. 47B is a schematic enlarged view of a head portion of a holder of the drill shown in FIG. 47A.
Figure 47C:
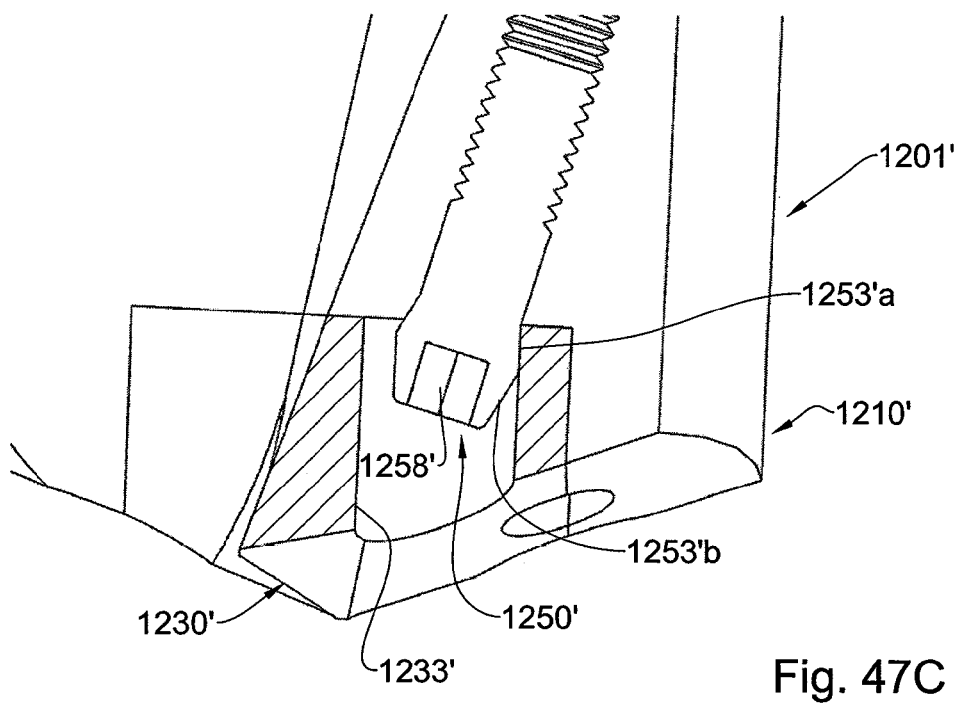
FIGS. 47C and 47D are schematic cross-section views of a portion of the drill shown in FIGS. 47A and 47B, shown in open and closed positions respectively.
Figure 47D:
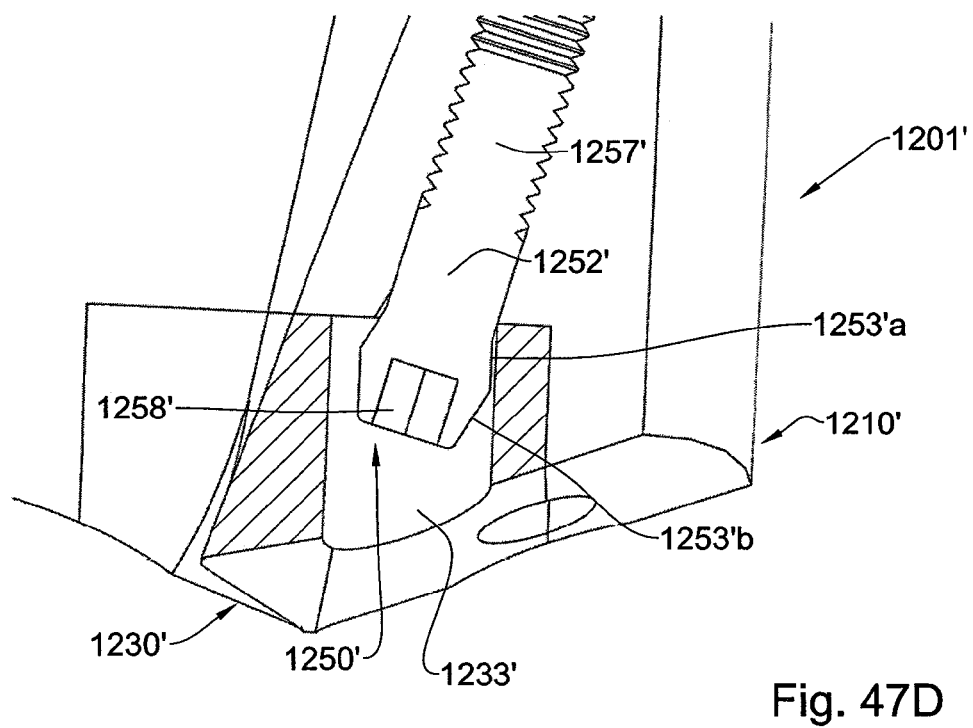
Figure 48A:
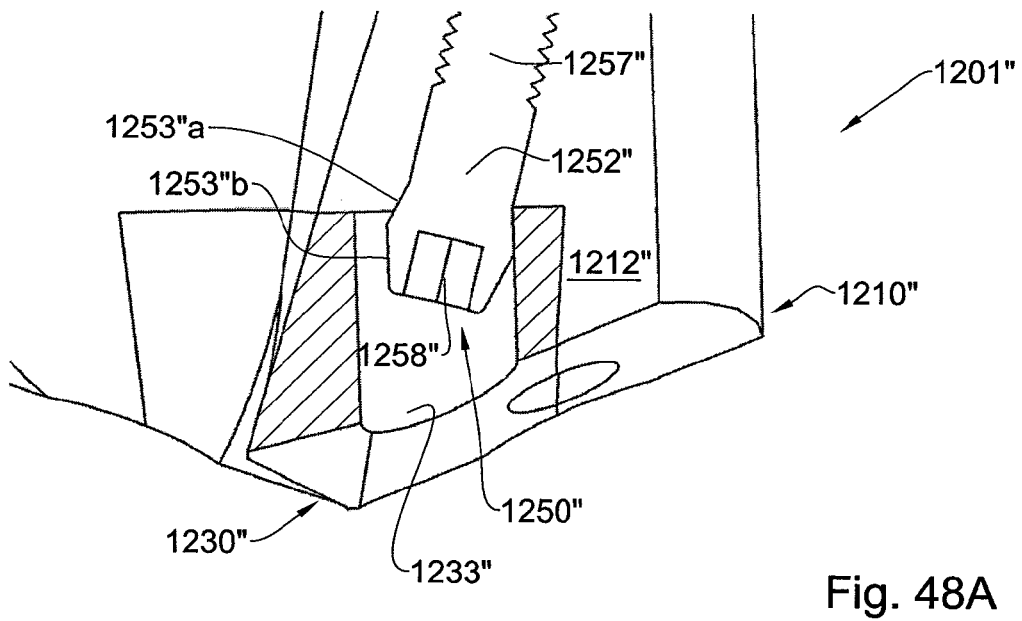
FIGS. 48A and 48B are schematic cross-section views of a portion of a drill according to another example of the present application, shown in open and closed positions respectively.
Figure 48B:
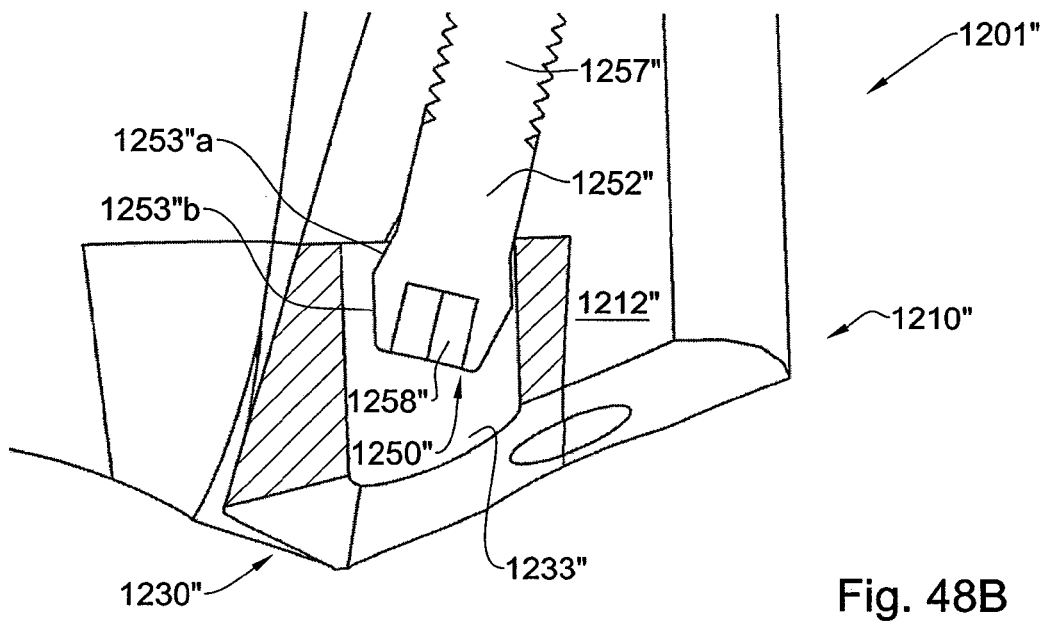

Turning now to FIGS. 45A to 45C, still another example of a milling tool is shown, which is generally similar to the previous example, and is designated as 1101', and comprising a holder 1110' and a plurality of cutting inserts 1130', each being received within an insert seat 1120' and secured in place by a clamping screw 1150'.

With respect to FIGS. 46A to 46D, a drilling tool is shown, generally designated as 1201, and comprising a holder 1210 and a cutting insert 1230 received within an insert seat 1220 and secured in place by a clamping screw 1250.

It is observed that the clamping screws 1250 operate in a manner similar to that of the clamping screws previously described, and that the head portion of both screws is accessible from the front end of the drilling tool 1201.

In addition, contrary to previous examples, it is noted that the seat 1220 does not comprise a support portion extending through the base surface 1222 but rather a support slope 1228 extending below the base surface and configured for engaging the head portion of the clamping screw 1250.

With respect to FIGS. 47A to 47D and FIGS. 48A and 48B, two additional examples of drilling tools are shown, generally designated 1201' and 1201".

Those skilled in the art to which this invention pertains will readily appreciate that numerous changes, variations, and modification can be made without departing from the scope of the invention, mutatis mutandis.

The invention claimed is:

1. A cutting tool holder adapted for mounting thereon a cutting insert having a top face, a bottom face, and an insert bore extending between said top face and said bottom face, the insert bore having an inner surface, said cutting tool holder comprising:
   a seat defined by a base surface and at least one side wall angled to said base surface;
   a seat bore extending along a bore axis, the seat bore having an open end at said base surface; and
   a securing arrangement including:
      a securing member extending between a proximal end and a distal end, the securing member having a head portion at said proximal end and having said distal end received within said seat bore, and
      a displacement arrangement adapted to displace the securing member along the bore axis of said seat bore between a mounting position in which said head portion protrudes from within the seat bore through said base surface into said seat to a first extent, defining a first gap distance between said head portion and said at least one side wall allowing said cutting insert to be placed within the seat and/or being fully removed from the seat, and a securing position in which said head portion protrudes from within the seat bore through said base surface into said seat to a second extent, smaller than said first extent, defining a second gap distance between said head portion and said at least one side wall smaller than said first gap distance, so as to engage the inner surface of said insert bore, thereby securing said cutting insert between the head portion and the at least one side wall;
   wherein said insert seat is further formed with a support surface configured for engaging and providing support to the head portion of said securing member at least in said securing position, the support surface comprising a surface of a support structure extending from the base surface into said seat.

2. The cutting tool holder according to claim 1, wherein the support surface is further constituted by at least one of:
   a portion of the base surface itself, adjacent the open end of said seat bore; or
   a surface extending from the base surface into the seat bore, the surface forming a part of an inner surface thereof and oriented at an angle to said base surface.

3. The cutting tool holder according to claim 1, wherein said support surface further comprises a portion extending below the base surface.

4. The cutting tool holder according to claim 1, wherein, when a cutting insert is mounted onto the seat, the inner surface of the insert bore and the support surface are counter opposed, so that the head portion of the securing member is supported in at least two different locations, one location being the inner surface of the insert bore of the cutting insert and the other location being the support surface.

5. The cutting tool holder according to claim 4, wherein, in a cross section of the cutting tool taken along a plane of the bore axis at least in the securing position, the arrangement of elements is as follows: the at least one side wall of the seat, a portion of the cutting insert firmly pressed against the side wall by the head portion, the head portion of the securing member, the support surface firmly pressed against the head portion, and the opposite portion of the cutting insert.

6. The cutting tool holder according to claim 1, wherein the bore axis is angled to the at least one side wall at a positive angle so that the open end of the seat bore is a portion of the seat bore located farthest from the side wall.

7. The cutting tool holder according to claim 1, wherein the head portion includes a first conical portion with an outwardly diverging tapering angle and a second conical portion with an inwardly converging conical portion, so that the first conical portion is configured for coming into contact with the inner surface of the cutting insert and with the support surface, and the second conical portion being configured for allowing removal of the cutting insert without obstructing it.

8. The cutting tool holder according to claim 7, wherein at least a segment of said second conical portion is substantially parallel to the inner surface of the cutting insert, in a cross section along a longitudinal axis of the fastening member.

9. The cutting tool holder according to claim 1, wherein the securing member includes a fastening screw having a shank portion and a threaded portion, and said seat bore has corresponding non-threaded and threaded portions respectively, configured for properly accommodating the fastening screw.

10. The cutting tool holder according to claim 1, wherein the side wall includes a support portion, and a cut-out portion disposed between the base surface and the support portion, wherein said support portion is configured for engaging an external surface of the cutting insert and said cut-out is configured for remaining out of contact with the external surface, so that pressing the cutting insert towards the at least one side wall entails application of pressure on the top portion of the external surface, due to its contact with the support portion, while a bottom portion of the external surface is free of contact.

11. The cutting tool holder according to claim 1, wherein the cutting tool holder further includes a thread element received within a channel intersecting said seat bore, and includes an inner thread configured for engaging the securing member.

12. The cutting tool holder according to claim 11, wherein the thread element is configured for performing at least one of the following:
revolving about an axis of the channel; or
axially displacing along the channel.

13. The cutting tool holder according to claim 1, wherein said cutting tool holder further includes a sub-plate mounted onto the base surface and configured for mounting thereon the cutting insert, wherein said sub-plate has a cavity accommodating at least a portion of said support structure.

14. The cutting tool holder according to claim 13, wherein said support structure does not project above said sub-plate.

15. A cutting insert configured for mounting onto the cutting tool holder according to claim 1.

16. The cutting insert according to claim 15, further including a plurality of first passage cut-outs associated with the bottom face of the cutting insert and a plurality of second passage cut-outs associated with the top face of the cutting insert, and configured for allowing the shank of the securing member to pass into the seat bore.

17. The cutting insert according to claim 15, wherein the inner surface of the insert bore includes a plurality of projections, each having a contact surface configured for coming into contact with the head portion of the securing member.

18. The cutting insert according to claim 17, wherein the support structure has a an inscribing circle of a diameter corresponding to that of the insert bore, while the projections have an inscribing circle which is of smaller diameter.

19. A cutting tool including the cutting insert according to claim 15 when mounted onto the cutting tool holder according to claim 1.

* * * * *